United States Patent
Chen et al.

(10) Patent No.: US 11,895,237 B1
(45) Date of Patent: *Feb. 6, 2024

(54) SCALED AUTHENTICATION OF ENDPOINT DEVICES

(71) Applicant: SPLUNK INC., San Francisco, CA (US)

(72) Inventors: Mingyuan Chen, San Jose, CA (US); Jesse Chor, Saratoga, CA (US); Dylan Patricia Conway, Toronto (CA); Michael Emery, Scotts Valley, CA (US); Simon Tam, San Mateo, CA (US); Eeshan Wagh, Mountain View, CA (US); Glen Wong, Santa Clara, CA (US); Everett Yip, San Jose, CA (US)

(73) Assignee: SPLUNK INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/150,769

(22) Filed: Jan. 5, 2023

Related U.S. Application Data

(63) Continuation of application No. 16/657,494, filed on Oct. 18, 2019, now Pat. No. 11,582,036.

(51) Int. Cl.
*H04L 9/08* (2006.01)
*H04L 9/32* (2006.01)

(52) U.S. Cl.
CPC ............ *H04L 9/088* (2013.01); *H04L 9/3247* (2013.01)

(58) Field of Classification Search
None
See application file for complete search history.

(56) References Cited

U.S. PATENT DOCUMENTS

| | | | |
|---|---|---|---|
| 6,370,249 B1 * | 4/2002 | Van Oorschot | H04L 9/0891 380/278 |
| 7,203,844 B1 * | 4/2007 | Oxford | H04L 63/0478 713/193 |

(Continued)

OTHER PUBLICATIONS

Splunk Enterprise 8.0.0 Overview, available online, retrieved on May 20, 2020 from docs.splunk.com, 17 pages.

(Continued)

*Primary Examiner* — Kambiz Zand
*Assistant Examiner* — Mahabub S Ahmed
(74) *Attorney, Agent, or Firm* — Artegis Law Group, LLP

(57) ABSTRACT

Various embodiments of the present application set forth a computer-implemented method that includes generating, based on a resource file stored at an endpoint device, a credential data packet for authenticating with a first application executing in a first network, where the resource file includes a set of encryption keys associated with a plurality of applications including the first application, and where the credential data packet is encrypted with a device key signed by the endpoint device, and the credential data packet is signed by an endpoint device management (EDM) key extracted from the set of encryptions keys included in the resource file, sending, by the endpoint device, the credential data packet to the first application via a trusted communication channel, and receiving, by the endpoint device and in response to the credential data packet, an authorization packet from the first application via the trusted communication channel.

20 Claims, 38 Drawing Sheets

(56) References Cited

U.S. PATENT DOCUMENTS

| | | | |
|---|---|---|---|
| 7,353,388 B1* | 4/2008 | Gilman | H04L 9/3273 |
| | | | 713/168 |
| 7,937,344 B2 | 5/2011 | Baum et al. | |
| 8,112,425 B2 | 2/2012 | Baum et al. | |
| 8,412,933 B1* | 4/2013 | Pelly | H04W 12/35 |
| | | | 380/278 |
| 8,706,800 B1* | 4/2014 | Ahmed | G06F 21/602 |
| | | | 709/201 |
| 8,751,529 B2 | 6/2014 | Zhang et al. | |
| 8,788,525 B2 | 7/2014 | Neels et al. | |
| 9,215,240 B2 | 12/2015 | Merza et al. | |
| 9,286,413 B1 | 3/2016 | Coates et al. | |
| 9,699,167 B1* | 7/2017 | Tovino | H04L 63/0428 |
| 10,021,077 B1* | 7/2018 | Brown | H04L 63/123 |
| 10,110,383 B1* | 10/2018 | Tamilarasan | H04L 9/3297 |
| 10,127,258 B2 | 11/2018 | Lamas et al. | |
| 10,218,697 B2* | 2/2019 | Cockerill | H04L 63/083 |
| 10,255,456 B2* | 4/2019 | Guglani | G06F 21/335 |
| 10,326,744 B1* | 6/2019 | Nossik | H04L 63/0435 |
| 10,341,304 B1* | 7/2019 | Boutros | H04M 1/67 |
| 10,637,666 B1* | 4/2020 | Blankstein | G06F 3/0647 |
| 10,673,628 B1* | 6/2020 | Shtop | H04L 9/32 |
| 10,951,630 B2* | 3/2021 | David | H04L 63/0823 |
| 11,121,863 B1* | 9/2021 | O'Neill | H04L 9/0894 |
| 11,240,025 B2* | 2/2022 | Wentz | G06F 21/64 |
| 2002/0133723 A1* | 9/2002 | Tait | H04L 63/0815 |
| | | | 713/150 |
| 2007/0118735 A1* | 5/2007 | Cherrington | H04L 63/0428 |
| | | | 713/155 |
| 2009/0290716 A1* | 11/2009 | O'Connor | H04L 63/126 |
| | | | 380/278 |
| 2010/0281251 A1* | 11/2010 | Arauz Rosado | H04L 63/20 |
| | | | 713/161 |
| 2011/0029783 A1* | 2/2011 | Thorsen | H04L 9/3247 |
| | | | 713/189 |
| 2011/0099384 A1* | 4/2011 | Grange | H04L 9/3234 |
| | | | 713/184 |
| 2011/0138183 A1* | 6/2011 | Reddy | H04W 12/08 |
| | | | 713/168 |
| 2011/0238994 A1* | 9/2011 | Baentsch | G06F 21/445 |
| | | | 713/169 |
| 2012/0089520 A1* | 4/2012 | Mardikar | G06Q 20/3821 |
| | | | 705/71 |
| 2012/0110345 A1* | 5/2012 | Pigeon | G06F 21/602 |
| | | | 713/189 |
| 2013/0036301 A1* | 2/2013 | Pelton | H04L 9/088 |
| | | | 713/155 |
| 2013/0166906 A1* | 6/2013 | Swaminathan | H04N 21/8456 |
| | | | 713/162 |
| 2013/0251154 A1* | 9/2013 | Tanizawa | H04L 9/0827 |
| | | | 380/278 |
| 2013/0332730 A1* | 12/2013 | Cosentino | H04L 63/08 |
| | | | 713/168 |
| 2014/0033193 A1* | 1/2014 | Palaniappan | G06F 21/57 |
| | | | 713/176 |
| 2014/0281495 A1* | 9/2014 | Um | G06F 21/44 |
| | | | 713/155 |
| 2014/0331060 A1* | 11/2014 | Hayton | G06F 21/32 |
| | | | 713/185 |
| 2015/0030153 A1* | 1/2015 | Banginwar | G09C 1/00 |
| | | | 380/28 |
| 2015/0121063 A1* | 4/2015 | Maller | H04L 63/0435 |
| | | | 713/153 |
| 2015/0222424 A1* | 8/2015 | Mosko | H04L 9/0866 |
| | | | 713/150 |
| 2015/0235011 A1* | 8/2015 | Swaminathan | H04L 63/0435 |
| | | | 713/150 |
| 2015/0326563 A1* | 11/2015 | Chan | H04L 63/0823 |
| | | | 713/172 |
| 2016/0065555 A1* | 3/2016 | Branden | H04L 63/0807 |
| | | | 726/7 |
| 2016/0205098 A1* | 7/2016 | Han | H04L 63/08 |
| | | | 713/155 |
| 2016/0219060 A1* | 7/2016 | Karunakaran | H04L 63/0884 |
| 2016/0328692 A1* | 11/2016 | Camps | G06Q 20/3223 |
| 2017/0012974 A1* | 1/2017 | Sierra | H04W 12/08 |
| 2017/0034129 A1* | 2/2017 | Sawant | H04L 12/4633 |
| 2017/0249456 A1* | 8/2017 | Fu | G06F 21/51 |
| 2017/0279613 A1* | 9/2017 | Sokolov | H04L 9/0822 |
| 2017/0346807 A1* | 11/2017 | Blasi | H04L 63/0442 |
| 2018/0024740 A1* | 1/2018 | Miller | G08C 17/02 |
| | | | 710/5 |
| 2018/0069702 A1* | 3/2018 | Ayyadevara | H04W 12/069 |
| 2018/0255456 A1* | 9/2018 | Yin | H04L 63/0823 |
| 2018/0288031 A1* | 10/2018 | Kumar | H04L 63/0807 |
| 2018/0337951 A1* | 11/2018 | Agarwal | H04L 63/0442 |
| 2018/0343122 A1* | 11/2018 | Spacek | H04L 9/3263 |
| 2018/0367315 A1* | 12/2018 | Chen | H04L 9/3247 |
| 2019/0098106 A1 | 3/2019 | Mungel et al. | |
| 2019/0180056 A1* | 6/2019 | Almeida | G06F 21/6209 |
| 2019/0180275 A1* | 6/2019 | Safak | G06Q 20/385 |
| 2019/0245681 A1* | 8/2019 | Alwen | H04L 9/085 |
| 2019/0268156 A1* | 8/2019 | Delmas | G06F 21/31 |
| 2019/0303600 A1* | 10/2019 | Hamel | H04L 9/3239 |
| 2019/0305964 A1* | 10/2019 | Hamel | H04L 9/0891 |
| 2019/0312730 A1* | 10/2019 | Engan | H04L 63/126 |
| 2020/0007585 A1* | 1/2020 | Williams | H04L 63/12 |
| 2020/0099515 A1* | 3/2020 | Hopkins | H04L 9/14 |
| 2020/0100108 A1* | 3/2020 | Everson | H04L 9/3247 |
| 2020/0252388 A1* | 8/2020 | Tran | H04L 63/0815 |
| 2020/0336481 A1* | 10/2020 | Fan | H04L 9/0869 |
| 2020/0396211 A1* | 12/2020 | Dobbins | G06F 21/52 |
| 2021/0008457 A1* | 1/2021 | Schouviller | H04L 63/0442 |
| 2021/0044976 A1* | 2/2021 | Avetisov | H04L 63/0815 |
| 2021/0117514 A1* | 4/2021 | Kushtagi | H04L 9/3213 |
| 2021/0303722 A1* | 9/2021 | Donohoe | H04L 9/006 |
| 2021/0365938 A1* | 11/2021 | Radu | G06Q 20/3829 |
| 2022/0116217 A1* | 4/2022 | Twede | H04L 63/0815 |

OTHER PUBLICATIONS

Splunk Cloud 8.0.2004 User Manual, available online, retrieved on May 20, 2020 from docs.splunk.com, 66 pages.

Splunk Quick Reference Guide, updated 2019, available online at https://www.splunk.com/pdfs/solution-guides/splunk-quick-reference guide.pdf, retrieved on May 20, 2020, 6 pages.

Carasso, David, "Exploring Splunk," published by CITO Research, New York, NY, Apr. 2012, 156 pages.

Bitincka et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010, 9 pages.

* cited by examiner

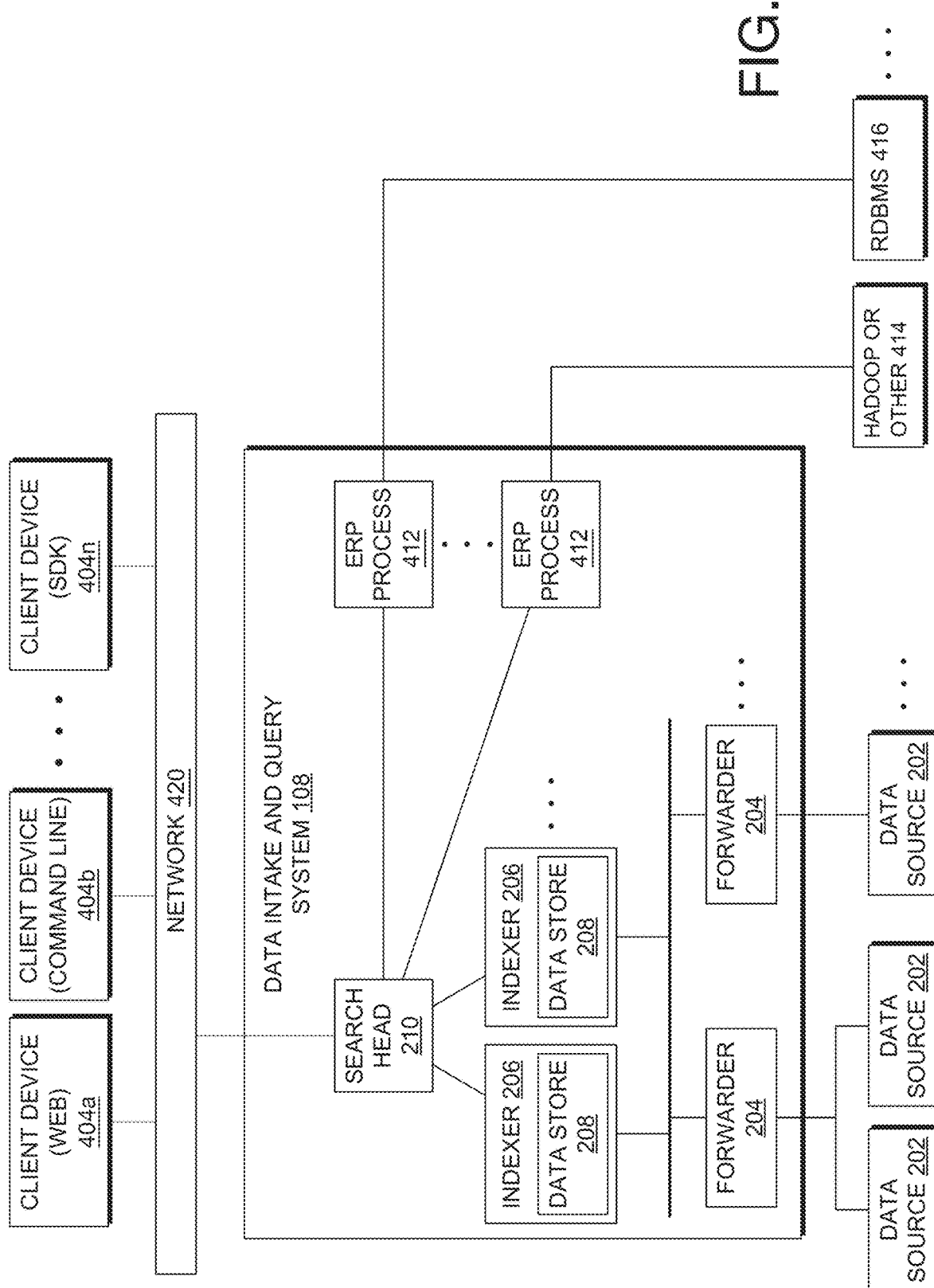

| Time 535 | Host 536 | Source 537 | Source Type 538 | Event 539 |
|---|---|---|---|---|
| 10/10/2000 1:55 p.m. | www1 | access.log | access_combined | 127.0.0.1 - frank [10/Oct/2000:13:55:36 -0700] "GET /apache.gif HTTP/1.0" 200 2326 0.0947 |
| 10/10/2000 1:56 p.m. | www2 | access.log | access_combined | 127.0.0.1 - bob [10/Oct/2010:13:56:36 -0700] "GET /mickey_mouse.gif HTTP/1.0" 200 2980 0.0899 |
| 10/10/2000 1:57 p.m. | www2 | access.log | access_combined | 127.0.0.1 - carlos [10/Oct/2010:13:57:36 -0700] "GET /donald_duck.gif HTTP/1.0" 200 2900 0.0857 |
| 10/10/2000 1:58 p.m. | www2 | error.log | apache_error | [Sunday Oct 10 1:59:33 2010] [error] [client 127.10.1.1.015] File does not exist: /home/reba/public_html/images/daffy_duck.gif |

FIG. 5C

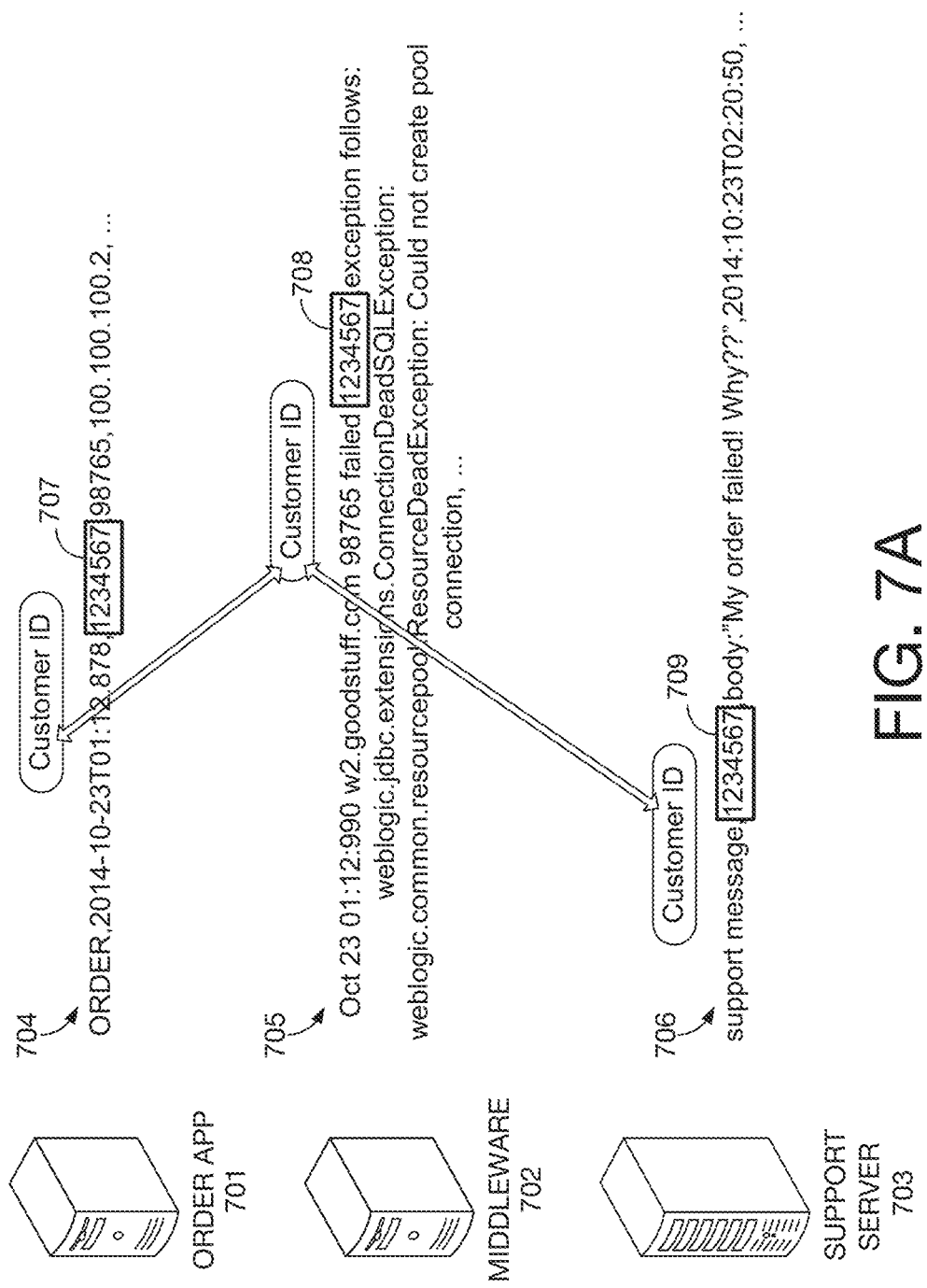

FIG. 7C

| Row | Time | Host | Source | Source type | Event |
|---|---|---|---|---|---|
| 55000 | 10/10/2016 1:55 p.m. | www1 | access.log | access_combined | 127.0.0.1 - frank [10/Oct/2016:13:55:36 -0700] "GET /apache.gif HTTP/1.0" 200 2326 0.0947 — 731 |
| 55001 | 10/10/2016 1:56 p.m. | www2 | access.log | access_combined | 127.0.0.2 - bob [10/Oct/2016:13:56:36 -0700] "GET /mickey_mouse.gif HTTP/1.0" 200 2980 0.0898 |
| 55002 | 10/10/2016 1:57 p.m. | www2 | access.log | access_combined | 127.0.0.1 - carlos [10/Oct/2016:13:57:36 -0700] "GET /donald_duck.gif HTTP/1.0" 200 2980 0.0857 |
| 55003 | 10/10/2016 1:58 p.m. | www2 | error.log | apache_error | [Sunday Oct 10 1:58:33 2016] [error] [client 127.10.1.1.015]: File does not exist: /home/reba/public_html/images/daffy_duck.gif |
| 55004 | 10/10/2016 1:59 p.m. | www1 | access.log | access_combined | 127.0.0.3 - virgil [10/Oct/2016:13:59:36 -0700] "GET /donald_duck.gif HTTP/1.0" 200 2900 0.0887 |
| 55005 | 10/10/2016 2:00 p.m. | www1 | access.log | access_combined | 127.0.0.1 - matt [10/Oct/2016:14:00:36 -0700] "GET /goofy.gif HTTP/1.0" 200 2920 0.0987 — 732, 733 |
| 55006 | 10/10/2016 2:01 p.m. | www2 | error.log | apache_error | [Sunday Oct 10 2:01:33 2016] [error] [client 127.10.1.1.03]: File does not exist: /home/public_html/images/furby.gif |
| 55007 | 10/10/2016 2:02 p.m. | www1 | access.log | access_combined | 127.0.0.1 - jack [10/Oct/2016:14:02:36 -0700] "GET /muppets.gif HTTP/1.0" 200 5000 0.0567 — 734 |

↳ 723

722 →

| Event Reference Value | Field Name | Field Value |
|---|---|---|
| 55000 | clientip | 127.0.0.1 |
| 55002 | clientip | 127.0.0.1 |
| 55005 | clientip | 127.0.0.1 |
| 55007 | clientip | 127.0.0.1 |

725 →

| Event Reference Value | Field Name | Field Value | UserID |
|---|---|---|---|
| 55000 | clientip | 127.0.0.1 | frank |
| 55005 | clientip | 127.0.0.1 | matt |

FIG. 8A

Data Summary

| Hosts (5) | Sources (8) | Sourcetypes (3) | | ✕ |

( filter )

| Host ◊ | | Count ◊ | Last Update ◊ |
|---|---|---|---|
| mailsv | ⋅⌄ | 9,829 | 4/29/14 1:32:47.000 PM |
| vendor_sales | ⋅⌄ | 30,244 | 4/29/14 1:32:46.000 PM |
| www1 | ⋅⌄ | 24,221 | 4/29/14 1:32:44.000 PM |
| www2 | ⋅⌄ | 22,595 | 4/29/14 1:32:47.000 PM |
| www3 | ⋅⌄ | 22,975 | 4/29/14 1:32:45.000 PM |

Define Device Group Distribution — 2110
Select options below to distribute Configuration.

| Search Device Groups 🔍 |
|---|
| All (4,806)    Selected (0) |
| ☐ Android Devices (735) |
| ☐ Android Enterprise Devices (24) |
| ☐ IOS Devices (472) |
| ☐ Windows Devices (2,021) |
| ☐ macOS Devices (1,402) |
| ☐ tvOS Devices (10) |
| ☐ Locked Down IOS [Device Group] (154) |
| ☐ Lockdown Test Devices (1) |

⎫ 2112

+ Create new Device Group

Distribution Summary — 2120
List of device users as they are added to the distribution.

| NAME | PHONE # | DEVICE TYPE |
|---|---|---|
| There is no information to display. | | |

⎫ 2122

2100

[Done]

[← Back]

FIG. 21

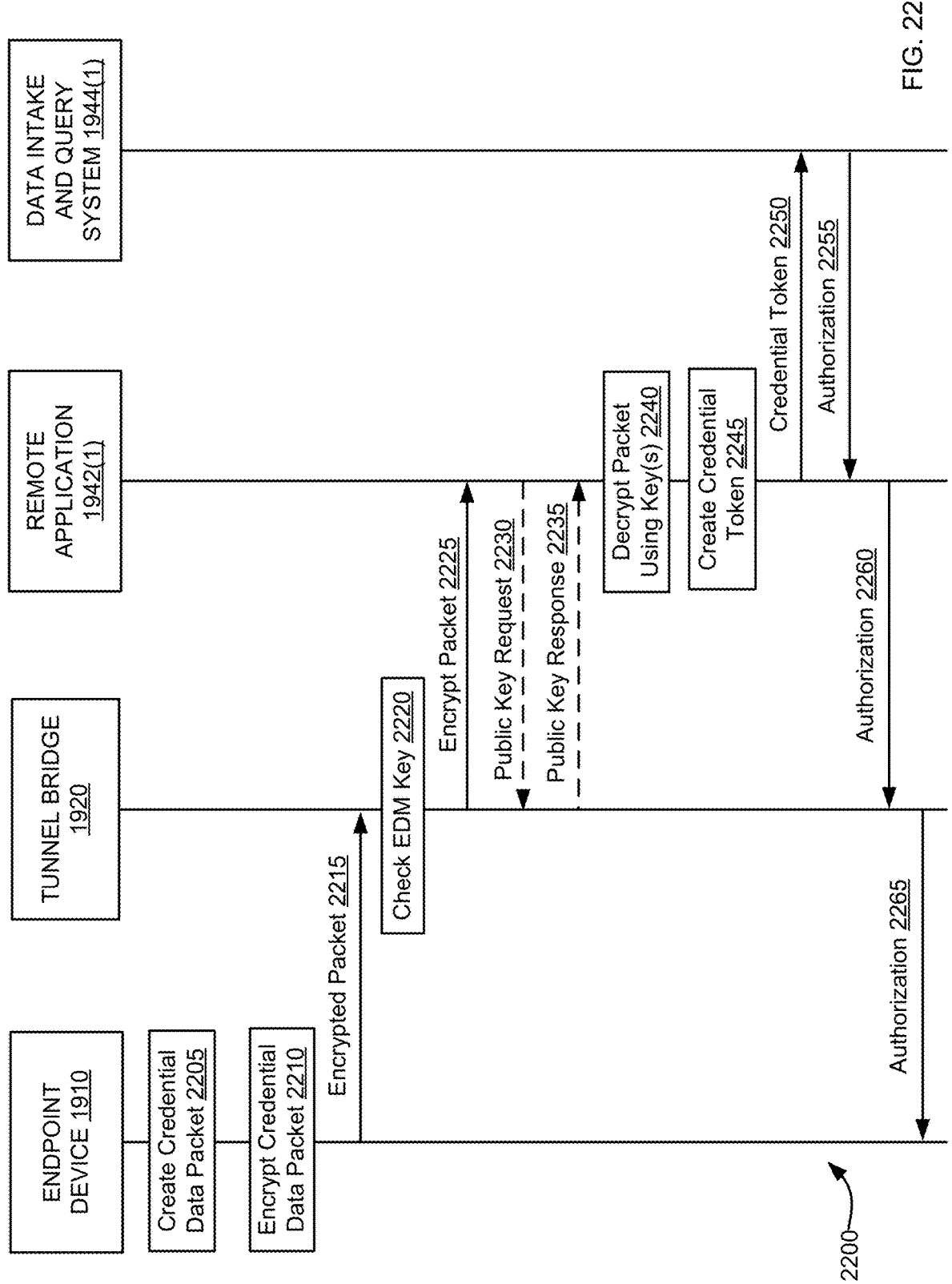

SCALED AUTHENTICATION OF ENDPOINT DEVICES

CROSS-REFERENCE TO RELATED APPLICATIONS

This application is a continuation of the co-pending U.S. patent application titled, "SCALED AUTHENTICATION OF ENDPOINT DEVICES," filed on Oct. 18, 2019 and having Ser. No. 16/657,494. The subject matter of this related application is hereby incorporated herein by reference.

BACKGROUND

Field of the Embodiments

The present invention relates generally to computer networks, and more specifically, to scaled authentication of endpoint devices.

Description of the Related Art

In modern computing environments, multitudes of endpoint devices connect to a networked computing environment. Each endpoint device may attempt to access computing resources within the networked computing environment in order to perform certain actions, such as retrieving data from remote data sources or initiating processes within specific computing environments. In order to authenticate and authorize a user attempting to access the networked computing environment, an endpoint device associated with the user connects to devices included within the networked computing environment. The devices within the networked computing environment may, in turn, authenticate both the endpoint device, as well as the identity of the user that is attempting to access the networked computing environment. Upon authenticating the endpoint device and the user, the networked computing environment may then authorize the user to access one or more of the computing resources.

One drawback of conventional techniques for authenticating users that attempt access to the networked computing environment is that registering a given endpoint device associated with a user to enable access requires manual intervention. For example, a system administrator sends a time-limited authentication code in order to limit the time that the not-yet-authorized endpoint device can access the networked computing environment. However, when registering large numbers of endpoint devices, inclusion of this manual intervention in the registration process is cumbersome both for the individual users of endpoint devices, as well as the system administrator that manages the networked computing environment. Consequently, time-limited authentication codes are inefficient for large-scale deployments. Further, system administrators do register large quantities of endpoint devices. Such practices prevent system administrators from registering large quantities of endpoint devices, or even from using such networked operating environments.

As the foregoing illustrates, what is needed in the art is an efficient way for endpoint devices to register for services within a networked computing environment.

SUMMARY

Various embodiments of the present application set forth a computer-implemented method that includes generating, based on a resource file stored at an endpoint device, a credential data packet for authenticating with a first application executing in a first network, where the resource file includes a set of encryption keys associated with a plurality of applications including the first application, and where the credential data packet is encrypted with a device key signed by the endpoint device, and the credential data packet is signed by an endpoint device management (EDM) key extracted from the set of encryptions keys included in the resource file, sending, by the endpoint device, the credential data packet to the first application via a trusted communication channel, and receiving, by the endpoint device and in response to the credential data packet, an authorization packet from the first application via the trusted communication channel.

Other embodiments of the present invention include, without limitation, one or more computer-readable media including instructions for performing one or more aspects of the disclosed techniques, as well as a computing device for performing one or more aspects of the disclosed techniques.

At least one technological advantage of the disclosed techniques relative to prior techniques is that individual users may, without requiring intervention by an intermediate manager, directly register an endpoint device via secure communications in order to access a remote application. Consequently, by eliminating intermediary systems in device authentication techniques, the disclosed techniques that provide automated authentication and authorization thus enable devices to securely register and authenticate large numbers of devices when accessing devices within the networked computing environment. Further, by enabling an endpoint device to sign user credentials using a provided endpoint device management key, an endpoint device manager can effectively cause endpoint devices to adhere to policies provided by the endpoint device manager.

BRIEF DESCRIPTION OF THE DRAWINGS

So that the manner in which the above recited features of the invention can be understood in detail, a more particular description of the invention may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

The present disclosure is illustrated by way of example, and not limitation, in the figures of the accompanying drawings, in which like reference numerals indicate similar elements and in which:

FIG. 4 is a block diagram of an example data intake and query system that performs searches across external data systems, in accordance with example embodiments;

FIG. 5C provides a visual representation of the manner in which a pipelined search language or query operates, in accordance with example embodiments;

FIG. 7A is a diagram of an example scenario where a common customer identifier is found among log data received from three disparate data sources, in accordance with example embodiments;

FIG. 7C illustrates an example of creating and using an inverted index, in accordance with example embodiments;

FIG. 8A is an interface diagram of an example user interface for a search screen, in accordance with example embodiments;

FIG. 8B is an interface diagram of an example user interface for a data summary dialog that enables a user to select various data sources, in accordance with example embodiments;

FIGS. 9-15 are interface diagrams of example report generation user interfaces, in accordance with example embodiments;

FIG. 21 is an example user interface for deploying a resource file of FIG. 20C, in accordance with example embodiments;

FIG. 22 illustrates a call flow diagram showing interactions between various components of the example networked computing environment 1900, in accordance with example embodiments;

DETAILED DESCRIPTION

Figure 1:
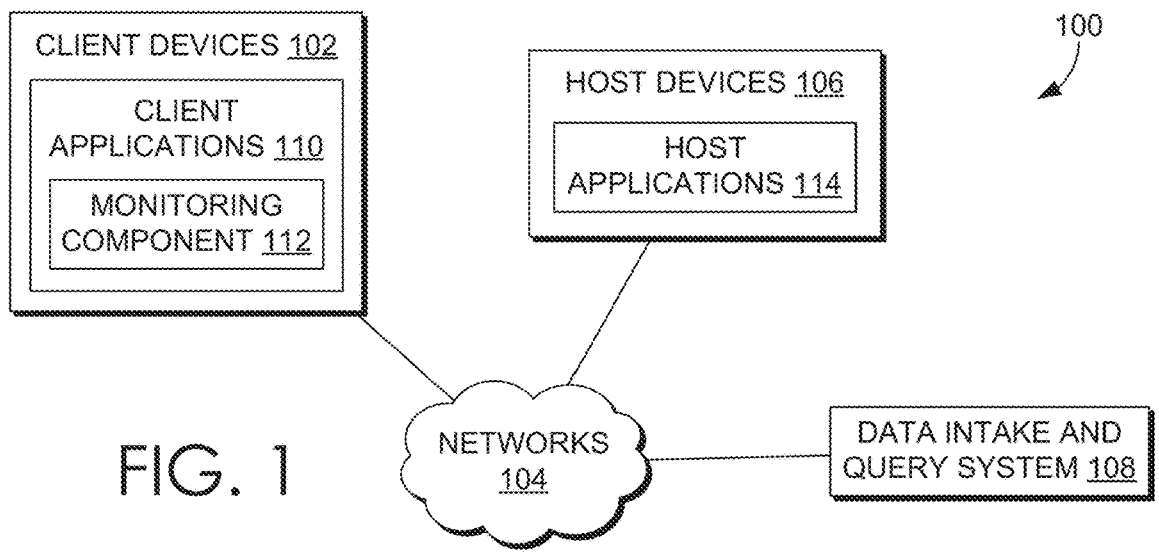
FIG. 1 is a block diagram of an example networked computer environment, in accordance with example embodiments.

Embodiments are described herein according to the following outline:

1.0 . . . General Overview 8
2.0 . . . Operating Environment 12
2.1 . . . Host Devices 13
2.2 . . . Client Devices 14
2.3 . . . Client Device Applications 14
2.4 . . . Data Server System 17
2.5 . . . Cloud-Based System Overview 18
2.6 . . . Searching Externally-Archived Data 20
2.6.1 . . . ERP Process Features 24
2.7 . . . Data Ingestion 27
2.7.1 . . . Input 28
2.7.2 . . . Parsing 29
2.7.3 . . . Indexing 32
2.8 . . . Query Processing 46
2.9 . . . Pipelined Search Language 48
2.10 . . . Field Extraction 51
2.11 . . . Example Search Screen 58
2.12 . . . DATA MODELS 59
2.13 . . . Acceleration Technique 65
2.13.1 . . . Aggregation Technique 65
2.13.2 . . . Keyword Index 66
2.13.3 . . . High Performance Analytics Store 66
2.13.3.1 . . . Extracting Event Data Using Posting 72
2.13.3.2 . . . Accelerating Report Generation 76
2.14 . . . Security Features 77
2.15 . . . Data Center Monitoring 81
3.0 . . . Device Associated Data Retrieval System 83
4.0 . . . Scaled Authentication of Endpoint Devices 89
4.1 . . . Endpoint Device Authentication System 89
4.2 . . . Managed Endpoint Deployment 97
4.3 . . . Managed Endpoint Device Registration 99

Modern data centers and other computing environments can comprise anywhere from a few host computer systems to thousands of systems configured to process data, service requests from remote clients, and perform numerous other computational tasks. During operation, various components within these computing environments often generate significant volumes of machine data. Machine data is any data produced by a machine or component in an information technology (IT) environment and that reflects activity in the IT environment. For example, machine data can be raw machine data that is generated by various components in IT environments, such as servers, sensors, routers, mobile devices, Internet of Things (IoT) devices, etc. Machine data can include system logs, network packet data, sensor data, application program data, error logs, stack traces, system performance data, etc. In general, machine data can also include performance data, diagnostic information, and many other types of data that can be analyzed to diagnose performance problems, monitor user interactions, and to derive other insights.

A number of tools are available to analyze machine data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and is discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, California. The SPLUNK® ENTERPRISE system is the leading platform for providing real-time operational intelligence that enables organizations to collect, index, and search machine data from various websites, applications, servers, networks, and mobile devices that power their businesses. The data intake and query system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the data intake and query system, machine data are collected and stored as "events". An event comprises a portion of machine data and is associated with a specific point in time. The portion of machine data may reflect activity in an IT environment and may be produced by a component of that IT environment, where the events may be searched to provide insight into the IT environment, thereby improving the performance of components in the IT environment. Events may be derived from "time series data," where the time series data comprises a sequence of data points (e.g., performance measurements from a computer system, etc.) that are associated with successive points in time. In general, each event has a portion of machine data that is associated with a timestamp that is derived from the portion of machine data in the event. A timestamp of an event may be determined through interpolation between temporally proximate events having known timestamps or may be determined based on other configurable rules for associating timestamps with events.

In some instances, machine data can have a predefined format, where data items with specific data formats are stored at predefined locations in the data. For example, the machine data may include data associated with fields in a database table. In other instances, machine data may not have a predefined format (e.g., may not be at fixed, predefined locations), but may have repeatable (e.g., non-random) patterns. This means that some machine data can comprise various data items of different data types that may be stored at different locations within the data. For example, when the data source is an operating system log, an event can include one or more lines from the operating system log containing machine data that includes different types of performance and diagnostic information associated with a specific point in time (e.g., a timestamp).

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The machine data generated by such data sources can include, for example and without limitation, server log files, activity log files, configuration files, messages, network packet data, performance measurements, sensor measurements, etc.

The data intake and query system uses a flexible schema to specify how to extract information from events. A flexible schema may be developed and redefined as needed. Note that a flexible schema may be applied to events "on the fly," when it is needed (e.g., at search time, index time, ingestion time, etc.). When the schema is not applied to events until search time, the schema may be referred to as a "late-binding schema."

During operation, the data intake and query system receives machine data from any type and number of sources (e.g., one or more system logs, streams of network packet data, sensor data, application program data, error logs, stack traces, system performance data, etc.). The system parses the machine data to produce events each having a portion of machine data associated with a timestamp. The system stores the events in a data store. The system enables users to run queries against the stored events to, for example, retrieve events that meet criteria specified in a query, such as criteria indicating certain keywords or having specific values in defined fields. As used herein, the term "field" refers to a location in the machine data of an event containing one or more values for a specific data item. A field may be referenced by a field name associated with the field. As will be described in more detail herein, a field is defined by an extraction rule (e.g., a regular expression) that derives one or more values or a sub-portion of text from the portion of machine data in each event to produce a value for the field for that event. The set of values produced are semantically-related (such as IP address), even though the machine data in each event may be in different formats (e.g., semantically-related values may be in different positions in the events derived from different sources).

As described above, the system stores the events in a data store. The events stored in the data store are field-searchable, where field-searchable herein refers to the ability to search the machine data (e.g., the raw machine data) of an event based on a field specified in search criteria. For example, a search having criteria that specifies a field name "UserID" may cause the system to field-search the machine data of events to identify events that have the field name "UserID." In another example, a search having criteria that specifies a field name "UserID" with a corresponding field value "12345" may cause the system to field-search the machine data of events to identify events having that field-value pair (e.g., field name "UserID" with a corresponding field value of "12345"). Events are field-searchable using one or more configuration files associated with the events. Each configuration file includes one or more field names, where each field name is associated with a corresponding extraction rule and a set of events to which that extraction rule applies. The set of events to which an extraction rule applies may be identified by metadata associated with the set of events. For example, an extraction rule may apply to a set of events that are each associated with a particular host, source, or source type. When events are to be searched based on a particular field name specified in a search, the system uses one or more configuration files to determine whether there is an extraction rule for that particular field name that applies to each event that falls within the criteria of the search. If so, the event is considered as part of the search results (and additional processing may be performed on that event based on criteria specified in the search). If not, the next event is similarly analyzed, and so on.

As noted above, the data intake and query system utilizes a late-binding schema while performing queries on events. One aspect of a late-binding schema is applying extraction rules to events to extract values for specific fields during search time. More specifically, the extraction rule for a field can include one or more instructions that specify how to extract a value for the field from an event. An extraction rule can generally include any type of instruction for extracting values from events. In some cases, an extraction rule comprises a regular expression, where a sequence of characters form a search pattern. An extraction rule comprising a regular expression is referred to herein as a regex rule. The system applies a regex rule to an event to extract values for a field associated with the regex rule, where the values are extracted by searching the event for the sequence of characters defined in the regex rule.

In the data intake and query system, a field extractor may be configured to automatically generate extraction rules for certain fields in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields specified in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the data intake and query system maintains the underlying machine data and uses a late-binding schema for searching the machine data, it enables a user to continue investigating and learn valuable insights about the machine data.

In some embodiments, a common field name may be used to reference two or more fields containing equivalent and/or similar data items, even though the fields may be associated with different types of events that possibly have different data formats and different extraction rules. By enabling a common field name to be used to identify equivalent and/or similar fields from different types of events generated by disparate data sources, the system facilitates use of a "common information model" (CIM) across the disparate data sources (further discussed with respect to FIG. 7A).

2.0 Operating Environment

FIG. 1 is a block diagram of an example networked computer environment 100, in accordance with example embodiments. Those skilled in the art would understand that FIG. 1 represents one example of a networked computer system and other embodiments may use different arrangements.

The networked computer system 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In some embodiments, one or more client devices 102 are coupled to one or more host devices 106 and a data intake and query system 108 via one or more networks 104. Networks 104 broadly represent one or more LANs, WANs, cellular networks (e.g., LTE, HSPA, 3G, and other cellular technologies), and/or networks using any of wired, wireless, terrestrial microwave, or satellite links, and may include the public Internet.

2.1 Host Devices

In the illustrated embodiment, a system 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML documents, media content, etc. The communication between a client device 102 and host application 114 may include sending various requests and receiving data packets. For example, in general, a client device 102 or application running on a client device may initiate communication with a host application 114 by making a request for a specific resource (e.g., based on an HTTP request), and the application server may respond with the requested content stored in one or more response packets.

In the illustrated embodiment, one or more of host applications 114 may generate various types of performance data during operation, including event logs, network data, sensor data, and other types of machine data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising a database server may generate one or more logs that record information related to requests sent from other host applications 114 (e.g., web servers or application servers) for data managed by the database server.

2.2 Client Devices

Client devices 102 of FIG. 1 represent any computing device capable of interacting with one or more host devices 106 via a network 104. Examples of client devices 102 may include, without limitation, smartphones, tablet computers, handheld computers, wearable devices, laptop computers, desktop computers, servers, portable media players, gaming devices, and so forth. In general, a client device 102 can provide access to different content, for instance, content provided by one or more host devices 106, etc. Each client device 102 may comprise one or more client applications 110, described in more detail in a separate section hereinafter.

2.3 Client Device Applications

In some embodiments, each client device 102 may host or execute one or more client applications 110 that are capable of interacting with one or more host devices 106 via one or more networks 104. For instance, a client application 110 may be or comprise a web browser that a user may use to navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In some embodiments, a client application 110 may include a monitoring component 112. At a high level, the monitoring component 112 comprises a software component or other logic that facilitates generating performance data related to a client device's operating state, including monitoring network traffic sent and received from the client device and collecting other device and/or application-specific information. Monitoring component 112 may be an integrated component of a client application 110, a plug-in, an extension, or any other type of add-on component. Monitoring component 112 may also be a stand-alone process.

In some embodiments, a monitoring component 112 may be created when a client application 110 is developed, for example, by an application developer using a software development kit (SDK). The SDK may include custom monitoring code that can be incorporated into the code implementing a client application 110. When the code is converted to an executable application, the custom code implementing the monitoring functionality can become part of the application itself.

In some embodiments, an SDK or other code for implementing the monitoring functionality may be offered by a provider of a data intake and query system, such as a system 108. In such cases, the provider of the system 108 can implement the custom code so that performance data generated by the monitoring functionality is sent to the system 108 to facilitate analysis of the performance data by a developer of the client application or other users.

In some embodiments, the custom monitoring code may be incorporated into the code of a client application 110 in a number of different ways, such as the insertion of one or more lines in the client application code that call or otherwise invoke the monitoring component 112. As such, a developer of a client application 110 can add one or more lines of code into the client application 110 to trigger the monitoring component 112 at desired points during execution of the application. Code that triggers the monitoring component may be referred to as a monitor trigger. For instance, a monitor trigger may be included at or near the beginning of the executable code of the client application 110 such that the monitoring component 112 is initiated or triggered as the application is launched, or included at other points in the code that correspond to various actions of the client application, such as sending a network request or displaying a particular interface.

In some embodiments, the monitoring component 112 may monitor one or more aspects of network traffic sent and/or received by a client application 110. For example, the monitoring component 112 may be configured to monitor data packets transmitted to and/or from one or more host applications 114. Incoming and/or outgoing data packets can be read or examined to identify network data contained within the packets, for example, and other aspects of data packets can be analyzed to determine a number of network performance statistics. Monitoring network traffic may enable information to be gathered particular to the network performance associated with a client application 110 or set of applications.

In some embodiments, network performance data refers to any type of data that indicates information about the network and/or network performance. Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 108 for analysis.

Upon developing a client application 110 that incorporates a monitoring component 112, the client application 110 can be distributed to client devices 102. Applications generally can be distributed to client devices 102 in any manner, or they can be pre-loaded. In some cases, the application may be distributed to a client device 102 via an application marketplace or other application distribution system. For instance, an application marketplace or other application distribution system might distribute the application to a client device based on a request from the client device to download the application.

Examples of functionality that enables monitoring performance of a client device are described in U.S. patent application Ser. No. 14/524,748, entitled "UTILIZING PACKET HEADERS TO MONITOR NETWORK TRAFFIC IN ASSOCIATION WITH A CLIENT DEVICE", filed on 27 Oct. 2014, and which is hereby incorporated by reference in its entirety for all purposes.

In some embodiments, the monitoring component 112 may also monitor and collect performance data related to one or more aspects of the operational state of a client application 110 and/or client device 102. For example, a monitoring component 112 may be configured to collect device performance information by monitoring one or more client device operations, or by making calls to an operating system and/or one or more other applications executing on a client device 102 for performance information. Device performance information may include, for instance, a current wireless signal strength of the device, a current connection type and network carrier, current memory performance information, a geographic location of the device, a device orientation, and any other information related to the operational state of the client device.

In some embodiments, the monitoring component 112 may also monitor and collect other device profile information including, for example, a type of client device, a manufacturer and model of the device, versions of various software applications installed on the device, and so forth.

In general, a monitoring component 112 may be configured to generate performance data in response to a monitor trigger in the code of a client application 110 or other triggering application event, as described above, and to store the performance data in one or more data records. Each data record, for example, may include a collection of field-value pairs, each field-value pair storing a particular item of performance data in association with a field for the item. For example, a data record generated by a monitoring component 112 may include a "networkLatency" field (not shown in FIG. 1) in which a value is stored. This field indicates a network latency measurement associated with one or more network requests. The data record may include a "state" field to store a value indicating a state of a network connection, and so forth for any number of aspects of collected performance data.

2.4 Data Server System

Figure 2:
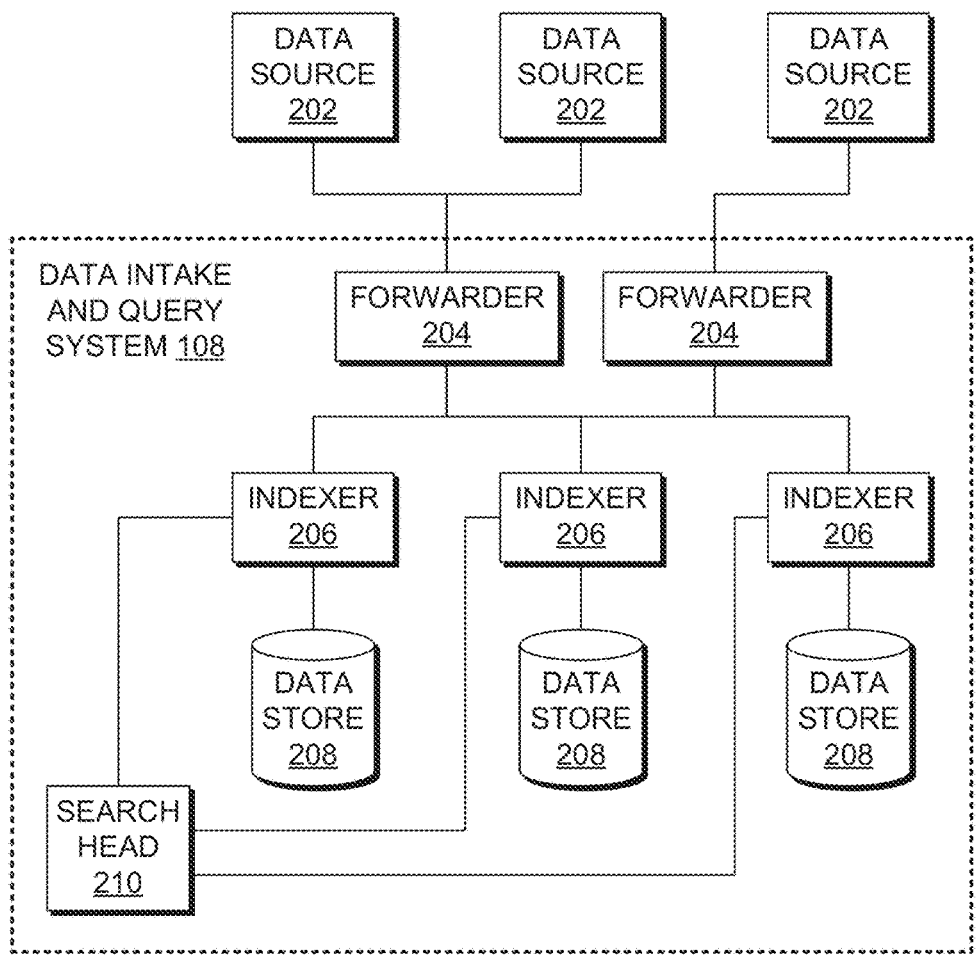
FIG. 2 is a block diagram of an example data intake and query system, in accordance with example embodiments.

FIG. 2 is a block diagram of an example data intake and query system 108, in accordance with example embodiments. System 108 includes one or more forwarders 204 that receive data from a variety of input data sources 202, and one or more indexers 206 that process and store the data in one or more data stores 208. These forwarders 204 and indexers 208 can comprise separate computer systems, or may alternatively comprise separate processes executing on one or more computer systems.

Each data source 202 broadly represents a distinct source of data that can be consumed by system 108. Examples of data sources 202 include, without limitation, data files, directories of files, data sent over a network, event logs, registries, etc.

During operation, the forwarders 204 identify which indexers 206 receive data collected from a data source 202 and forward the data to the appropriate indexers. Forwarders 204 can also perform operations on the data before forwarding, including removing extraneous data, detecting timestamps in the data, parsing data, indexing data, routing data based on criteria relating to the data being routed, and/or performing other data transformations.

In some embodiments, a forwarder 204 may comprise a service accessible to client devices 102 and host devices 106 via a network 104. For example, one type of forwarder 204 may be capable of consuming vast amounts of real-time data from a potentially large number of client devices 102 and/or host devices 106. The forwarder 204 may, for example, comprise a computing device which implements multiple data pipelines or "queues" to handle forwarding of network data to indexers 206. A forwarder 204 may also perform many of the functions that are performed by an indexer. For example, a forwarder 204 may perform keyword extractions on raw data or parse raw data to create events. A forwarder 204 may generate time stamps for events. Additionally or alternatively, a forwarder 204 may perform routing of events to indexers 206. Data store 208 may contain events derived from machine data from a variety of sources all pertaining to the same component in an IT environment, and this data may be produced by the machine in question or by other components in the IT environment.

2.5 Cloud-Based System Overview

The example data intake and query system 108 described in reference to FIG. 2 comprises several system components, including one or more forwarders, indexers, and search heads. In some environments, a user of a data intake and query system 108 may install and configure, on computing devices owned and operated by the user, one or more software applications that implement some or all of these system components. For example, a user may install a software application on server computers owned by the user and configure each server to operate as one or more of a forwarder, an indexer, a search head, etc. This arrangement generally may be referred to as an "on-premises" solution. That is, the system 108 is installed and operates on computing devices directly controlled by the user of the system. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 108 operate.

In one embodiment, to provide an alternative to an entirely on-premises environment for system 108, one or more of the components of a data intake and query system instead may be provided as a cloud-based service. In this context, a cloud-based service refers to a service hosted by one more computing resources that are accessible to end users over a network, for example, by using a web browser or other application on a client device to interface with the remote computing resources. For example, a service provider may provide a cloud-based data intake and query system by managing computing resources configured to implement various aspects of the system (e.g., forwarders, indexers, search heads, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

Figure 3:
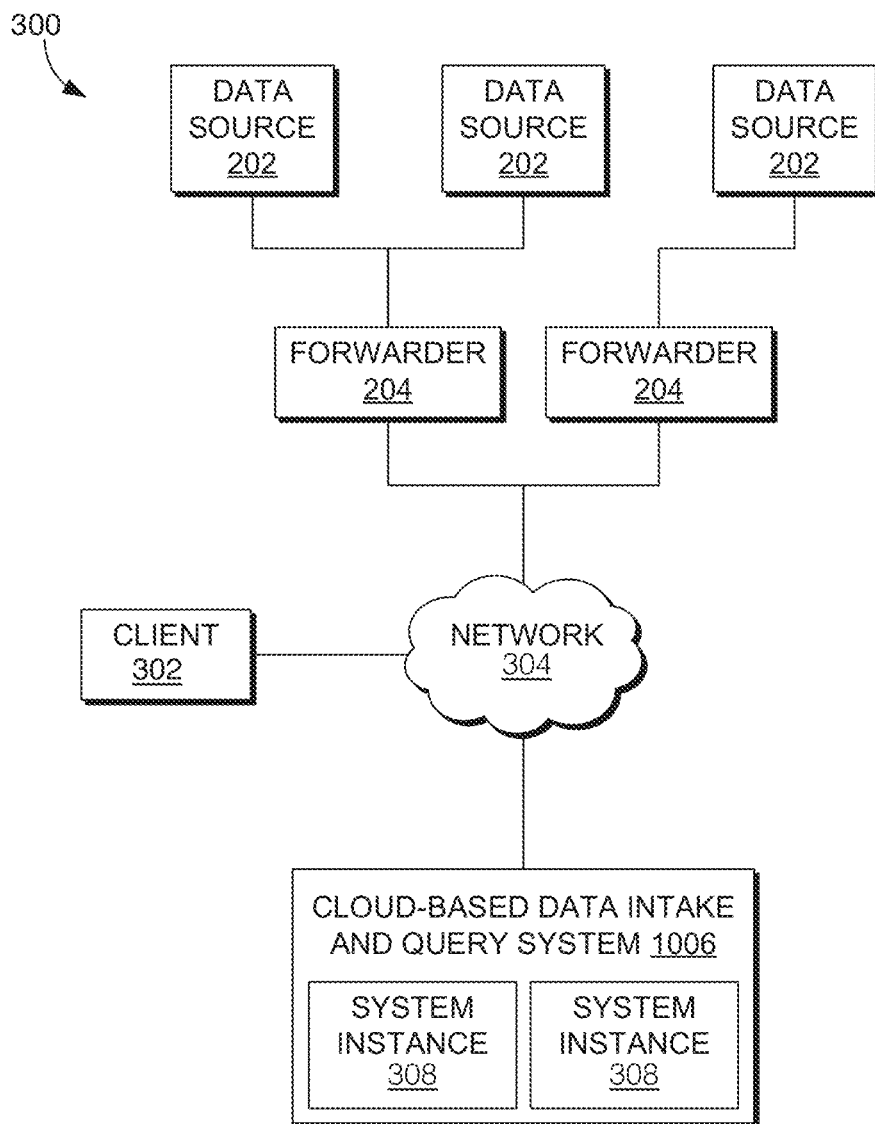
FIG. 3 is a block diagram of an example cloud-based data intake and query system, in accordance with example embodiments.

FIG. 3 illustrates a block diagram of an example cloud-based data intake and query system Similar to the system of FIG. 2, the networked computer system 300 includes input data sources 202 and forwarders 204. These input data sources and forwarders may be in a subscriber's private computing environment. Alternatively, they might be directly managed by the service provider as part of the cloud service. In the example system 300, one or more forwarders 204 and client devices 302 are coupled to a cloud-based data intake and query system 306 via one or more networks 304. Network 304 broadly represents one or more LANs, WANs, cellular networks, intranetworks, internetworks, etc., using any of wired, wireless, terrestrial microwave, satellite links, etc., and may include the public Internet, and is used by client devices 302 and forwarders 204 to access the system 306. Similar to the system of 38, each of the forwarders 204 may be configured to receive data from an input source and to forward the data to other components of the system 306 for further processing.

In some embodiments, a cloud-based data intake and query system 306 may comprise a plurality of system instances 308. In general, each system instance 308 may include one or more computing resources managed by a provider of the cloud-based system 306 made available to a particular subscriber. The computing resources comprising a system instance 308 may, for example, include one or more servers or other devices configured to implement one or more forwarders, indexers, search heads, and other components of a data intake and query system, similar to system 108. As indicated above, a subscriber may use a web browser or other application of a client device 302 to access a web portal or other interface that enables the subscriber to configure an instance 308.

Providing a data intake and query system as described in reference to system 108 as a cloud-based service presents a number of challenges. Each of the components of a system 108 (e.g., forwarders, indexers, and search heads) may at times refer to various configuration files stored locally at each component. These configuration files typically may involve some level of user configuration to accommodate particular types of data a user desires to analyze and to account for other user preferences. However, in a cloud-based service context, users typically may not have direct access to the underlying computing resources implementing the various system components (e.g., the computing resources comprising each system instance 308) and may desire to make such configurations indirectly, for example, using one or more web-based interfaces. Thus, the techniques and systems described herein for providing user interfaces that enable a user to configure source type definitions are applicable to both on-premises and cloud-based service contexts, or some combination thereof (e.g., a hybrid system where both an on-premises environment, such as SPLUNK® ENTERPRISE, and a cloud-based environment, such as SPLUNK CLOUD™, are centrally visible).

2.6 Searching Externally-Archived Data

FIG. 4 shows a block diagram of an example of a data intake and query system 108 that provides transparent search facilities for data systems that are external to the data intake and query system. Such facilities are available in the Splunk® Analytics for Hadoop® system provided by Splunk Inc. of San Francisco, California. Splunk® Analytics for Hadoop® represents an analytics platform that enables business and IT teams to rapidly explore, analyze, and visualize data in Hadoop® and NoSQL data stores.

The search head 210 of the data intake and query system receives search requests from one or more client devices 404 over network connections 420. As discussed above, the data intake and query system 108 may reside in an enterprise location, in the cloud, etc. FIG. 4 illustrates that multiple client devices 404a, 404b, . . . , 404n may communicate with the data intake and query system 108. The client devices 404 may communicate with the data intake and query system using a variety of connections. For example, one client device in FIG. 4 is illustrated as communicating over an Internet (Web) protocol, another client device is illustrated as communicating via a command line interface, and another client device is illustrated as communicating via a software developer kit (SDK).

The search head 210 analyzes the received search request to identify request parameters. If a search request received from one of the client devices 404 references an index maintained by the data intake and query system, then the search head 210 connects to one or more indexers 206 of the data intake and query system for the index referenced in the request parameters. That is, if the request parameters of the search request reference an index, then the search head accesses the data in the index via the indexer. The data intake and query system 108 may include one or more indexers 206, depending on system access resources and requirements. As described further below, the indexers 206 retrieve data from their respective local data stores 208 as specified in the search request. The indexers and their respective data stores can comprise one or more storage devices and typically reside on the same system, though they may be connected via a local network connection.

If the request parameters of the received search request reference an external data collection, which is not accessible to the indexers 206 or under the management of the data intake and query system, then the search head 210 can access the external data collection through an External Result Provider (ERP) process 410. An external data collection may be referred to as a "virtual index" (plural, "virtual indices"). An ERP process provides an interface through which the search head 210 may access virtual indices.

Thus, a search reference to an index of the system relates to a locally stored and managed data collection. In contrast, a search reference to a virtual index relates to an externally stored and managed data collection, which the search head may access through one or more ERP processes 410, 412. FIG. 4 shows two ERP processes 410, 412 that connect to respective remote (external) virtual indices, which are indicated as a Hadoop or another system 414 (e.g., Amazon S3, Amazon EMR, other Hadoop® Compatible File Systems (HCFS), etc.) and a relational database management system (RDBMS) 416. Other virtual indices may include other file organizations and protocols, such as Structured Query Language (SQL) and the like. The ellipses between the ERP processes 410, 412 indicate optional additional ERP processes of the data intake and query system 108. An ERP process may be a computer process that is initiated or spawned by the search head 210 and is executed by the search data intake and query system 108. Alternatively or additionally, an ERP process may be a process spawned by the search head 210 on the same or different host system as the search head 210 resides.

The search head 210 may spawn a single ERP process in response to multiple virtual indices referenced in a search request, or the search head may spawn different ERP processes for different virtual indices. Generally, virtual indices that share common data configurations or protocols may share ERP processes. For example, all search query references to a Hadoop file system may be processed by the same ERP process, if the ERP process is suitably configured. Likewise, all search query references to a SQL database may be processed by the same ERP process. In addition, the search head may provide a common ERP process for common external data source types (e.g., a common vendor may utilize a common ERP process, even if the vendor includes different data storage system types, such as Hadoop and SQL). Common indexing schemes also may be handled by common ERP processes, such as flat text files or Weblog files.

The search head 210 determines the number of ERP processes to be initiated via the use of configuration parameters that are included in a search request message. Generally, there is a one-to-many relationship between an external results provider "family" and ERP processes. There is also a one-to-many relationship between an ERP process and corresponding virtual indices that are referred to in a search request. For example, using RDBMS, assume two independent instances of such a system by one vendor, such as one RDBMS for production and another RDBMS used for development. In such a situation, it is likely preferable (but optional) to use two ERP processes to maintain the independent operation as between production and development data. Both of the ERPs, however, will belong to the same family, because the two RDBMS system types are from the same vendor.

The ERP processes 410, 412 receive a search request from the search head 210. The search head may optimize the received search request for execution at the respective external virtual index. Alternatively, the ERP process may receive a search request as a result of analysis performed by the search head or by a different system process. The ERP processes 410, 412 can communicate with the search head 210 via conventional input/output routines (e.g., standard in/standard out, etc.). In this way, the ERP process receives the search request from a client device such that the search request may be efficiently executed at the corresponding external virtual index.

The ERP processes 410, 412 may be implemented as a process of the data intake and query system. Each ERP process may be provided by the data intake and query system, or may be provided by process or application providers who are independent of the data intake and query system. Each respective ERP process may include an interface application installed at a computer of the external result provider that ensures proper communication between the search support system and the external result provider. The ERP processes 410, 412 generate appropriate search requests in the protocol and syntax of the respective virtual indices 414, 416, each of which corresponds to the search request received by the search head 210. Upon receiving search results from their corresponding virtual indices, the respective ERP process passes the result to the search head 210, which may return or display the results or a processed set of results based on the returned results to the respective client device.

Client devices 404 may communicate with the data intake and query system 108 through a network interface 420, e.g., one or more LANs, WANs, cellular networks, intranetworks, and/or internetworks using any of wired, wireless, terrestrial microwave, satellite links, etc., and may include the public Internet.

The analytics platform utilizing the External Result Provider process described in more detail in U.S. Pat. No. 8,738,629, entitled "External Result Provided Process For Retrieving Data Stored Using A Different Configuration Or Protocol", issued on 27 May 2014, U.S. Pat. No. 8,738,587, entitled "PROCESSING A SYSTEM SEARCH REQUEST BY RETRIEVING RESULTS FROM BOTH A NATIVE INDEX AND A VIRTUAL INDEX", issued on 25 Jul. 2013, U.S. patent application Ser. No. 14/266,832, entitled "PROCESSING A SYSTEM SEARCH REQUEST ACROSS DISPARATE DATA COLLECTION SYSTEMS", filed on 1 May 2014, and U.S. Pat. No. 9,514,189, entitles "PROCESSING A SYSTEM SEARCH REQUEST INCLUDING EXTERNAL DATA SOURCES", issued on 6 Dec. 2016, each of which is hereby incorporated by reference inits entirety for all purposes.

2.6.1 ERP Process Features

The ERP processes described above may include two operation modes: a streaming mode and a reporting mode. The ERP processes can operate in streaming mode only, in reporting mode only, or in both modes simultaneously. Operating in both modes simultaneously is referred to as mixed mode operation. In a mixed mode operation, the ERP at some point can stop providing the search head with streaming results and only provide reporting results thereafter, or the search head at some point may start ignoring streaming results it has been using and only use reporting results thereafter.

The streaming mode returns search results in real time, with minimal processing, in response to the search request. The reporting mode provides results of a search request with processing of the search results prior to providing them to the requesting search head, which in turn provides results to the requesting client device. ERP operation with such multiple modes provides greater performance flexibility with regard to report time, search latency, and resource utilization.

In a mixed mode operation, both streaming mode and reporting mode are operating simultaneously. The streaming mode results (e.g., the machine data obtained from the external data source) are provided to the search head, which can then process the results data (e.g., break the machine data into events, timestamp it, filter it, etc.) and integrate the results data with the results data from other external data sources, and/or from data stores of the search head. The search head performs such processing and can immediately start returning interim (streaming mode) results to the user at the requesting client device; simultaneously, the search head is waiting for the ERP process to process the data it is retrieving from the external data source as a result of the concurrently executing reporting mode.

In some instances, the ERP process initially operates in a mixed mode, such that the streaming mode operates to enable the ERP quickly to return interim results (e.g., some of the machined data or unprocessed data necessary to respond to a search request) to the search head, enabling the search head to process the interim results and begin providing to the client or search requester interim results that are responsive to the query. Meanwhile, in this mixed mode, the ERP also operates concurrently in reporting mode, processing portions of machine data in a manner responsive to the search query. Upon determining that it has results from the reporting mode available to return to the search head, the ERP may halt processing in the mixed mode at that time (or some later time) by stopping the return of data in streaming mode to the search head and switching to reporting mode only. The ERP at this point starts sending interim results in reporting mode to the search head, which in turn may then present this processed data responsive to the search request to the client or search requester. Typically the search head switches from using results from the ERP's streaming mode of operation to results from the ERP's reporting mode of operation when the higher bandwidth results from the reporting mode outstrip the amount of data processed by the search head in the streaming mode of ERP operation.

A reporting mode may have a higher bandwidth because the ERP does not have to spend time transferring data to the search head for processing all the machine data. In addition, the ERP may optionally direct another processor to do the processing.

The streaming mode of operation does not need to be stopped to gain the higher bandwidth benefits of a reporting mode; the search head could simply stop using the streaming mode results—and start using the reporting mode results—when the bandwidth of the reporting mode has caught up with or exceeded the amount of bandwidth provided by the streaming mode. Thus, a variety of triggers and ways to accomplish a search head's switch from using streaming mode results to using reporting mode results may be appreciated by one skilled in the art.

The reporting mode can involve the ERP process (or an external system) performing event breaking, time stamping, filtering of events to match the search query request, and calculating statistics on the results. The user can request particular types of data, such as if the search query itself involves types of events, or the search request may ask for statistics on data, such as on events that meet the search request. In either case, the search head understands the query language used in the received query request, which may be a proprietary language. One exemplary query language is Splunk Processing Language (SPL) developed by the assignee of the application, Splunk Inc. The search head typically understands how to use that language to obtain data from the indexers, which store data in a format used by the SPLUNK® Enterprise system.

The ERP processes support the search head, as the search head is not ordinarily configured to understand the format in which data is stored in external data sources such as Hadoop or SQL data systems. Rather, the ERP process performs that translation from the query submitted in the search support system's native format (e.g., SPL if SPLUNK® ENTERPRISE is used as the search support system) to a search query request format that will be accepted by the corresponding external data system. The external data system typically stores data in a different format from that of the search support system's native index format, and it utilizes a different query language (e.g., SQL or MapReduce, rather than SPL or the like).

As noted, the ERP process can operate in the streaming mode alone. After the ERP process has performed the translation of the query request and received raw results from the streaming mode, the search head can integrate the returned data with any data obtained from local data sources (e.g., native to the search support system), other external data sources, and other ERP processes (if such operations were required to satisfy the terms of the search query). An advantage of mixed mode operation is that, in addition to streaming mode, the ERP process is also executing concurrently in reporting mode. Thus, the ERP process (rather than the search head) is processing query results (e.g., performing event breaking, timestamping, filtering, possibly calculating statistics if required to be responsive to the search query request, etc.). It should be apparent to those skilled in the art that additional time is needed for the ERP process to perform the processing in such a configuration. Therefore, the streaming mode will allow the search head to start returning interim results to the user at the client device before the ERP process can complete sufficient processing to start returning any search results. The switchover between streaming and reporting mode happens when the ERP process determines that the switchover is appropriate, such as when the ERP process determines it can begin returning meaningful results from its reporting mode.

The operation described above illustrates the source of operational latency: streaming mode has low latency (immediate results) and usually has relatively low bandwidth (fewer results can be returned per unit of time). In contrast, the concurrently running reporting mode has relatively high latency (it has to perform a lot more processing before returning any results) and usually has relatively high bandwidth (more results can be processed per unit of time). For example, when the ERP process does begin returning report results, it returns more processed results than in the streaming mode, because, e.g., statistics only need to be calculated to be responsive to the search request. That is, the ERP process doesn't have to take time to first return machine data to the search head. As noted, the ERP process could be configured to operate in streaming mode alone and return just the machine data for the search head to process in a way that is responsive to the search request. Alternatively, the ERP process can be configured to operate in the reporting mode only. Also, the ERP process can be configured to operate in streaming mode and reporting mode concurrently, as described, with the ERP process stopping the transmission of streaming results to the search head when the concurrently running reporting mode has caught up and started providing results. The reporting mode does not require the processing of all machine data that is responsive to the search query request before the ERP process starts returning results; rather, the reporting mode usually performs processing of chunks of events and returns the processing results to the search head for each chunk.

For example, an ERP process can be configured to merely return the contents of a search result file verbatim, with little or no processing of results. That way, the search head performs all processing (such as parsing byte streams into events, filtering, etc.). The ERP process can be configured to perform additional intelligence, such as analyzing the search request and handling all the computation that a native search indexer process would otherwise perform. In this way, the configured ERP process provides greater flexibility in features while operating according to desired preferences, such as response latency and resource requirements.

2.7 Data Ingestion

Figure 5A:
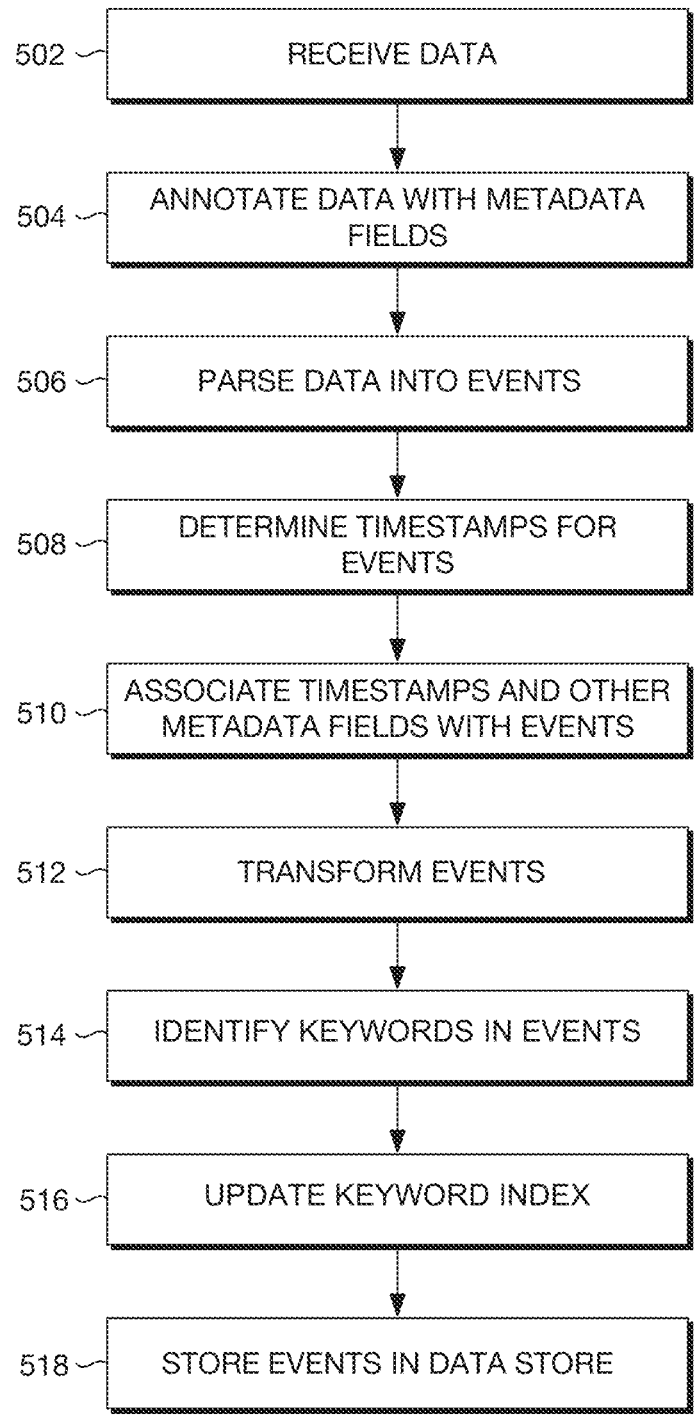
FIG. 5A is a flowchart of an example method that illustrates how indexers process, index, and store data received from forwarders, in accordance with example embodiments.

FIG. 5A is a flow chart of an example method that illustrates how indexers process, index, and store data received from forwarders, in accordance with example embodiments. The data flow illustrated in FIG. 5A is provided for illustrative purposes only; those skilled in the art would understand that one or more of the steps of the processes illustrated in FIG. 5A may be removed or that the ordering of the steps may be changed. Furthermore, for the purposes of illustrating a clear example, one or more particular system components are described in the context of performing various operations during each of the data flow stages. For example, a forwarder is described as receiving and processing machine data during an input phase; an indexer is described as parsing and indexing machine data during parsing and indexing phases; and a search head is described as performing a search query during a search phase. However, other system arrangements and distributions of the processing steps across system components may be used.

At block 502, a forwarder receives data from an input source, such as a data source 202 shown in FIG. 2. A forwarder initially may receive the data as a raw data stream generated by the input source. For example, a forwarder may receive a data stream from a log file generated by an application server, from a stream of network data from a network device, or from any other source of data. In some embodiments, a forwarder receives the raw data and may segment the data stream into "blocks", possibly of a uniform data size, to facilitate subsequent processing steps.

At block 504, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing steps. In some embodiments, a forwarder forwards the annotated data blocks to another system component (typically an indexer) for further processing.

The data intake and query system allows forwarding of data from one data intake and query instance to another, or even to a third-party system. The data intake and query system can employ different types of forwarders in a configuration.

In some embodiments, a forwarder may contain the essential components needed to forward data. A forwarder can gather data from a variety of inputs and forward the data to an indexer for indexing and searching. A forwarder can also tag metadata (e.g., source, source type, host, etc.).

In some embodiments, a forwarder has the capabilities of the aforementioned forwarder as well as additional capabilities. The forwarder can parse data before forwarding the data (e.g., can associate a time stamp with a portion of data and create an event, etc.) and can route data based on criteria such as source or type of event. The forwarder can also index data locally while forwarding the data to another indexer.

2.7.2 Parsing

At block 506, an indexer receives data blocks from a forwarder and parses the data to organize the data into events. In some embodiments, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer to automatically determine the boundaries within the received data that indicate the portions of machine data for events. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, the indexer can apply an inferred source type definition to the data to create the events.

At block 508, the indexer determines a timestamp for each event. Similar to the process for parsing machine data, an indexer may again refer to a source type definition associated with the data to locate one or more properties that indicate instructions for determining a timestamp for each event. The properties may, for example, instruct an indexer to extract a time value from a portion of data for the event, to interpolate time values based on timestamps associated with temporally proximate events, to create a timestamp based on a time the portion of machine data was received or generated, to use the timestamp of a previous event, or use any other rules for determining timestamps.

At block 510, the indexer associates with each event one or more metadata fields including a field containing the timestamp determined for the event. In some embodiments, a timestamp may be included in the metadata fields. These metadata fields may include any number of "default fields" that are associated with all events, and may also include one more custom fields as defined by a user. Similar to the metadata fields associated with the data blocks at block 504, the default metadata fields associated with each event may include a host, source, and source type field including or in addition to a field storing the timestamp.

At block 512, an indexer may optionally apply one or more transformations to data included in the events created at block 506. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to events may, for example, be specified in one or more configuration files and referenced by one or more source type definitions.

FIG. 5C illustrates an illustrative example of machine data can be stored in a data store in accordance with various disclosed embodiments. In other embodiments, machine data can be stored in a flat file in a corresponding bucket with an associated index file, such as a time series index or "TSIDX." As such, the depiction of machine data and associated metadata as rows and columns in the table of FIG. 5C is merely illustrative and is not intended to limit the data format in which the machine data and metadata is stored in various embodiments described herein. In one particular embodiment, machine data can be stored in a compressed or encrypted formatted. In such embodiments, the machine data can be stored with or be associated with data that describes the compression or encryption scheme with which the machine data is stored. The information about the compression or encryption scheme can be used to decompress or decrypt the machine data, and any metadata with which it is stored, at search time.

As mentioned above, certain metadata, e.g., host 536, source 537, source type 538 and timestamps 535 can be generated for each event, and associated with a corresponding portion of machine data 539 when storing the event data in a data store, e.g., data store 208. Any of the metadata can be extracted from the corresponding machine data, or supplied or defined by an entity, such as a user or computer system. The metadata fields can become part of or stored with the event. Note that while the time-stamp metadata field can be extracted from the raw data of each event, the values for the other metadata fields may be determined by the indexer based on information it receives pertaining to the source of the data separate from the machine data.

While certain default or user-defined metadata fields can be extracted from the machine data for indexing purposes, all the machine data within an event can be maintained in its original condition. As such, in embodiments in which the portion of machine data included in an event is unprocessed or otherwise unaltered, it is referred to herein as a portion of raw machine data. In other embodiments, the port of machine data in an event can be processed or otherwise altered. As such, unless certain information needs to be removed for some reasons (e.g. extraneous information, confidential information), all the raw machine data contained in an event can be preserved and saved in its original form. Accordingly, the data store in which the event records are stored is sometimes referred to as a "raw record data store." The raw record data store contains a record of the raw event data tagged with the various default fields.

In FIG. 5C, the first three rows of the table represent events 531, 532, and 533 and are related to a server access log that records requests from multiple clients processed by a server, as indicated by entry of "access.log" in the source column 536.

In the example shown in FIG. 5C, each of the events 531-534 is associated with a discrete request made from a client device. The raw machine data generated by the server and extracted from a server access log can include the IP address of the client 540, the user id of the person requesting the document 541, the time the server finished processing the request 542, the request line from the client 543, the status code returned by the server to the client 545, the size of the object returned to the client (in this case, the gif file requested by the client) 546 and the time spent to serve the request in microseconds 544. As seen in FIG. 5C, all the raw machine data retrieved from the server access log is retained and stored as part of the corresponding events, 1221, 1222, and 1223 in the data store.

Event 534 is associated with an entry in a server error log, as indicated by "error.log" in the source column 537, that records errors that the server encountered when processing a client request. Similar to the events related to the server access log, all the raw machine data in the error log file pertaining to event 534 can be preserved and stored as part of the event 534.

Saving minimally processed or unprocessed machine data in a data store associated with metadata fields in the manner similar to that shown in FIG. 5C is advantageous because it allows search of all the machine data at search time instead of searching only previously specified and identified fields or field-value pairs. As mentioned above, because data structures used by various embodiments of the present disclosure maintain the underlying raw machine data and use a late-binding schema for searching the raw machines data, it enables a user to continue investigating and learn valuable insights about the raw data. In other words, the user is not compelled to know about all the fields of information that will be needed at data ingestion time. As a user learns more about the data in the events, the user can continue to refine the late-binding schema by defining new extraction rules, or modifying or deleting existing extraction rules used by the system.

2.7.3 Indexing

At blocks 514 and 516, an indexer can optionally generate a keyword index to facilitate fast keyword searching for events. To build a keyword index, at block 514, the indexer identifies a set of keywords in each event. At block 516, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for field name-value pairs found in events, where a field name-value pair can include a pair of keywords connected by a symbol, such as an equals sign or colon. This way, events containing these field name-value pairs can be quickly located. In some embodiments, fields can automatically be generated for some or all of the field names of the field name-value pairs at the time of indexing. For example, if the string "dest=10.0.1.2" is found in an event, a field named "dest" may be created for the event, and assigned a value of "10.0.1.2".

At block 518, the indexer stores the events with an associated timestamp in a data store 208. Timestamps enable a user to search for events based on a time range. In some embodiments, the stored events are organized into "buckets," where each bucket stores events associated with a specific time range based on the timestamps associated with each event. This improves time-based searching, as well as allows for events with recent timestamps, which may have a higher likelihood of being accessed, to be stored in a faster memory to facilitate faster retrieval. For example, buckets containing the most recent events can be stored in flash memory rather than on a hard disk. In some embodiments, each bucket may be associated with an identifier, a time range, and a size constraint.

Each indexer 206 may be responsible for storing and searching a subset of the events contained in a corresponding data store 208. By distributing events among the indexers and data stores, the indexers can analyze events for a query in parallel. For example, using map-reduce techniques, each indexer returns partial responses for a subset of events to a search head that combines the results to produce an answer for the query. By storing events in buckets for specific time ranges, an indexer may further optimize the data retrieval process by searching buckets corresponding to time ranges that are relevant to a query.

In some embodiments, each indexer has a home directory and a cold directory. The home directory of an indexer stores hot buckets and warm buckets, and the cold directory of an indexer stores cold buckets. A hot bucket is a bucket that is capable of receiving and storing events. A warm bucket is a bucket that can no longer receive events for storage but has not yet been moved to the cold directory. A cold bucket is a bucket that can no longer receive events and may be a bucket that was previously stored in the home directory. The home directory may be stored in faster memory, such as flash memory, as events may be actively written to the home directory, and the home directory may typically store events that are more frequently searched and thus are accessed more frequently. The cold directory may be stored in slower and/or larger memory, such as a hard disk, as events are no longer being written to the cold directory, and the cold directory may typically store events that are not as frequently searched and thus are accessed less frequently. In some embodiments, an indexer may also have a quarantine bucket that contains events having potentially inaccurate information, such as an incorrect time stamp associated with the event or a time stamp that appears to be an unreasonable time stamp for the corresponding event. The quarantine bucket may have events from any time range; as such, the quarantine bucket may always be searched at search time. Additionally, an indexer may store old, archived data in a frozen bucket that is not capable of being searched at search time. In some embodiments, a frozen bucket may be stored in slower and/or larger memory, such as a hard disk, and may be stored in offline and/or remote storage.

Moreover, events and buckets can also be replicated across different indexers and data stores to facilitate high availability and disaster recovery as described in U.S. Pat. No. 9,130,971, entitled "Site-Based Search Affinity", issued on 8 Sep. 2015, and in U.S. patent Ser. No. 14/266,817, entitled "Multi-Site Clustering", issued on 1 Sep. 2015, each of which is hereby incorporated by reference in its entirety for all purposes.

Figure 5B:
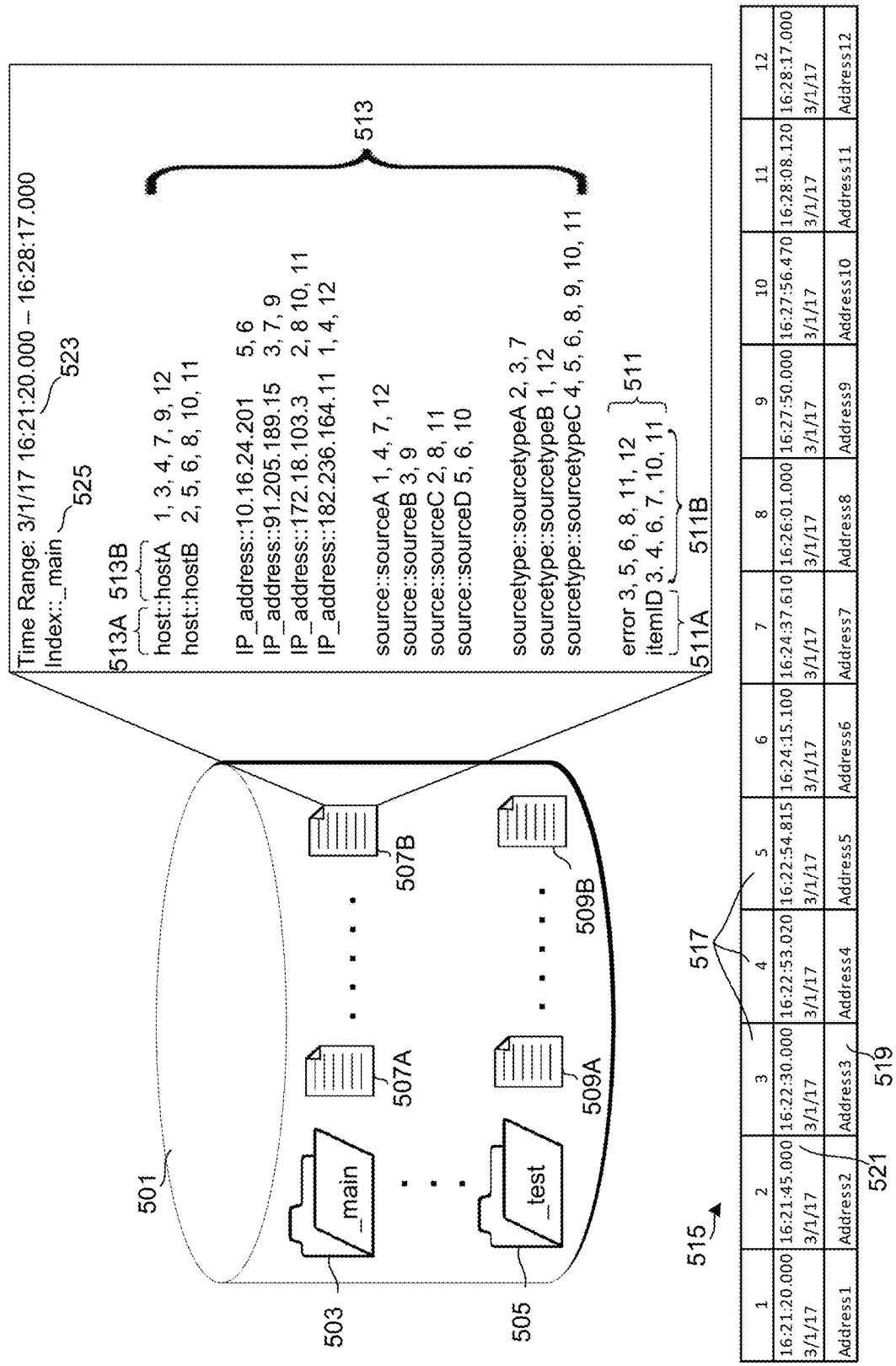
FIG. 5B is a block diagram of a data structure in which time-stamped event data can be stored in a data store, in accordance with example embodiments.

FIG. 5B is a block diagram of an example data store 501 that includes a directory for each index (or partition) that contains a portion of data managed by an indexer. FIG. 5B further illustrates details of an embodiment of an inverted index 507B and an event reference array 515 associated with inverted index 507B.

The data store 501 can correspond to a data store 208 that stores events managed by an indexer 206 or can correspond to a different data store associated with an indexer 206. In the illustrated embodiment, the data store 501 includes a_main directory 503 associated with a_main index and a_test directory 505 associated with a_test index. However, the data store 501 can include fewer or more directories. In some embodiments, multiple indexes can share a single directory or all indexes can share a common directory. Additionally, although illustrated as a single data store 501, it will be understood that the data store 501 can be implemented as multiple data stores storing different portions of the information shown in FIG. 5B. For example, a single index or partition can span multiple directories or multiple data stores, and can be indexed or searched by multiple corresponding indexers.

In the illustrated embodiment of FIG. 5B, the index-specific directories 503 and 505 include inverted indexes 507A, 507B and 509A, 509B, respectively. The inverted indexes 507A . . . 507B, and 509A . . . 509B can be keyword indexes or field-value pair indexes described herein and can include less or more information that depicted in FIG. 5B.

In some embodiments, the inverted index 507A . . . 507B, and 509A . . . 509B can correspond to a distinct time-series bucket that is managed by the indexer 206 and that contains events corresponding to the relevant index (e.g., _main index, _test index). As such, each inverted index can correspond to a particular range of time for an index. Additional files, such as high performance indexes for each time-series bucket of an index, can also be stored in the same directory as the inverted indexes 507A . . . 507B, and 509A . . . 509B. In some embodiments inverted index 507A . . . 507B, and 509A . . . 509B can correspond to multiple time-series buckets or inverted indexes 507A . . . 507B, and 509A . . . 509B can correspond to a single time-series bucket.

Each inverted index 507A . . . 507B, and 509A . . . 509B can include one or more entries, such as keyword (or token) entries or field-value pair entries. Furthermore, in certain embodiments, the inverted indexes 507A . . . 507B, and 509A . . . 509B can include additional information, such as a time range 523 associated with the inverted index or an index identifier 525 identifying the index associated with the inverted index 507A . . . 507B, and 509A . . . 509B. However, each inverted index 507A . . . 507B, and 509A . . . 509B can include less or more information than depicted.

Token entries, such as token entries 511 illustrated in inverted index 507B, can include a token 511A (e.g., "error," "itemID," etc.) and event references 511B indicative of events that include the token. For example, for the token "error," the corresponding token entry includes the token "error" and an event reference, or unique identifier, for each event stored in the corresponding time-series bucket that includes the token "error." In the illustrated embodiment of FIG. 5B, the error token entry includes the identifiers 3, 5, 6, 8, 11, and 12 corresponding to events managed by the indexer 206 and associated with the index_main 503 that are located in the time-series bucket associated with the inverted index 507B.

In some cases, some token entries can be default entries, automatically determined entries, or user specified entries. In some embodiments, the indexer 206 can identify each word or string in an event as a distinct token and generate a token entry for it. In some cases, the indexer 206 can identify the beginning and ending of tokens based on punctuation, spaces, as described in greater detail herein. In certain cases, the indexer 206 can rely on user input or a configuration file to identify tokens for token entries 511, etc. It will be understood that any combination of token entries can be included as a default, automatically determined, or included based on user-specified criteria.

Similarly, field-value pair entries, such as field-value pair entries 513 shown in inverted index 507B, can include a field-value pair 513A and event references 513B indicative of events that include a field value that corresponds to the field-value pair. For example, for a field-value pair sourcetype::sendmail, a field-value pair entry would include the field-value pair sourcetype::sendmail and a unique identifier, or event reference, for each event stored in the corresponding time-series bucket that includes a sendmail sourcetype.

In some cases, the field-value pair entries 513 can be default entries, automatically determined entries, or user specified entries. As a non-limiting example, the field-value pair entries for the fields host, source, sourcetype can be included in the inverted indexes 507A . . . 507B, and 509A . . . 509B as a default. As such, all of the inverted indexes 507A . . . 507B, and 509A . . . 509B can include field-value pair entries for the fields host, source, sourcetype. As yet another non-limiting example, the field-value pair entries for the IP_address field can be user specified and may only appear in the inverted index 507B based on user-specified criteria. As another non-limiting example, as the indexer indexes the events, it can automatically identify field-value pairs and create field-value pair entries. For example, based on the indexers review of events, it can identify IP_address as a field in each event and add the IP_address field-value pair entries to the inverted index 507B. It will be understood that any combination of field-value pair entries can be included as a default, automatically determined, or included based on user-specified criteria.

Each unique identifier 517, or event reference, can correspond to a unique event located in the time series bucket. However, the same event reference can be located in multiple entries. For example if an event has a sourcetype splunkd, host www1 and token "warning," then the unique identifier for the event will appear in the field-value pair entries sourcetype::splunkd and host::www1, as well as the token entry "warning." With reference to the illustrated embodiment of FIG. 5B and the event that corresponds to the event reference 3, the event reference 3 is found in the field-value pair entries 513 host::hostA, source::sourceB, sourcetype::sourcetypeA, and IP_address::91.205.189.15 indicating that the event corresponding to the event references is from hostA, sourceB, of sourcetypeA, and includes 91.205.189.15 in the event data.

For some fields, the unique identifier is located in only one field-value pair entry for a particular field. For example, the inverted index may include four sourcetype field-value pair entries corresponding to four different sourcetypes of the events stored in a bucket (e.g., sourcetypes: sendmail, splunkd, web_access, and web_service). Within those four sourcetype field-value pair entries, an identifier for a particular event may appear in only one of the field-value pair entries. With continued reference to the example illustrated embodiment of FIG. 5B, since the event reference 7 appears in the field-value pair entry sourcetype::sourcetypeA, then it does not appear in the other field-value pair entries for the sourcetype field, including sourcetype::sourcetypeB, sourcetype::sourcetypeC, and sourcetype::sourcetypeD.

The event references 517 can be used to locate the events in the corresponding bucket. For example, the inverted index can include, or be associated with, an event reference array 515. The event reference array 515 can include an array entry 517 for each event reference in the inverted index 507B. Each array entry 517 can include location information 519 of the event corresponding to the unique identifier (non-limiting example: seek address of the event), a timestamp 521 associated with the event, or additional information regarding the event associated with the event reference, etc.

For each token entry 511 or field-value pair entry 513, the event reference 501B or unique identifiers can be listed in chronological order or the value of the event reference can be assigned based on chronological data, such as a timestamp associated with the event referenced by the event reference. For example, the event reference 1 in the illustrated embodiment of FIG. 5B can correspond to the first-in-time event for the bucket, and the event reference 12 can correspond to the last-in-time event for the bucket. However, the event references can be listed in any order, such as reverse chronological order, ascending order, descending order, or some other order, etc. Further, the entries can be sorted. For example, the entries can be sorted alphabetically (collectively or within a particular group), by entry origin (e.g., default, automatically generated, user-specified, etc.), by entry type (e.g., field-value pair entry, token entry, etc.), or chronologically by when added to the inverted index, etc. In the illustrated embodiment of FIG. 5B, the entries are sorted first by entry type and then alphabetically.

As a non-limiting example of how the inverted indexes 507A . . . 507B, and 509A . . . 509B can be used during a data categorization request command, the indexers can receive filter criteria indicating data that is to be categorized and categorization criteria indicating how the data is to be categorized. Example filter criteria can include, but is not limited to, indexes (or partitions), hosts, sources, sourcetypes, time ranges, field identifier, keywords, etc.

Using the filter criteria, the indexer identifies relevant inverted indexes to be searched. For example, if the filter criteria includes a set of partitions, the indexer can identify the inverted indexes stored in the directory corresponding to the particular partition as relevant inverted indexes. Other means can be used to identify inverted indexes associated with a partition of interest. For example, in some embodiments, the indexer can review an entry in the inverted indexes, such as an index-value pair entry 513 to determine if a particular inverted index is relevant. If the filter criteria does not identify any partition, then the indexer can identify all inverted indexes managed by the indexer as relevant inverted indexes.

Similarly, if the filter criteria includes a time range, the indexer can identify inverted indexes corresponding to buckets that satisfy at least a portion of the time range as relevant inverted indexes. For example, if the time range is last hour then the indexer can identify all inverted indexes that correspond to buckets storing events associated with timestamps within the last hour as relevant inverted indexes.

When used in combination, an index filter criterion specifying one or more partitions and a time range filter criterion specifying a particular time range can be used to identify a subset of inverted indexes within a particular directory (or otherwise associated with a particular partition) as relevant inverted indexes. As such, the indexer can focus the processing to only a subset of the total number of inverted indexes that the indexer manages.

Once the relevant inverted indexes are identified, the indexer can review them using any additional filter criteria to identify events that satisfy the filter criteria. In some cases, using the known location of the directory in which the relevant inverted indexes are located, the indexer can determine that any events identified using the relevant inverted indexes satisfy an index filter criterion. For example, if the filter criteria includes a partition main, then the indexer can determine that any events identified using inverted indexes within the partition main directory (or otherwise associated with the partition main) satisfy the index filter criterion.

Furthermore, based on the time range associated with each inverted index, the indexer can determine that that any events identified using a particular inverted index satisfies a time range filter criterion. For example, if a time range filter criterion is for the last hour and a particular inverted index corresponds to events within a time range of 50 minutes ago to 35 minutes ago, the indexer can determine that any events identified using the particular inverted index satisfy the time range filter criterion. Conversely, if the particular inverted index corresponds to events within a time range of 59 minutes ago to 62 minutes ago, the indexer can determine that some events identified using the particular inverted index may not satisfy the time range filter criterion.

Using the inverted indexes, the indexer can identify event references (and therefore events) that satisfy the filter criteria. For example, if the token "error" is a filter criterion, the indexer can track all event references within the token entry "error." Similarly, the indexer can identify other event references located in other token entries or field-value pair entries that match the filter criteria. The system can identify event references located in all of the entries identified by the filter criteria. For example, if the filter criteria include the token "error" and field-value pair sourcetype::web_ui, the indexer can track the event references found in both the token entry "error" and the field-value pair entry sourcetype::web_ui. As mentioned previously, in some cases, such as when multiple values are identified for a particular filter criterion (e.g., multiple sources for a source filter criterion), the system can identify event references located in at least one of the entries corresponding to the multiple values and in all other entries identified by the filter criteria. The indexer can determine that the events associated with the identified event references satisfy the filter criteria.

In some cases, the indexer can further consult a timestamp associated with the event reference to determine whether an event satisfies the filter criteria. For example, if an inverted index corresponds to a time range that is partially outside of a time range filter criterion, then the indexer can consult a timestamp associated with the event reference to determine whether the corresponding event satisfies the time range criterion. In some embodiments, to identify events that satisfy a time range, the indexer can review an array, such as the event reference array 1614 that identifies the time associated with the events. Furthermore, as mentioned above using the known location of the directory in which the relevant inverted indexes are located (or other index identifier), the indexer can determine that any events identified using the relevant inverted indexes satisfy the index filter criterion.

In some cases, based on the filter criteria, the indexer reviews an extraction rule. In certain embodiments, if the filter criteria includes a field name that does not correspond to a field-value pair entry in an inverted index, the indexer can review an extraction rule, which may be located in a configuration file, to identify a field that corresponds to a field-value pair entry in the inverted index.

For example, the filter criteria includes a field name "sessionID" and the indexer determines that at least one relevant inverted index does not include a field-value pair entry corresponding to the field name sessionID, the indexer can review an extraction rule that identifies how the sessionID field is to be extracted from a particular host, source, or sourcetype (implicitly identifying the particular host, source, or sourcetype that includes a sessionID field). The indexer can replace the field name "sessionID" in the filter criteria with the identified host, source, or sourcetype. In some cases, the field name "sessionID" may be associated with multiples hosts, sources, or sourcetypes, in which case, all identified hosts, sources, and sourcetypes can be added as filter criteria. In some cases, the identified host, source, or sourcetype can replace or be appended to a filter criterion, or be excluded. For example, if the filter criteria includes a criterion for source S1 and the "sessionID" field is found in source S2, the source S2 can replace S1 in the filter criteria, be appended such that the filter criteria includes source S1 and source S2, or be excluded based on the presence of the filter criterion source S1. If the identified host, source, or sourcetype is included in the filter criteria, the indexer can then identify a field-value pair entry in the inverted index that includes a field value corresponding to the identity of the particular host, source, or sourcetype identified using the extraction rule.

Once the events that satisfy the filter criteria are identified, the system, such as the indexer 206 can categorize the results based on the categorization criteria. The categorization criteria can include categories for grouping the results, such as any combination of partition, source, sourcetype, or host, or other categories or fields as desired.

The indexer can use the categorization criteria to identify categorization criteria-value pairs or categorization criteria values by which to categorize or group the results. The categorization criteria-value pairs can correspond to one or more field-value pair entries stored in a relevant inverted index, one or more index-value pairs based on a directory in which the inverted index is located or an entry in the inverted index (or other means by which an inverted index can be associated with a partition), or other criteria-value pair that identifies a general category and a particular value for that category. The categorization criteria values can correspond to the value portion of the categorization criteria-value pair.

As mentioned, in some cases, the categorization criteria-value pairs can correspond to one or more field-value pair entries stored in the relevant inverted indexes. For example, the categorization criteria-value pairs can correspond to field-value pair entries of host, source, and sourcetype (or other field-value pair entry as desired). For instance, if there are ten different hosts, four different sources, and five different sourcetypes for an inverted index, then the inverted index can include ten host field-value pair entries, four source field-value pair entries, and five sourcetype field-value pair entries. The indexer can use the nineteen distinct field-value pair entries as categorization criteria-value pairs to group the results.

Specifically, the indexer can identify the location of the event references associated with the events that satisfy the filter criteria within the field-value pairs, and group the event references based on their location. As such, the indexer can identify the particular field value associated with the event corresponding to the event reference. For example, if the categorization criteria include host and sourcetype, the host field-value pair entries and sourcetype field-value pair entries can be used as categorization criteria-value pairs to identify the specific host and sourcetype associated with the events that satisfy the filter criteria.

In addition, as mentioned, categorization criteria-value pairs can correspond to data other than the field-value pair entries in the relevant inverted indexes. For example, if partition or index is used as a categorization criterion, the inverted indexes may not include partition field-value pair entries. Rather, the indexer can identify the categorization criteria-value pair associated with the partition based on the directory in which an inverted index is located, information in the inverted index, or other information that associates the inverted index with the partition, etc. As such a variety of methods can be used to identify the categorization criteria-value pairs from the categorization criteria.

Accordingly based on the categorization criteria (and categorization criteria-value pairs), the indexer can generate groupings based on the events that satisfy the filter criteria. As a non-limiting example, if the categorization criteria includes a partition and sourcetype, then the groupings can correspond to events that are associated with each unique combination of partition and sourcetype. For instance, if there are three different partitions and two different sourcetypes associated with the identified events, then the six different groups can be formed, each with a unique partition value-sourcetype value combination. Similarly, if the categorization criteria includes partition, sourcetype, and host and there are two different partitions, three sourcetypes, and five hosts associated with the identified events, then the indexer can generate up to thirty groups for the results that satisfy the filter criteria. Each group can be associated with a unique combination of categorization criteria-value pairs (e.g., unique combinations of partition value sourcetype value, and host value).

In addition, the indexer can count the number of events associated with each group based on the number of events that meet the unique combination of categorization criteria for a particular group (or match the categorization criteria-value pairs for the particular group). With continued reference to the example above, the indexer can count the number of events that meet the unique combination of partition, sourcetype, and host for a particular group.

Each indexer communicates the groupings to the search head. The search head can aggregate the groupings from the indexers and provide the groupings for display. In some cases, the groups are displayed based on at least one of the host, source, sourcetype, or partition associated with the groupings. In some embodiments, the search head can further display the groups based on display criteria, such as a display order or a sort order as described in greater detail above.

As a non-limiting example and with reference to FIG. 5B, consider a request received by an indexer 206 that includes the following filter criteria: keyword=error, partition=_main, time range=3/1/17 16:22.00.000-16: 28.00.000, sourcetype=sourcetypeC, host=hostB, and the following categorization criteria: source.

Based on the above criteria, the indexer 206 identifies_ main directory 503 and can ignore_test directory 505 and any other partition-specific directories. The indexer determines that inverted partition 507B is a relevant partition based on its location within the_main directory 503 and the time range associated with it. For sake of simplicity in this example, the indexer 206 determines that no other inverted indexes in the_main directory 503, such as inverted index 507A satisfy the time range criterion.

Having identified the relevant inverted index 507B, the indexer reviews the token entries 511 and the field-value pair entries 513 to identify event references, or events, that satisfy all of the filter criteria.

With respect to the token entries 511, the indexer can review the error token entry and identify event references 3, 5, 6, 8, 11, 12, indicating that the term "error" is found in the corresponding events. Similarly, the indexer can identify event references 4, 5, 6, 8, 9, 10, 11 in the field-value pair entry sourcetype::sourcetypeC and event references 2, 5, 6, 8, 10, 11 in the field-value pair entry host::hostB. As the filter criteria did not include a source or an IP_address field-value pair, the indexer can ignore those field-value pair entries.

In addition to identifying event references found in at least one token entry or field-value pair entry (e.g., event references 3, 4, 5, 6, 8, 9, 10, 11, 12), the indexer can identify events (and corresponding event references) that satisfy the time range criterion using the event reference array 1614 (e.g., event references 2, 3, 4, 5, 6, 7, 8, 9, 10). Using the information obtained from the inverted index 507B (including the event reference array 515), the indexer 206 can identify the event references that satisfy all of the filter criteria (e.g., event references 5, 6, 8).

Having identified the events (and event references) that satisfy all of the filter criteria, the indexer 206 can group the event references using the received categorization criteria (source). In doing so, the indexer can determine that event references 5 and 6 are located in the field-value pair entry source::sourceD (or have matching categorization criteria-value pairs) and event reference 8 is located in the field-value pair entry source::sourceC. Accordingly, the indexer can generate a sourceC group having a count of one corresponding to reference 8 and a sourceD group having a count of two corresponding to references 5 and 6. This information can be communicated to the search head. In turn the search head can aggregate the results from the various indexers and display the groupings. As mentioned above, in some embodiments, the groupings can be displayed based at least in part on the categorization criteria, including at least one of host, source, sourcetype, or partition.

It will be understood that a change to any of the filter criteria or categorization criteria can result in different groupings. As a one non-limiting example, a request received by an indexer 206 that includes the following filter criteria: partition=_main, time range=3/1/17 3/1/17 16:21: 20.000-16:28:17.000, and the following categorization criteria: host, source, sourcetype would result in the indexer identifying event references 1-12 as satisfying the filter criteria. The indexer would then generate up to 24 groupings corresponding to the 24 different combinations of the categorization criteria-value pairs, including host (hostA, hostB), source (sourceA, sourceB, sourceC, sourceD), and sourcetype (sourcetypeA, sourcetypeB, sourcetypeC). However, as there are only twelve events identifiers in the illustrated embodiment and some fall into the same grouping, the indexer generates eight groups and counts as follows:

Group 1 (hostA, sourceA, sourcetypeA): 1 (event reference 7)

Group 2 (hostA, sourceA, sourcetypeB): 2 (event references 1, 12)

Group 3 (hostA, sourceA, sourcetypeC): 1 (event reference 4)

Group 4 (hostA, sourceB, sourcetypeA): 1 (event reference 3)

Group 5 (hostA, sourceB, sourcetypeC): 1 (event reference 9)

Group 6 (hostB, sourceC, sourcetypeA): 1 (event reference 2)

Group 7 (hostB, sourceC, sourcetypeC): 2 (event references 8, 11)

Group 8 (hostB, sourceD, sourcetypeC): 3 (event references 5, 6, 10)

As noted, each group has a unique combination of categorization criteria-value pairs or categorization criteria values. The indexer communicates the groups to the search head for aggregation with results received from other indexers. In communicating the groups to the search head, the indexer can include the categorization criteria-value pairs for each group and the count. In some embodiments, the indexer can include more or less information. For example, the indexer can include the event references associated with each group and other identifying information, such as the indexer or inverted index used to identify the groups.

As another non-limiting examples, a request received by an indexer 206 that includes the following filter criteria: partition=_main, time range=3/1/17 3/1/17 16:21:20.000- 16:28:17.000, source=sourceA, sourceD, and keyword=itemID and the following categorization criteria: host, source, sourcetype would result in the indexer identifying event references 4, 7, and 10 as satisfying the filter criteria, and generate the following groups:

Group 1 (hostA, sourceA, sourcetypeC): 1 (event reference 4)

Group 2 (hostA, sourceA, sourcetypeA): 1 (event reference 7)

Group 3 (hostB, sourceD, sourcetypeC): 1 (event references 10)

The indexer communicates the groups to the search head for aggregation with results received from other indexers. As will be understand there are myriad ways for filtering and categorizing the events and event references. For example, the indexer can review multiple inverted indexes associated with a partition or review the inverted indexes of multiple partitions, and categorize the data using any one or any combination of partition, host, source, sourcetype, or other category, as desired.

Further, if a user interacts with a particular group, the indexer can provide additional information regarding the group. For example, the indexer can perform a targeted search or sampling of the events that satisfy the filter criteria and the categorization criteria for the selected group, also referred to as the filter criteria corresponding to the group or filter criteria associated with the group.

In some cases, to provide the additional information, the indexer relies on the inverted index. For example, the indexer can identify the event references associated with the events that satisfy the filter criteria and the categorization criteria for the selected group and then use the event reference array 515 to access some or all of the identified events. In some cases, the categorization criteria values or categorization criteria-value pairs associated with the group become part of the filter criteria for the review.

With reference to FIG. 5B for instance, suppose a group is displayed with a count of six corresponding to event references 4, 5, 6, 8, 10, 11 (i.e., event references 4, 5, 6, 8, 10, 11 satisfy the filter criteria and are associated with matching categorization criteria values or categorization criteria-value pairs) and a user interacts with the group (e.g., selecting the group, clicking on the group, etc.). In response, the search head communicates with the indexer to provide additional information regarding the group.

In some embodiments, the indexer identifies the event references associated with the group using the filter criteria and the categorization criteria for the group (e.g., categorization criteria values or categorization criteria-value pairs unique to the group). Together, the filter criteria and the categorization criteria for the group can be referred to as the filter criteria associated with the group. Using the filter criteria associated with the group, the indexer identifies event references 4, 5, 6, 8, 10, 11.

Based on a sampling criteria, discussed in greater detail above, the indexer can determine that it will analyze a sample of the events associated with the event references 4, 5, 6, 8, 10, 11. For example, the sample can include analyzing event data associated with the event references 5, 8, 10. In some embodiments, the indexer can use the event reference array 1616 to access the event data associated with the event references 5, 8, 10. Once accessed, the indexer can compile the relevant information and provide it to the search head for aggregation with results from other indexers. By identifying events and sampling event data using the inverted indexes, the indexer can reduce the amount of actual data this is analyzed and the number of events that are accessed in order to generate the summary of the group and provide a response in less time.

2.8 Query Processing

Figure 6A:
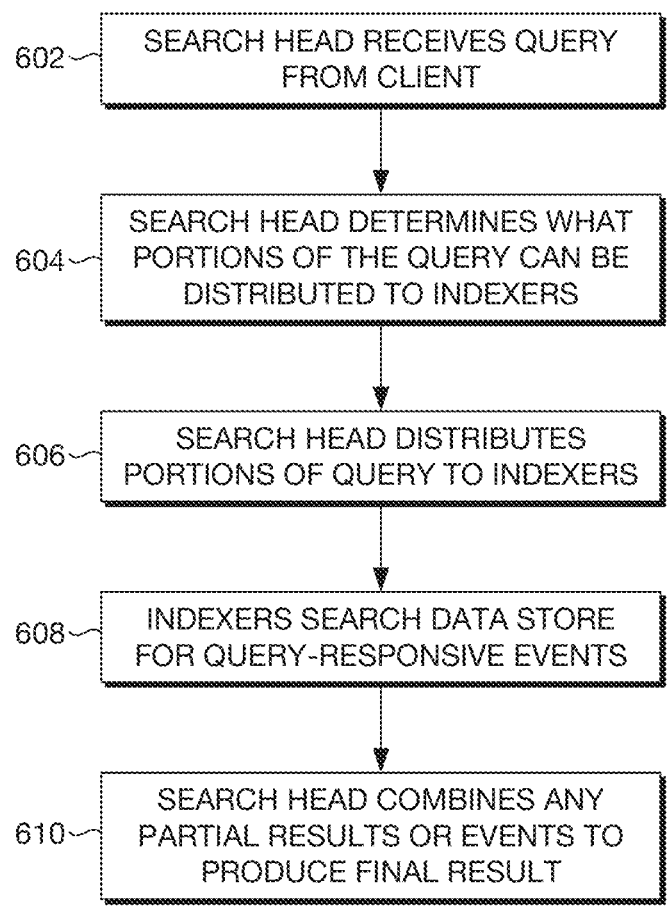
FIG. 6A is a flow diagram of an example method that illustrates how a search head and indexers perform a search query, in accordance with example embodiments.

FIG. 6A is a flow diagram of an example method that illustrates how a search head and indexers perform a search query, in accordance with example embodiments. At block 602, a search head receives a search query from a client. At block 604, the search head analyzes the search query to determine what portion(s) of the query can be delegated to indexers and what portions of the query can be executed locally by the search head. At block 606, the search head distributes the determined portions of the query to the appropriate indexers. In some embodiments, a search head cluster may take the place of an independent search head where each search head in the search head cluster coordinates with peer search heads in the search head cluster to schedule jobs, replicate search results, update configurations, fulfill search requests, etc. In some embodiments, the search head (or each search head) communicates with a master node (also known as a cluster master, not shown in FIG. 2) that provides the search head with a list of indexers to which the search head can distribute the determined portions of the query. The master node maintains a list of active indexers and can also designate which indexers may have responsibility for responding to queries over certain sets of events. A search head may communicate with the master node before the search head distributes queries to indexers to discover the addresses of active indexers.

At block 608, the indexers to which the query was distributed, search data stores associated with them for events that are responsive to the query. To determine which events are responsive to the query, the indexer searches for events that match the criteria specified in the query. These criteria can include matching keywords or specific values for certain fields. The searching operations at block 608 may use the late-binding schema to extract values for specified fields from events at the time the query is processed. In some embodiments, one or more rules for extracting field values may be specified as part of a source type definition in a configuration file. The indexers may then either send the relevant events back to the search head, or use the events to determine a partial result, and send the partial result back to the search head.

At block 610, the search head combines the partial results and/or events received from the indexers to produce a final result for the query. In some examples, the results of the query are indicative of performance or security of the IT environment and may help improve the performance of components in the IT environment. This final result may comprise different types of data depending on what the query requested. For example, the results can include a listing of matching events returned by the query, or some type of visualization of the data from the returned events. In another example, the final result can include one or more calculated values derived from the matching events.

The results generated by the system 108 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries, which may be particularly helpful for queries that are performed on a periodic basis.

2.9 Pipelined Search Language

Various embodiments of the present disclosure can be implemented using, or in conjunction with, a pipelined command language. A pipelined command language is a language in which a set of inputs or data is operated on by a first command in a sequence of commands, and then subsequent commands in the order they are arranged in the sequence. Such commands can include any type of functionality for operating on data, such as retrieving, searching, filtering, aggregating, processing, transmitting, and the like. As described herein, a query can thus be formulated in a pipelined command language and include any number of ordered or unordered commands for operating on data.

Splunk Processing Language (SPL) is an example of a pipelined command language in which a set of inputs or data is operated on by any number of commands in a particular sequence. A sequence of commands, or command sequence, can be formulated such that the order in which the commands are arranged defines the order in which the commands are applied to a set of data or the results of an earlier executed command. For example, a first command in a command sequence can operate to search or filter for specific data in particular set of data. The results of the first command can then be passed to another command listed later in the command sequence for further processing.

In various embodiments, a query can be formulated as a command sequence defined in a command line of a search UI. In some embodiments, a query can be formulated as a sequence of SPL commands. Some or all of the SPL commands in the sequence of SPL commands can be separated from one another by a pipe symbol "|". In such embodiments, a set of data, such as a set of events, can be operated on by a first SPL command in the sequence, and then a subsequent SPL command following a pipe symbol "|" after the first SPL command operates on the results produced by the first SPL command or other set of data, and so on for any additional SPL commands in the sequence. As such, a query formulated using SPL comprises a series of consecutive commands that are delimited by pipe "|" characters. The pipe character indicates to the system that the output or result of one command (to the left of the pipe) should be used as the input for one of the subsequent commands (to the right of the pipe). This enables formulation of queries defined by a pipeline of sequenced commands that refines or enhances the data at each step along the pipeline until the desired results are attained. Accordingly, various embodiments described herein can be implemented with Splunk Processing Language (SPL) used in conjunction with the SPLUNK® ENTERPRISE system.

While a query can be formulated in many ways, a query can start with a search command and one or more corresponding search terms at the beginning of the pipeline. Such search terms can include any combination of keywords, phrases, times, dates, Boolean expressions, fieldname-field value pairs, etc. that specify which results should be obtained from an index. The results can then be passed as inputs into subsequent commands in a sequence of commands by using, for example, a pipe character. The subsequent commands in a sequence can include directives for additional processing of the results once it has been obtained from one or more indexes. For example, commands may be used to filter unwanted information out of the results, extract more information, evaluate field values, calculate statistics, reorder the results, create an alert, create summary of the results, or perform some type of aggregation function. In some embodiments, the summary can include a graph, chart, metric, or other visualization of the data. An aggregation function can include analysis or calculations to return an aggregate value, such as an average value, a sum, a maximum value, a root mean square, statistical values, and the like.

Due to its flexible nature, use of a pipelined command language in various embodiments is advantageous because it can perform "filtering" as well as "processing" functions. In other words, a single query can include a search command and search term expressions, as well as data-analysis expressions. For example, a command at the beginning of a query can perform a "filtering" step by retrieving a set of data based on a condition (e.g., records associated with server response times of less than 1 microsecond). The results of the filtering step can then be passed to a subsequent command in the pipeline that performs a "processing" step (e.g. calculation of an aggregate value related to the filtered events such as the average response time of servers with response times of less than 1 microsecond). Furthermore, the search command can allow events to be filtered by keyword as well as field value criteria. For example, a search command can filter out all events containing the word "warning" or filter out all events where a field value associated with a field "clientip" is "10.0.1.2."

The results obtained or generated in response to a command in a query can be considered a set of results data. The set of results data can be passed from one command to another in any data format. In one embodiment, the set of result data can be in the form of a dynamically created table. Each command in a particular query can redefine the shape of the table. In some implementations, an event retrieved from an index in response to a query can be considered a row with a column for each field value. Columns contain basic information about the data and also may contain data that has been dynamically extracted at search time.

Figure 6B:
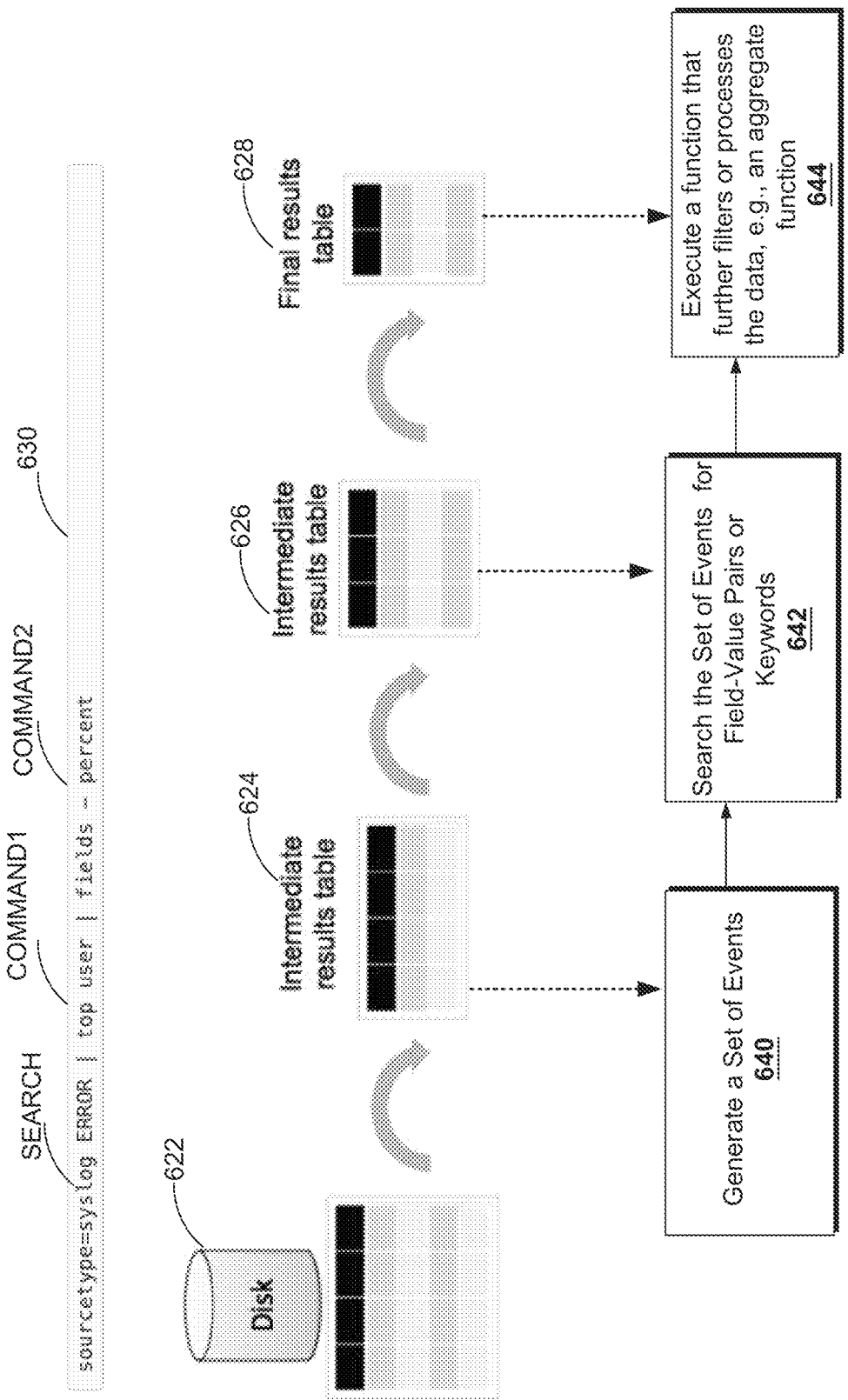
FIG. 6B provides a visual representation of an example manner in which a pipelined command language or query operates, in accordance with example embodiments.

FIG. 6B provides a visual representation of the manner in which a pipelined command language or query operates in accordance with the disclosed embodiments. The query 630 can be inputted by the user into a search. The query comprises a search, the results of which are piped to two commands (namely, command 1 and command 2) that follow the search step.

Disk 622 represents the event data in the raw record data store.

When a user query is processed, a search step will precede other queries in the pipeline in order to generate a set of events at block 640. For example, the query can comprise search terms "sourcetype=syslog ERROR" at the front of the pipeline as shown in FIG. 6B. Intermediate results table 624 shows fewer rows because it represents the subset of events retrieved from the index that matched the search terms "sourcetype=syslog ERROR" from search command 630. By way of further example, instead of a search step, the set of events at the head of the pipeline may be generating by a call to a pre-existing inverted index (as will be explained later).

At block 642, the set of events generated in the first part of the query may be piped to a query that searches the set of events for field-value pairs or for keywords. For example, the second intermediate results table 626 shows fewer columns, representing the result of the top command, "top user" which may summarize the events into a list of the top 10 users and may display the user, count, and percentage.

Finally, at block 644, the results of the prior stage can be pipelined to another stage where further filtering or processing of the data can be performed, e.g., preparing the data for display purposes, filtering the data based on a condition, performing a mathematical calculation with the data, etc. As shown in FIG. 6B, the "fields—percent" part of command 630 removes the column that shows the percentage, thereby, leaving a final results table 628 without a percentage column. In different embodiments, other query languages, such as the Structured Query Language ("SQL"), can be used to create a query.

The search head 210 allows users to search and visualize events generated from machine data received from homogenous data sources. The search head 210 also allows users to search and visualize events generated from machine data received from heterogeneous data sources. The search head 210 includes various mechanisms, which may additionally reside in an indexer 206, for processing a query. A query language may be used to create a query, such as any suitable pipelined query language. For example, Splunk Processing Language (SPL) can be utilized to make a query. SPL is a pipelined search language in which a set of inputs is operated on by a first command in a command line, and then a subsequent command following the pipe symbol "|" operates on the results produced by the first command, and so on for additional commands. Other query languages, such as the Structured Query Language ("SQL"), can be used to create a query.

In response to receiving the search query, search head 210 uses extraction rules to extract values for fields in the events being searched. The search head 210 obtains extraction rules that specify how to extract a value for fields from an event. Extraction rules can comprise regex rules that specify how to extract values for the fields corresponding to the extraction rules. In addition to specifying how to extract field values, the extraction rules may also include instructions for deriving a field value by performing a function on a character string or value retrieved by the extraction rule. For example, an extraction rule may truncate a character string or convert the character string into a different data format. In some cases, the query itself can specify one or more extraction rules.

The search head 210 can apply the extraction rules to events that it receives from indexers 206. Indexers 206 may apply the extraction rules to events in an associated data store 208. Extraction rules can be applied to all the events in a data store or to a subset of the events that have been filtered based on some criteria (e.g., event time stamp values, etc.). Extraction rules can be used to extract one or more values for a field from events by parsing the portions of machine data in the events and examining the data for one or more patterns of characters, numbers, delimiters, etc., that indicate where the field begins and, optionally, ends.

FIG. 7A is a diagram of an example scenario where a common customer identifier is found among log data received from three disparate data sources, in accordance with example embodiments. In this example, a user submits an order for merchandise using a vendor's shopping application program 701 running on the user's system. In this example, the order was not delivered to the vendor's server due to a resource exception at the destination server that is detected by the middleware code 702. The user then sends a message to the customer support server 703 to complain about the order failing to complete. The three systems 701, 702, and 703 are disparate systems that do not have a common logging format. The order application 701 sends log data 704 to the data intake and query system in one format, the middleware code 702 sends error log data 705 in a second format, and the support server 703 sends log data 706 in a third format.

Using the log data received at one or more indexers 206 from the three systems, the vendor can uniquely obtain an insight into user activity, user experience, and system behavior. The search head 210 allows the vendor's administrator to search the log data from the three systems that one or more indexers 206 are responsible for searching, thereby obtaining correlated information, such as the order number and corresponding customer ID number of the person placing the order. The system also allows the administrator to see a visualization of related events via a user interface. The administrator can query the search head 210 for customer ID field value matches across the log data from the three systems that are stored at the one or more indexers 206. The customer ID field value exists in the data gathered from the three systems, but the customer ID field value may be located in different areas of the data given differences in the architecture of the systems. There is a semantic relationship between the customer ID field values generated by the three systems. The search head 210 requests events from the one or more indexers 206 to gather relevant events from the three systems. The search head 210 then applies extraction rules to the events in order to extract field values that it can correlate. The search head may apply a different extraction rule to each set of events from each system when the event format differs among systems. In this example, the user interface can display to the administrator the events corresponding to the common customer ID field values 707, 708, and 709, thereby providing the administrator with insight into a customer's experience.

Note that query results can be returned to a client, a search head, or any other system component for further processing. In general, query results may include a set of one or more events, a set of one or more values obtained from the events, a subset of the values, statistics calculated based on the values, a report containing the values, a visualization (e.g., a graph or chart) generated from the values, and the like.

Figure 7B:
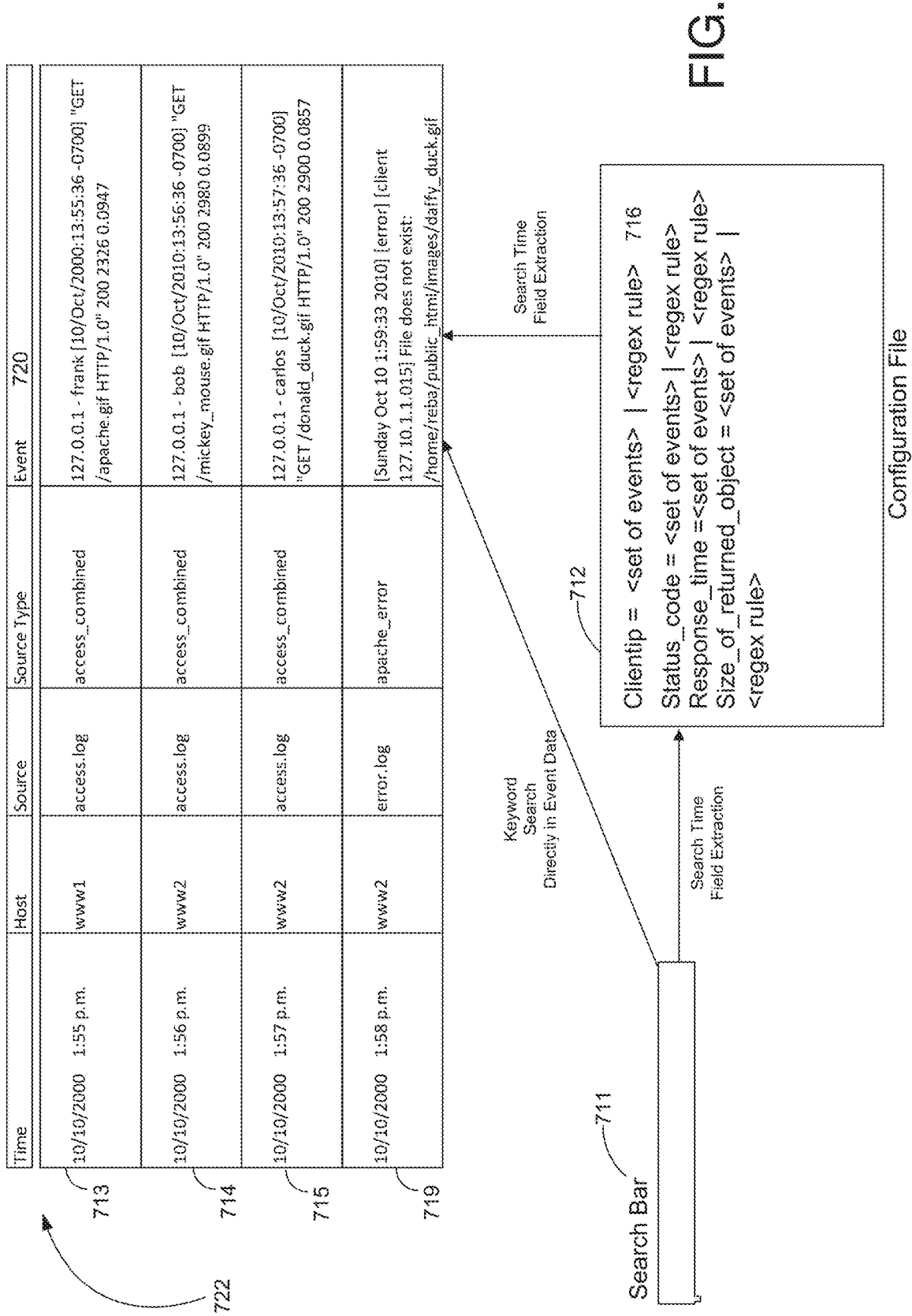
FIG. 7B illustrates an example of processing keyword searches and field searches, in accordance with disclosed embodiments.

The search system enables users to run queries against the stored data to retrieve events that meet criteria specified in a query, such as containing certain keywords or having specific values in defined fields. FIG. 7B illustrates the manner in which keyword searches and field searches are processed in accordance with disclosed embodiments.

If a user inputs a search query into search bar 1401 that includes only keywords (also known as "tokens"), e.g., the keyword "error" or "warning", the query search engine of the data intake and query system searches for those keywords directly in the event data 722 stored in the raw record data store. Note that while FIG. 7B only illustrates four events, the raw record data store (corresponding to data store 208 in FIG. 2) may contain records for millions of events.

As disclosed above, an indexer can optionally generate a keyword index to facilitate fast keyword searching for event data. The indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword. For example, if the keyword "HTTP" was indexed by the indexer at index time, and the user searches for the keyword "HTTP", events 713 to 715 will be identified based on the results returned from the keyword index. As noted above, the index contains reference pointers to the events containing the keyword, which allows for efficient retrieval of the relevant events from the raw record data store.

If a user searches for a keyword that has not been indexed by the indexer, the data intake and query system would nevertheless be able to retrieve the events by searching the event data for the keyword in the raw record data store directly as shown in FIG. 7B. For example, if a user searches for the keyword "frank", and the name "frank" has not been indexed at index time, the DATA INTAKE AND QUERY system will search the event data directly and return the first event 713. Note that whether the keyword has been indexed at index time or not, in both cases the raw data with the events 712 is accessed from the raw data record store to service the keyword search. In the case where the keyword has been indexed, the index will contain a reference pointer that will allow for a more efficient retrieval of the event data from the data store. If the keyword has not been indexed, the search engine will need to search through all the records in the data store to service the search.

In most cases, however, in addition to keywords, a user's search will also include fields. The term "field" refers to a location in the event data containing one or more values for a specific data item. Often, a field is a value with a fixed, delimited position on a line, or a name and value pair, where there is a single value to each field name. A field can also be multivalued, that is, it can appear more than once in an event and have a different value for each appearance, e.g., email address fields. Fields are searchable by the field name or field name-value pairs. Some examples of fields are "clientip" for IP addresses accessing a web server, or the "From" and "To" fields in email addresses.

By way of further example, consider the search, "status=404". This search query finds events with "status" fields that have a value of "404." When the search is run, the search engine does not look for events with any other "status" value. It also does not look for events containing other fields that share "404" as a value. As a result, the search returns a set of results that are more focused than if "404" had been used in the search string as part of a keyword search. Note also that fields can appear in events as "key=value" pairs such as "user_name=Bob." But in most cases, field values appear in fixed, delimited positions without identifying keys. For example, the data store may contain events where the "user_name" value always appears by itself after the timestamp as illustrated by the following string: "November 15 09:33:22 johnmedlock."

The data intake and query system advantageously allows for search time field extraction. In other words, fields can be extracted from the event data at search time using late-binding schema as opposed to at data ingestion time, which was a major limitation of the prior art systems.

In response to receiving the search query, search head 210 uses extraction rules to extract values for the fields associated with a field or fields in the event data being searched. The search head 210 obtains extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

FIG. 7B illustrates the manner in which configuration files may be used to configure custom fields at search time in accordance with the disclosed embodiments. In response to receiving a search query, the data intake and query system determines if the query references a "field." For example, a query may request a list of events where the "clientip" field equals "127.0.0.1." If the query itself does not specify an extraction rule and if the field is not a metadata field, e.g., time, host, source, source type, etc., then in order to determine an extraction rule, the search engine may, in one or more embodiments, need to locate configuration file 712 during the execution of the search as shown in FIG. 7B.

Configuration file 712 may contain extraction rules for all the various fields that are not metadata fields, e.g., the "clientip" field. The extraction rules may be inserted into the configuration file in a variety of ways. In some embodiments, the extraction rules can comprise regular expression rules that are manually entered in by the user. Regular expressions match patterns of characters in text and are used for extracting custom fields in text.

In one or more embodiments, as noted above, a field extractor may be configured to automatically generate extraction rules for certain field values in the events when the events are being created, indexed, or stored, or possibly at a later time. In one embodiment, a user may be able to dynamically create custom fields by highlighting portions of a sample event that should be extracted as fields using a graphical user interface. The system would then generate a regular expression that extracts those fields from similar events and store the regular expression as an extraction rule for the associated field in the configuration file 712.

In some embodiments, the indexers may automatically discover certain custom fields at index time and the regular expressions for those fields will be automatically generated at index time and stored as part of extraction rules in configuration file 712. For example, fields that appear in the event data as "key=value" pairs may be automatically extracted as part of an automatic field discovery process. Note that there may be several other ways of adding field definitions to configuration files in addition to the methods discussed herein.

The search head 210 can apply the extraction rules derived from configuration file 1402 to event data that it receives from indexers 206. Indexers 206 may apply the extraction rules from the configuration file to events in an associated data store 208. Extraction rules can be applied to all the events in a data store, or to a subset of the events that have been filtered based on some criteria (e.g., event time stamp values, etc.). Extraction rules can be used to extract one or more values for a field from events by parsing the event data and examining the event data for one or more patterns of characters, numbers, delimiters, etc., that indicate where the field begins and, optionally, ends.

In one more embodiments, the extraction rule in configuration file 712 will also need to define the type or set of events that the rule applies to. Because the raw record data store will contain events from multiple heterogeneous sources, multiple events may contain the same fields in different locations because of discrepancies in the format of the data generated by the various sources. Furthermore, certain events may not contain a particular field at all. For example, event 719 also contains "clientip" field, however, the "clientip" field is in a different format from events 713-715. To address the discrepancies in the format and content of the different types of events, the configuration file will also need to specify the set of events that an extraction rule applies to, e.g., extraction rule 716 specifies a rule for filtering by the type of event and contains a regular expression for parsing out the field value. Accordingly, each extraction rule will pertain to only a particular type of event. If a particular field, e.g., "clientip" occurs in multiple events, each of those types of events would need its own corresponding extraction rule in the configuration file 712 and each of the extraction rules would comprise a different regular expression to parse out the associated field value. The most common way to categorize events is by source type because events generated by a particular source can have the same format.

The field extraction rules stored in configuration file 712 perform search-time field extractions. For example, for a query that requests a list of events with source type "access_combined" where the "clientip" field equals "127.0.0.1," the query search engine would first locate the configuration file 712 to retrieve extraction rule 716 that would allow it to extract values associated with the "clientip" field from the event data 720 "where the source type is "access_combined. After the "clientip" field has been extracted from all the events comprising the "clientip" field where the source type is "access_combined," the query search engine can then execute the field criteria by performing the compare operation to filter out the events where the "clientip" field equals "127.0.0.1." In the example shown in FIG. 7B, events 713-715 would be returned in response to the user query. In this manner, the search engine can service queries containing field criteria in addition to queries containing keyword criteria (as explained above).

The configuration file can be created during indexing. It may either be manually created by the user or automatically generated with certain predetermined field extraction rules. As discussed above, the events may be distributed across several indexers, wherein each indexer may be responsible for storing and searching a subset of the events contained in a corresponding data store. In a distributed indexer system, each indexer would need to maintain a local copy of the configuration file that is synchronized periodically across the various indexers.

The ability to add schema to the configuration file at search time results in increased efficiency. A user can create new fields at search time and simply add field definitions to the configuration file. As a user learns more about the data in the events, the user can continue to refine the late-binding schema by adding new fields, deleting fields, or modifying the field extraction rules in the configuration file for use the next time the schema is used by the system. Because the data intake and query system maintains the underlying raw data and uses late-binding schema for searching the raw data, it enables a user to continue investigating and learn valuable insights about the raw data long after data ingestion time.

The ability to add multiple field definitions to the configuration file at search time also results in increased flexibility. For example, multiple field definitions can be added to the configuration file to capture the same field across events generated by different source types. This allows the data intake and query system to search and correlate data across heterogeneous sources flexibly and efficiently.

Further, by providing the field definitions for the queried fields at search time, the configuration file 712 allows the record data store 712 to be field searchable. In other words, the raw record data store 712 can be searched using keywords as well as fields, wherein the fields are searchable name/value pairings that distinguish one event from another and can be defined in configuration file 1402 using extraction rules. In comparison to a search containing field names, a keyword search does not need the configuration file and can search the event data directly as shown in FIG. 7B.

It should also be noted that any events filtered out by performing a search-time field extraction using a configuration file can be further processed by directing the results of the filtering step to a processing step using a pipelined search language. Using the prior example, a user could pipeline the results of the compare step to an aggregate function by asking the query search engine to count the number of events where the "clientip" field equals "127.0.0.1."

2.11 Example Search Screen

Figure 8A:
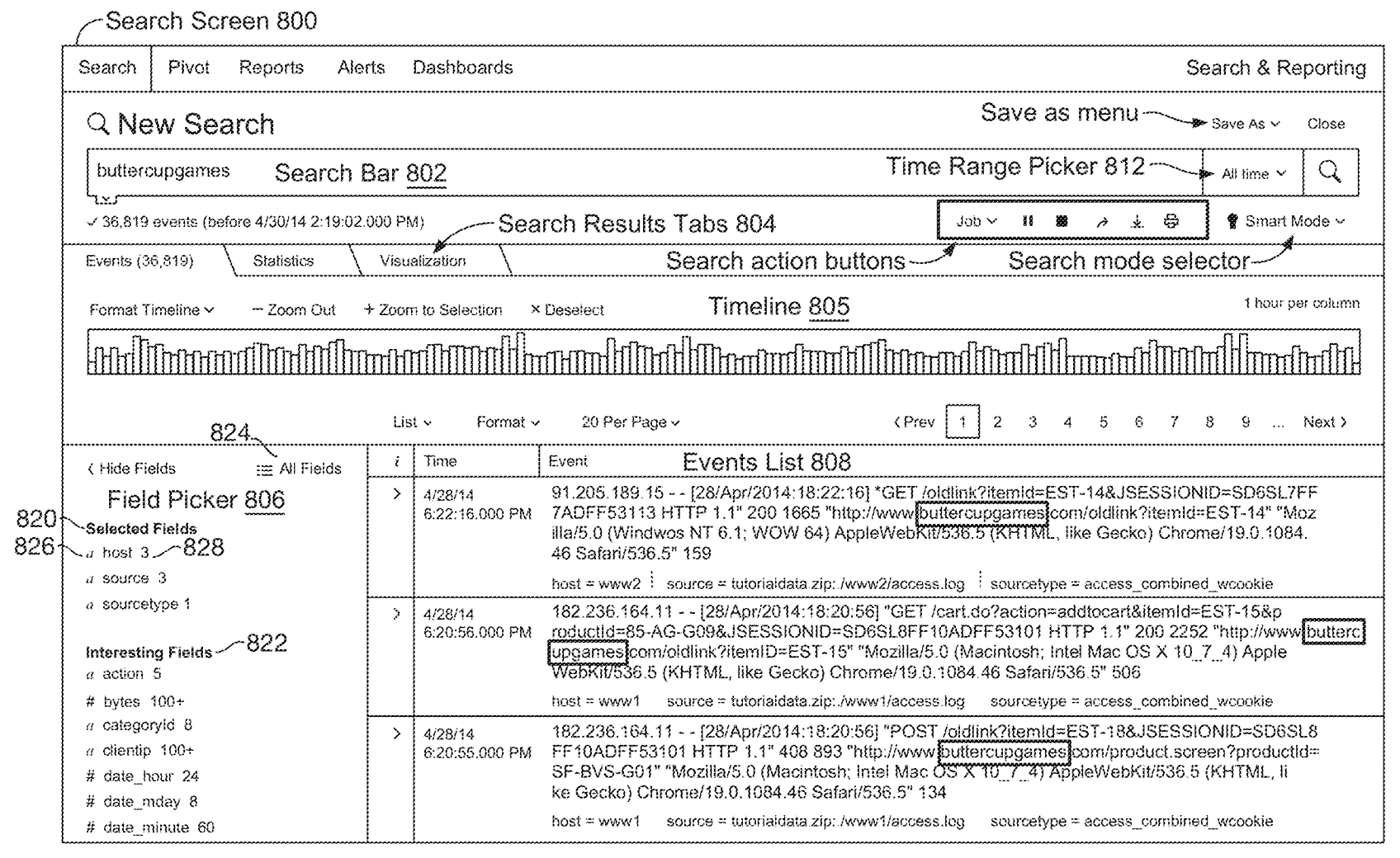

FIG. 8A is an interface diagram of an example user interface for a search screen 800, in accordance with example embodiments. Search screen 800 includes a search bar 802 that accepts user input in the form of a search string. It also includes a time range picker 812 that enables the user to specify a time range for the search. For historical searches (e.g., searches based on a particular historical time range), the user can select a specific time range, or alternatively a relative time range, such as "today," "yesterday" or "last week." For real-time searches (e.g., searches whose results are based on data received in real-time), the user can select the size of a preceding time window to search for real-time events. Search screen 800 also initially may display a "data summary" dialog as is illustrated in FIG. 8B that enables the user to select different sources for the events, such as by selecting specific hosts and log files.

After the search is executed, the search screen 800 in FIG. 8A can display the results through search results tabs 804, wherein search results tabs 804 includes: an "events tab" that may display various information about events returned by the search; a "statistics tab" that may display statistics about the search results; and a "visualization tab" that may display various visualizations of the search results. The events tab illustrated in FIG. 8A may display a timeline graph 805 that graphically illustrates the number of events that occurred in one-hour intervals over the selected time range. The events tab also may display an events list 808 that enables a user to view the machine data in each of the returned events.

The events tab additionally may display a sidebar that is an interactive field picker 806. The field picker 806 may be displayed to a user in response to the search being executed and allows the user to further analyze the search results based on the fields in the events of the search results. The field picker 806 includes field names that reference fields present in the events in the search results. The field picker may display any Selected Fields 820 that a user has preselected for display (e.g., host, source, sourcetype) and may also display any Interesting Fields 822 that the system determines may be interesting to the user based on pre-specified criteria (e.g., action, bytes, categoryid, clientip, date_hour, date_mday, date_minute, etc.). The field picker also provides an option to display field names for all the fields present in the events of the search results using the All Fields control 824.

Each field name in the field picker 806 has a value type identifier to the left of the field name, such as value type identifier 826. A value type identifier identifies the type of value for the respective field, such as an "a" for fields that include literal values or a "#" for fields that include numerical values.

Each field name in the field picker also has a unique value count to the right of the field name, such as unique value count 828. The unique value count indicates the number of unique values for the respective field in the events of the search results.

Each field name is selectable to view the events in the search results that have the field referenced by that field name. For example, a user can select the "host" field name, and the events shown in the events list 808 will be updated with events in the search results that have the field that is reference by the field name "host."

2.12 Data Models

A data model is a hierarchically structured search-time mapping of semantic knowledge about one or more datasets. It encodes the domain knowledge used to build a variety of specialized searches of those datasets. Those searches, in turn, can be used to generate reports.

A data model is composed of one or more "objects" (or "data model objects") that define or otherwise correspond to a specific set of data. An object is defined by constraints and attributes. An object's constraints are search criteria that define the set of events to be operated on by running a search having that search criteria at the time the data model is selected. An object's attributes are the set of fields to be exposed for operating on that set of events generated by the search criteria.

Objects in data models can be arranged hierarchically in parent/child relationships. Each child object represents a subset of the dataset covered by its parent object. The top-level objects in data models are collectively referred to as "root objects."

Child objects have inheritance. Child objects inherit constraints and attributes from their parent objects and may have additional constraints and attributes of their own. Child objects provide a way of filtering events from parent objects. Because a child object may provide an additional constraint in addition to the constraints it has inherited from its parent object, the dataset it represents may be a subset of the dataset that its parent represents. For example, a first data model object may define a broad set of data pertaining to e-mail activity generally, and another data model object may define specific datasets within the broad dataset, such as a subset of the e-mail data pertaining specifically to e-mails sent. For example, a user can simply select an "e-mail activity" data model object to access a dataset relating to e-mails generally (e.g., sent or received), or select an "e-mails sent" data model object (or data sub-model object) to access a dataset relating to e-mails sent.

Because a data model object is defined by its constraints (e.g., a set of search criteria) and attributes (e.g., a set of fields), a data model object can be used to quickly search data to identify a set of events and to identify a set of fields to be associated with the set of events. For example, an "e-mails sent" data model object may specify a search for events relating to e-mails that have been sent, and specify a set of fields that are associated with the events. Thus, a user can retrieve and use the "e-mails sent" data model object to quickly search source data for events relating to sent e-mails, and may be provided with a listing of the set of fields relevant to the events in a user interface screen.

Examples of data models can include electronic mail, authentication, databases, intrusion detection, malware, application state, alerts, compute inventory, network sessions, network traffic, performance, audits, updates, vulnerabilities, etc. Data models and their objects can be designed by knowledge managers in an organization, and they can enable downstream users to quickly focus on a specific set of data. A user iteratively applies a model development tool (not shown in FIG. 8A) to prepare a query that defines a subset of events and assigns an object name to that subset. A child subset is created by further limiting a query that generated a parent subset.

Data definitions in associated schemas can be taken from the common information model (CIM) or can be devised for a particular schema and optionally added to the CIM. Child objects inherit fields from parents and can include fields not present in parents. A model developer can select fewer extraction rules than are available for the sources returned by the query that defines events belonging to a model. Selecting a limited set of extraction rules can be a tool for simplifying and focusing the data model, while allowing a user flexibility to explore the data subset. Development of a data model is further explained in U.S. Pat. Nos. 8,788,525 and 8,788,526, both entitled "DATA MODEL FOR MACHINE DATA FOR SEMANTIC SEARCH", both issued on 22 Jul. 2014, U.S. Pat. No. 8,983,994, entitled "GENERATION OF A DATA MODEL FOR SEARCHING MACHINE DATA", issued on 17 Mar. 2015, U.S. Pat. No. 9,128,980, entitled "GENERATION OF A DATA MODEL APPLIED TO QUERIES", issued on 8 Sep. 2015, and U.S. Pat. No. 9,589,012, entitled "GENERATION OF A DATA MODEL APPLIED TO OBJECT QUERIES", issued on 7 Mar. 2017, each of which is hereby incorporated by reference in its entirety for all purposes.

A data model can also include reports. One or more report formats can be associated with a particular data model and be made available to run against the data model. A user can use child objects to design reports with object datasets that already have extraneous data pre-filtered out. In some embodiments, the data intake and query system 108 provides the user with the ability to produce reports (e.g., a table, chart, visualization, etc.) without having to enter SPL, SQL, or other query language terms into a search screen. Data models are used as the basis for the search feature.

Data models may be selected in a report generation interface. The report generator supports drag-and-drop organization of fields to be summarized in a report. When a model is selected, the fields with available extraction rules are made available for use in the report. The user may refine and/or filter search results to produce more precise reports. The user may select some fields for organizing the report and select other fields for providing detail according to the report organization. For example, "region" and "salesperson" are fields used for organizing the report and sales data can be summarized (subtotaled and totaled) within this organization. The report generator allows the user to specify one or more fields within events and apply statistical analysis on values extracted from the specified one or more fields. The report generator may aggregate search results across sets of events and generate statistics based on aggregated search results. Building reports using the report generation interface is further explained in U.S. patent application Ser. No. 14/503,335, entitled "GENERATING REPORTS FROM UNSTRUCTURED DATA", filed on 30 Sep. 2014, and which is hereby incorporated by reference in its entirety for all purposes. Data visualizations also can be generated in a variety of formats, by reference to the data model. Reports, data visualizations, and data model objects can be saved and associated with the data model for future use. The data model object may be used to perform searches of other data.

FIGS. 9-15 are interface diagrams of example report generation user interfaces, in accordance with example embodiments. The report generation process may be driven by a predefined data model object, such as a data model object defined and/or saved via a reporting application or a data model object obtained from another source. A user can load a saved data model object using a report editor. For example, the initial search query and fields used to drive the report editor may be obtained from a data model object. The data model object that is used to drive a report generation process may define a search and a set of fields. Upon loading of the data model object, the report generation process may enable a user to use the fields (e.g., the fields defined by the data model object) to define criteria for a report (e.g., filters, split rows/columns, aggregates, etc.) and the search may be used to identify events (e.g., to identify events responsive to the search) used to generate the report. That is, for example, if a data model object is selected to drive a report editor, the graphical user interface of the report editor may enable a user to define reporting criteria for the report using the fields associated with the selected data model object, and the events used to generate the report may be constrained to the events that match, or otherwise satisfy, the search constraints of the selected data model object.

Figure 9:
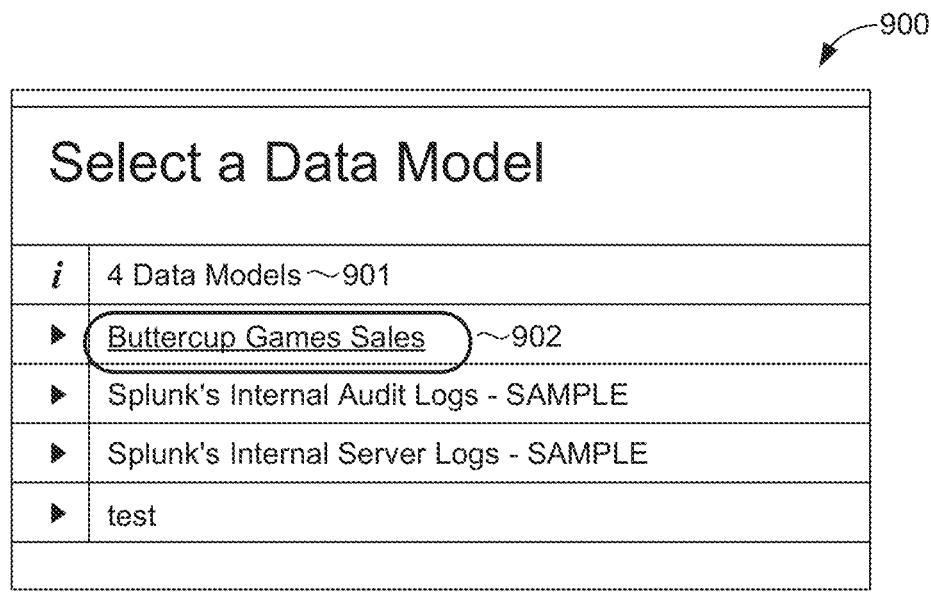

The selection of a data model object for use in driving a report generation may be facilitated by a data model object selection interface. FIG. 9 illustrates an example interactive data model selection graphical user interface 900 of a report editor that may display a listing of available data models 901. The user may select one of the data models 902.

Figure 10:
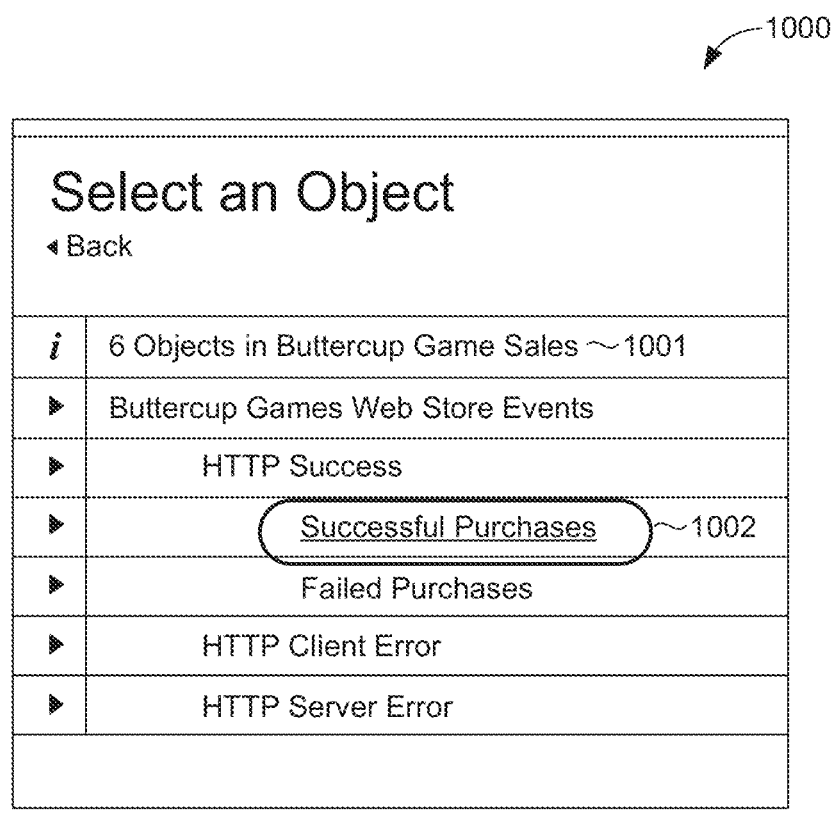

FIG. 10 illustrates an example data model object selection graphical user interface 1000 that may display available data objects 1001 for the selected data object model 902. The user may select one of the displayed data model objects 1002 for use in driving the report generation process.

Figure 11A:
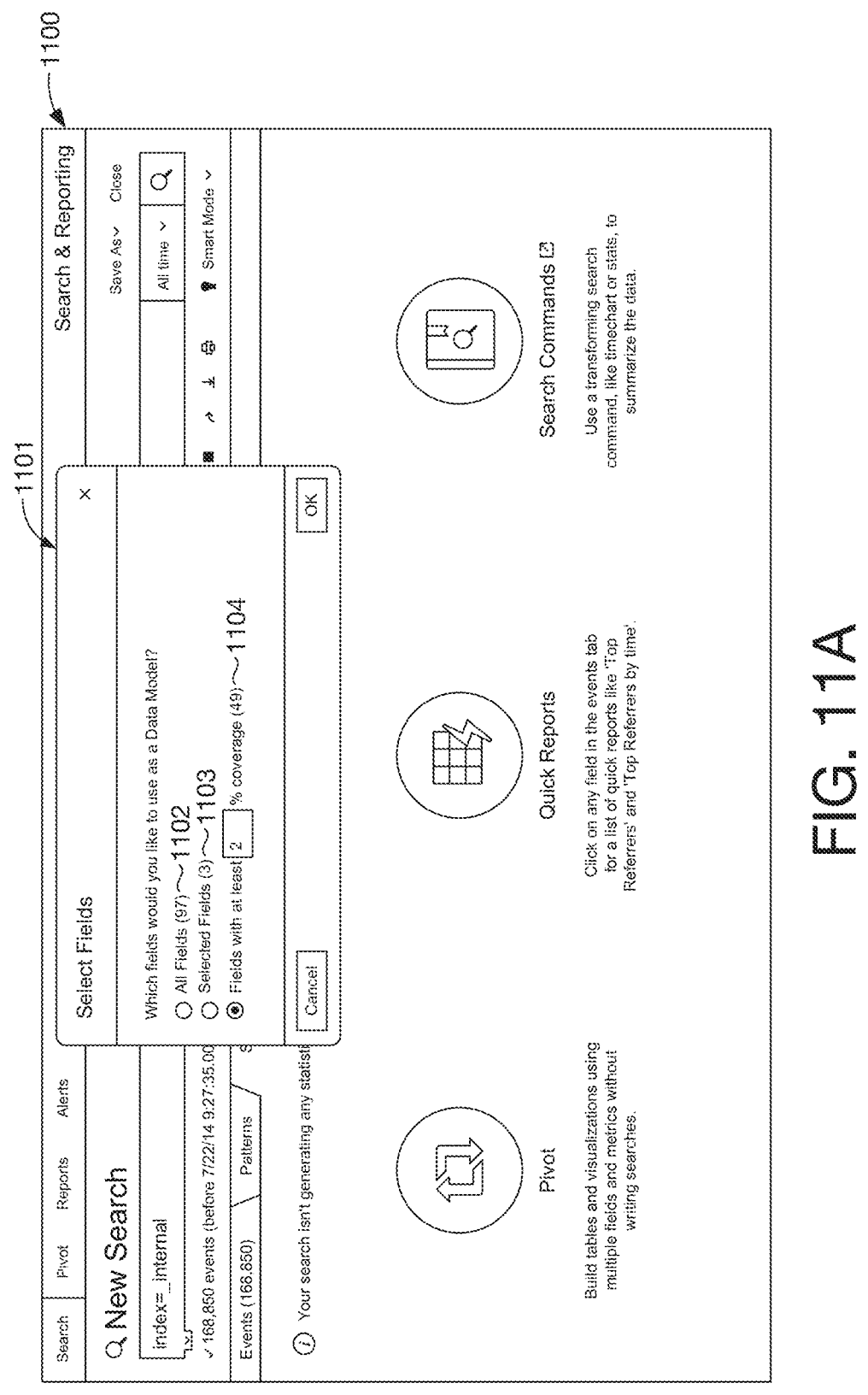

Once a data model object is selected by the user, a user interface screen 1100 shown in FIG. 11A may display an interactive listing of automatic field identification options 1101 based on the selected data model object. For example, a user may select one of the three illustrated options (e.g., the "All Fields" option 1102, the "Selected Fields" option 1103, or the "Coverage" option (e.g., fields with at least a specified % of coverage) 1104). If the user selects the "All Fields" option 1102, all of the fields identified from the events that were returned in response to an initial search query may be selected. That is, for example, all of the fields of the identified data model object fields may be selected. If the user selects the "Selected Fields" option 1103, only the fields from the fields of the identified data model object fields that are selected by the user may be used. If the user selects the "Coverage" option 1104, only the fields of the identified data model object fields meeting a specified coverage criteria may be selected. A percent coverage may refer to the percentage of events returned by the initial search query that a given field appears in. Thus, for example, if an object dataset includes 10,000 events returned in response to an initial search query, and the "avg_age" field appears in 854 of those 10,000 events, then the "avg_age" field would have a coverage of 8.54% for that object dataset. If, for example, the user selects the "Coverage" option and specifies a coverage value of 2%, only fields having a coverage value equal to or greater than 2% may be selected. The number of fields corresponding to each selectable option may be displayed in association with each option. For example, "97" displayed next to the "All Fields" option 1102 indicates that 97 fields will be selected if the "All Fields" option is selected. The "3" displayed next to the "Selected Fields" option 1103 indicates that 3 of the 97 fields will be selected if the "Selected Fields" option is selected. The "49" displayed next to the "Coverage" option 1104 indicates that 49 of the 97 fields (e.g., the 49 fields having a coverage of 2% or greater) will be selected if the "Coverage" option is selected. The number of fields corresponding to the "Coverage" option may be dynamically updated based on the specified percent of coverage.

Figure 11B:
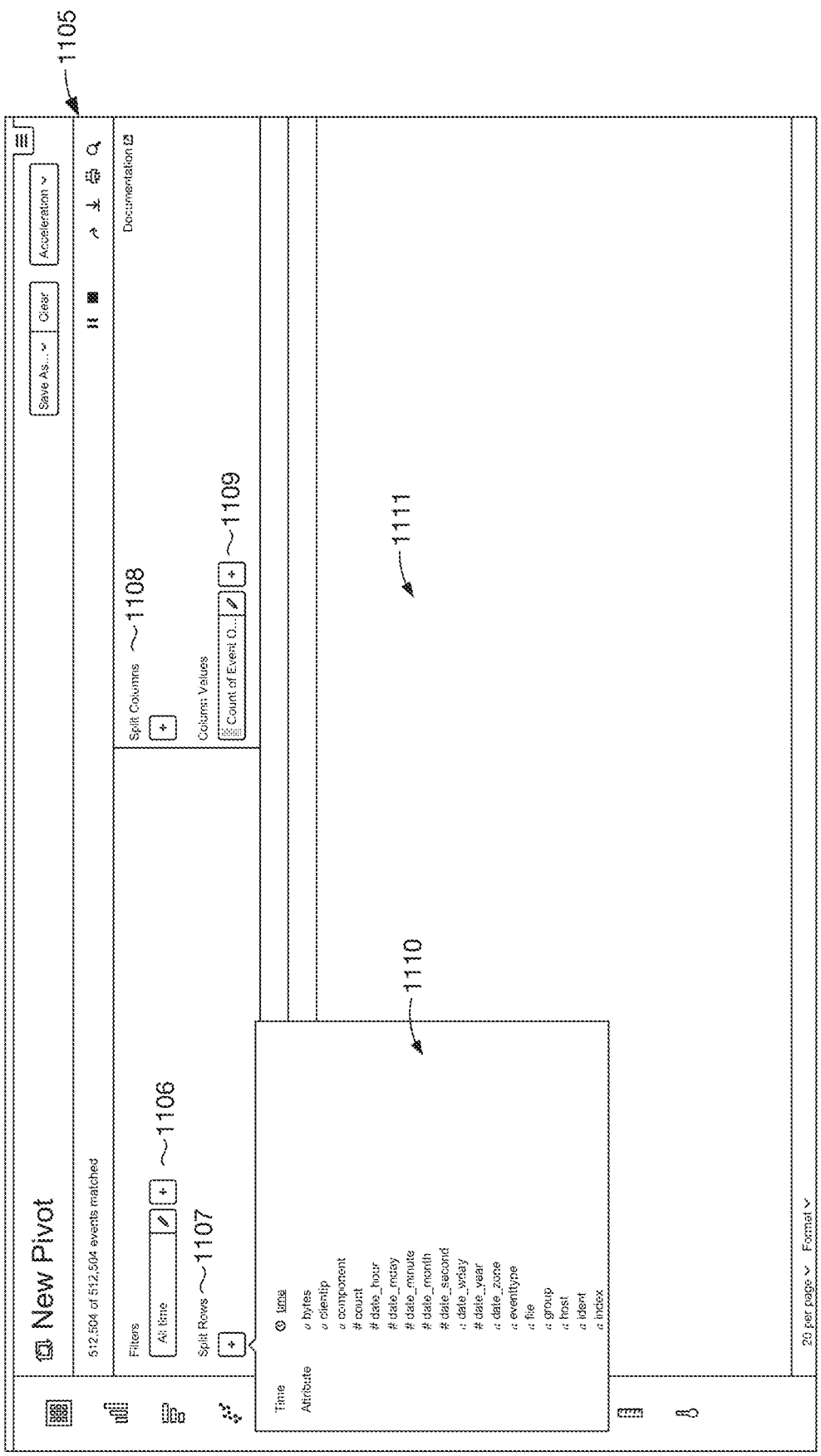
Figure 11C:
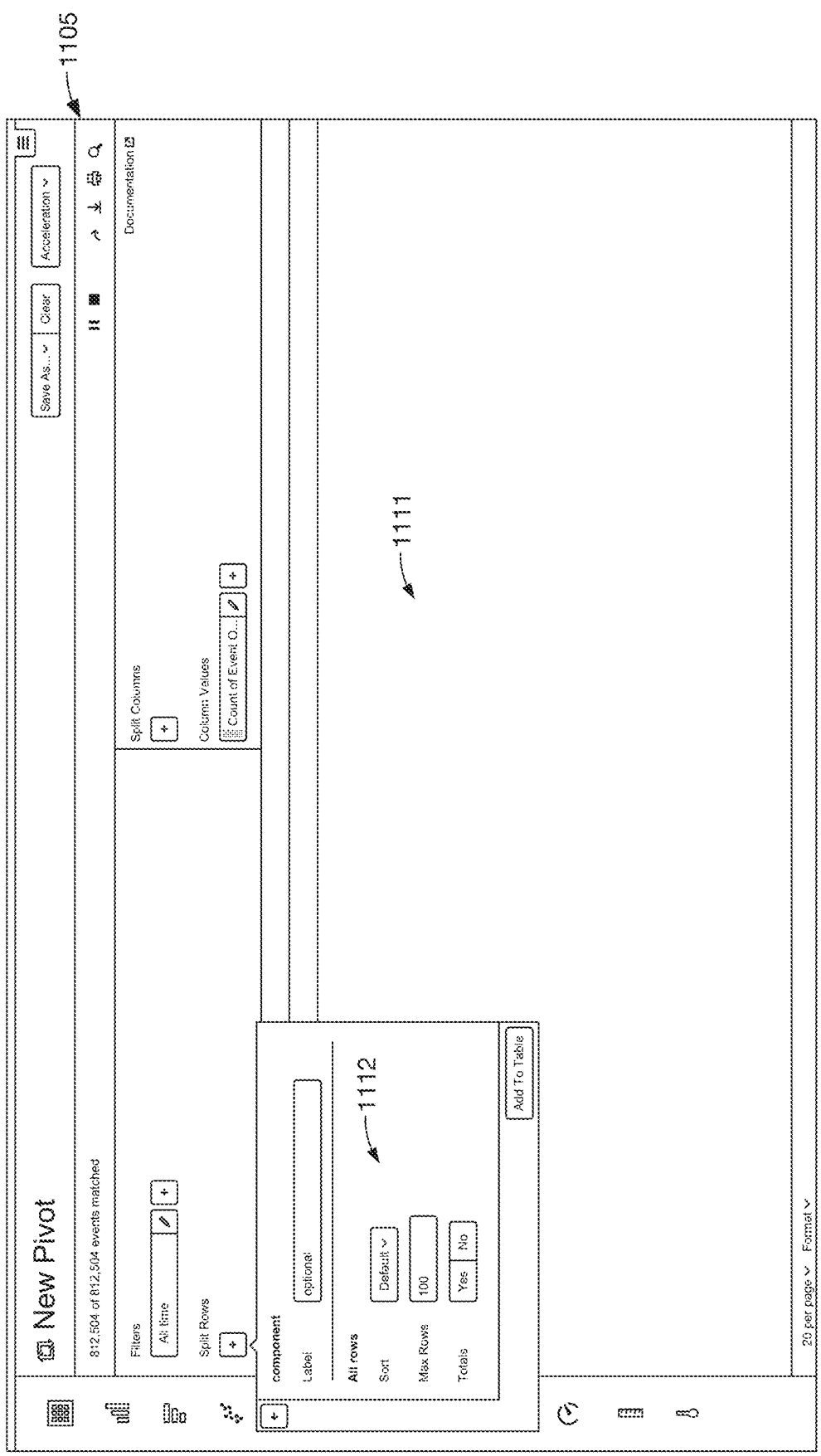

FIG. 11B illustrates an example graphical user interface screen 1105 displaying the reporting application's "Report Editor" page. The screen may display interactive elements for defining various elements of a report. For example, the page includes a "Filters" element 1106, a "Split Rows" element 1107, a "Split Columns" element 1108, and a "Column Values" element 1109. The page may include a list of search results 1111. In this example, the Split Rows element 1107 is expanded, revealing a listing of fields 1110 that can be used to define additional criteria (e.g., reporting criteria). The listing of fields 1110 may correspond to the selected fields. That is, the listing of fields 1110 may list only the fields previously selected, either automatically and/or manually by a user. FIG. 11C illustrates a formatting dialogue 1112 that may be displayed upon selecting a field from the listing of fields 1110. The dialogue can be used to format the display of the results of the selection (e.g., label the column for the selected field to be displayed as "component").

Figure 11D:
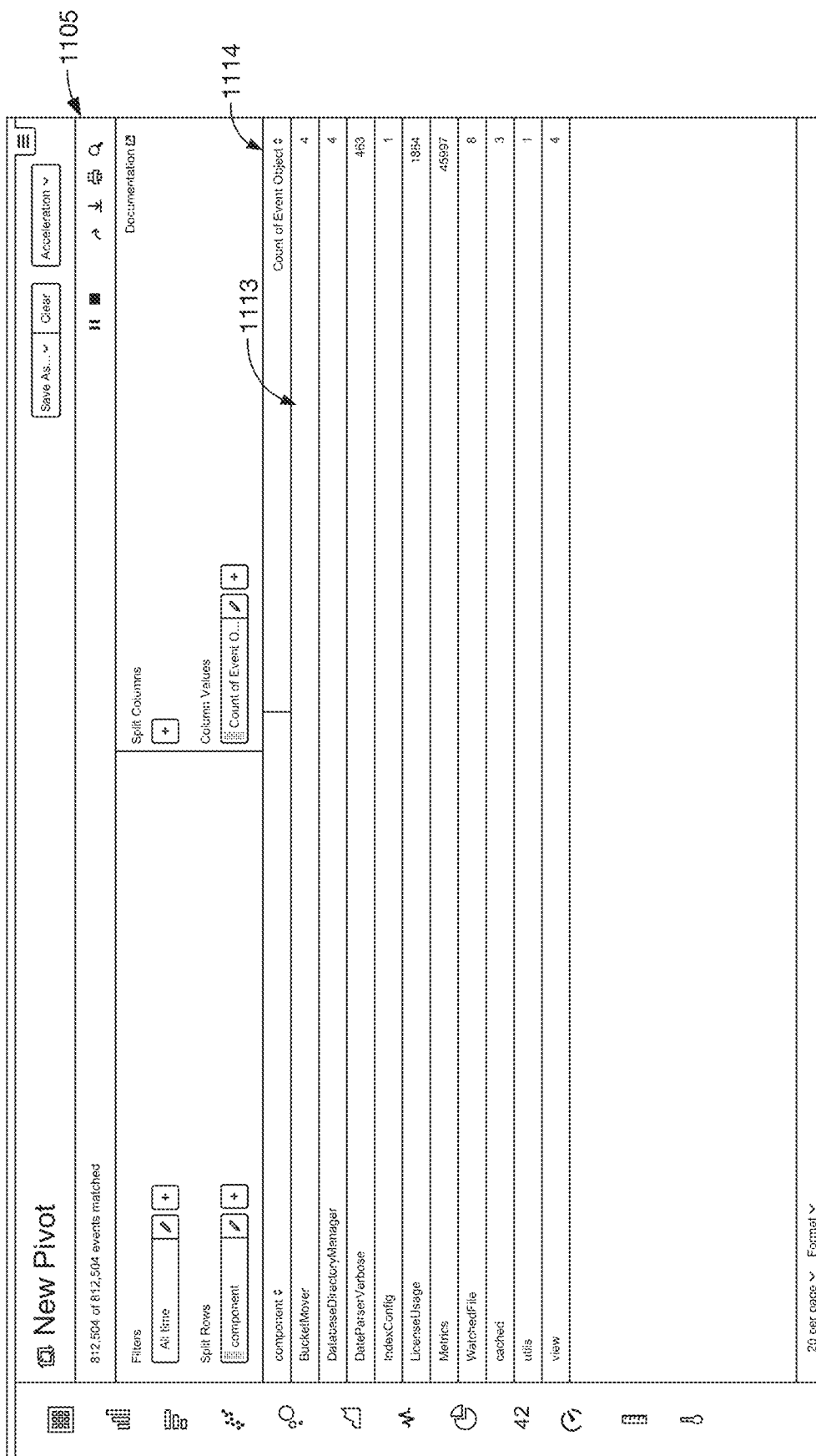

FIG. 11D illustrates an example graphical user interface screen 1105 including a table of results 1113 based on the selected criteria including splitting the rows by the "component" field. A column 1114 having an associated count for each component listed in the table may be displayed that indicates an aggregate count of the number of times that the particular field-value pair (e.g., the value in a row for a particular field, such as the value "BucketMover" for the field "component") occurs in the set of events responsive to the initial search query.

Figure 12:
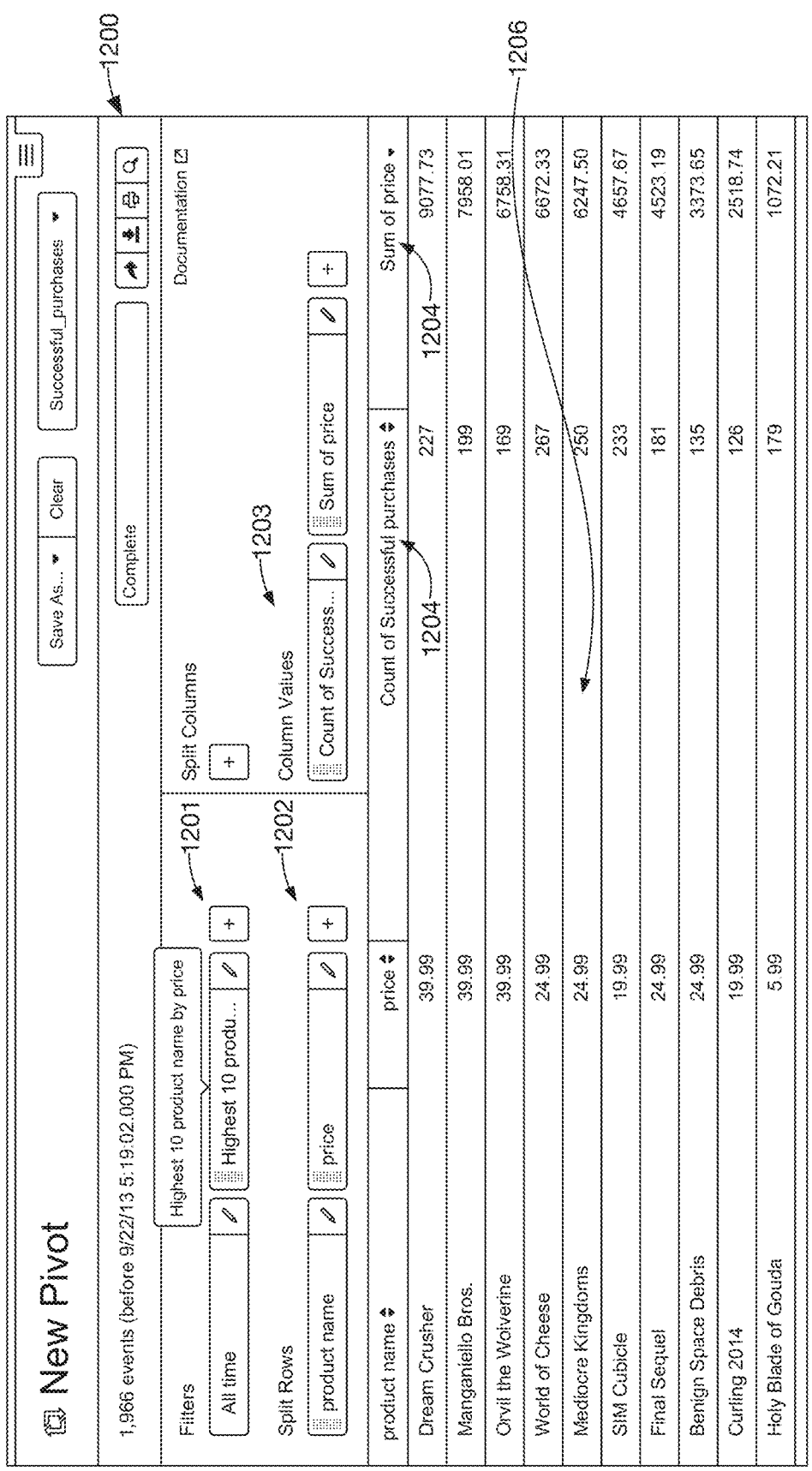

FIG. 12 illustrates an example graphical user interface screen 1200 that allows the user to filter search results and to perform statistical analysis on values extracted from specific fields in the set of events. In this example, the top ten product names ranked by price are selected as a filter 1201 that causes the display of the ten most popular products sorted by price. Each row is displayed by product name and price 1202. This results in each product displayed in a column labeled "product name" along with an associated price in a column labeled "price" 1206. Statistical analysis of other fields in the events associated with the ten most popular products have been specified as column values 1203. A count of the number of successful purchases for each product is displayed in column 1204. These statistics may be produced by filtering the search results by the product name, finding all occurrences of a successful purchase in a field within the events and generating a total of the number of occurrences. A sum of the total sales is displayed in column 1205, which is a result of the multiplication of the price and the number of successful purchases for each product.

Figure 13:
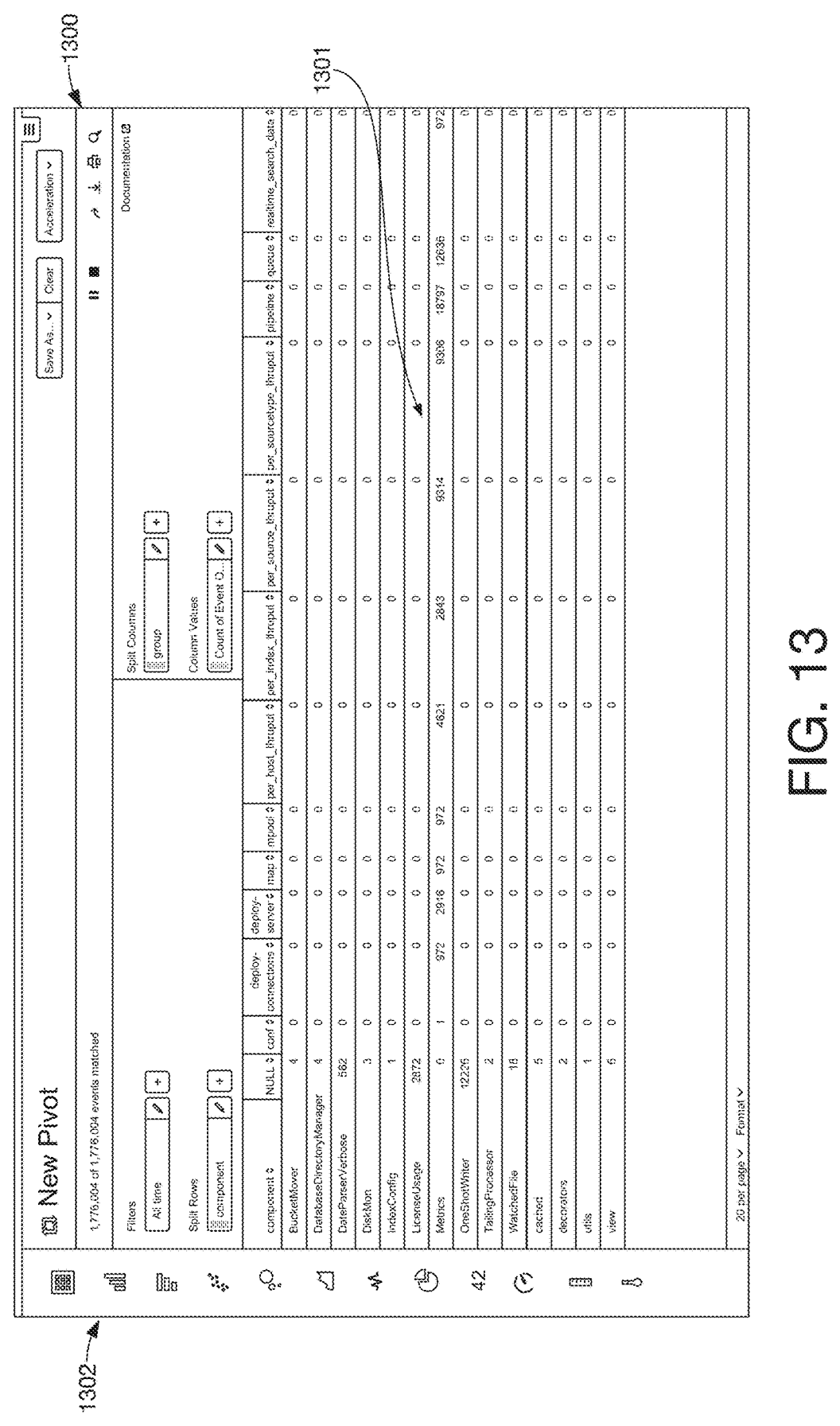
Figure 14:
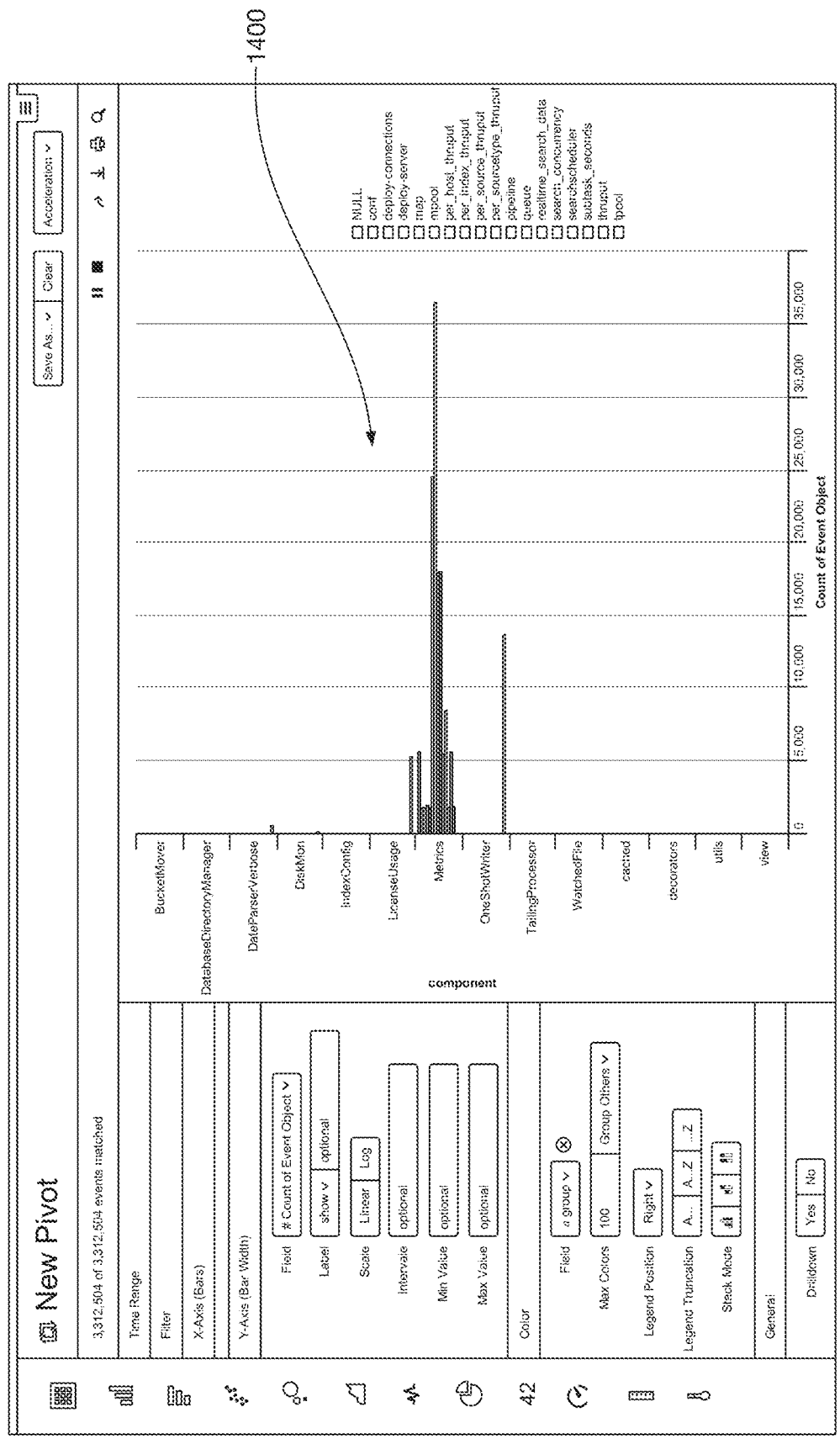
Figure 15:
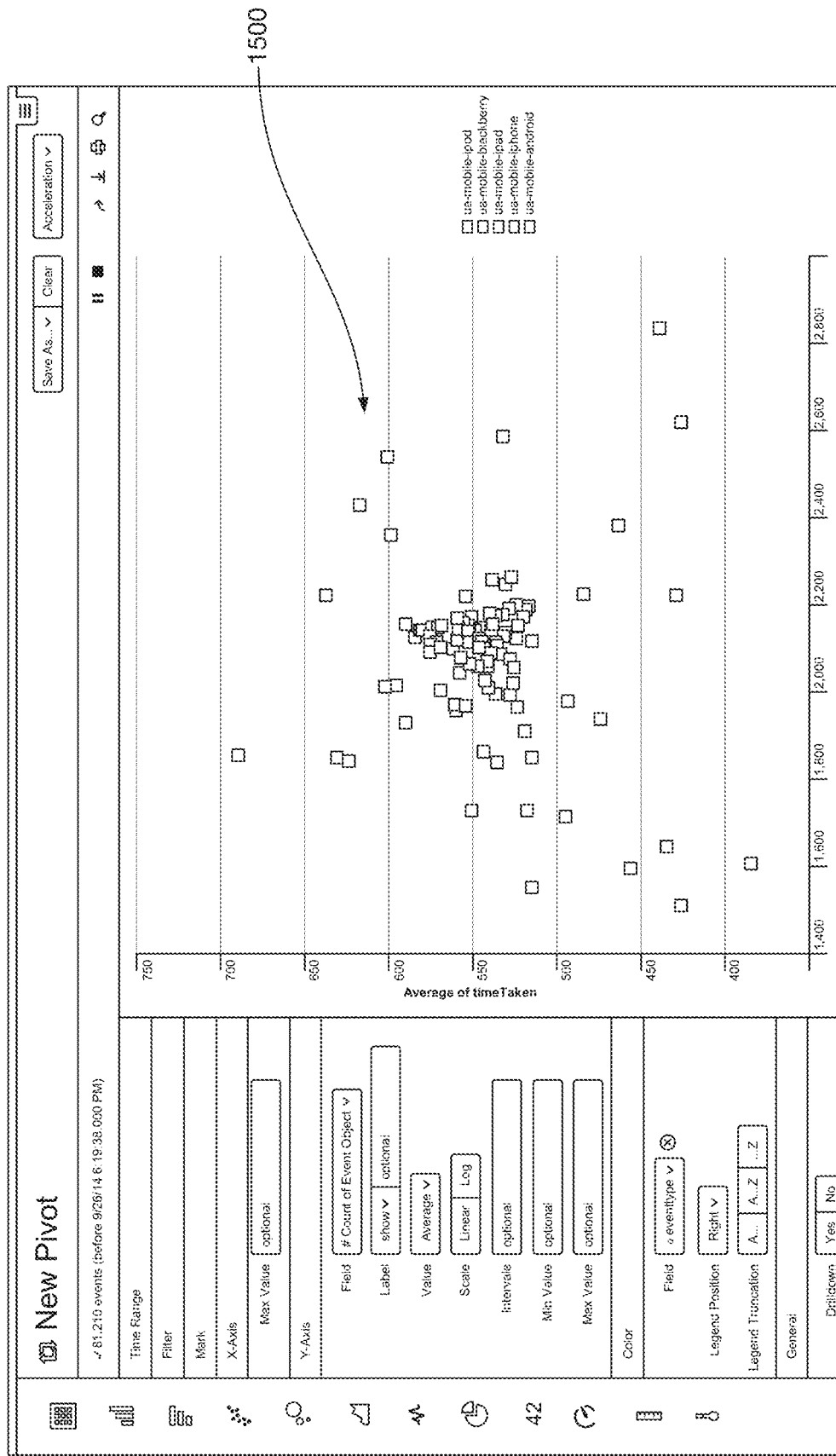

The reporting application allows the user to create graphical visualizations of the statistics generated for a report. For example, FIG. 13 illustrates an example graphical user interface 1300 that may display a set of components and associated statistics 1301. The reporting application allows the user to select a visualization of the statistics in a graph (e.g., bar chart, scatter plot, area chart, line chart, pie chart, radial gauge, marker gauge, filler gauge, etc.), where the format of the graph may be selected using the user interface controls 1302 along the left panel of the user interface 1300. FIG. 14 illustrates an example of a bar chart visualization 1400 of an aspect of the statistical data 1301. FIG. 15 illustrates a scatter plot visualization 1500 of an aspect of the statistical data 1301.

2.13 Acceleration Technique

The above-described system provides significant flexibility by enabling a user to analyze massive quantities of minimally-processed data "on the fly" at search time using a late-binding schema, instead of storing pre-specified portions of the data in a database at ingestion time. This flexibility enables a user to see valuable insights, correlate data, and perform subsequent queries to examine interesting aspects of the data that may not have been apparent at ingestion time.

However, performing extraction and analysis operations at search time can involve a large amount of data and require a large number of computational operations, which can cause delays in processing the queries. Advantageously, the data intake and query system also employs a number of unique acceleration techniques that have been developed to speed up analysis operations performed at search time. These techniques include: (1) performing search operations in parallel across multiple indexers; (2) using a keyword index; (3) using a high performance analytics store; and (4) accelerating the process of generating reports. These novel techniques are described in more detail below.

2.13.1 Aggregation Technique

Figure 16:
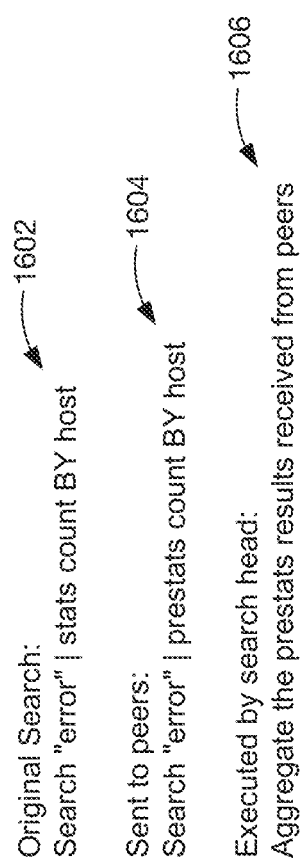
FIG. 16 is an example search query received from a client and executed by search peers, in accordance with example embodiments.

To facilitate faster query processing, a query can be structured such that multiple indexers perform the query in parallel, while aggregation of search results from the multiple indexers is performed locally at the search head. For example, FIG. 16 is an example search query received from a client and executed by search peers, in accordance with example embodiments. FIG. 16 illustrates how a search query 1602 received from a client at a search head 210 can split into two phases, including: (1) subtasks 1604 (e.g., data retrieval or simple filtering) that may be performed in parallel by indexers 206 for execution, and (2) a search results aggregation operation 1606 to be executed by the search head when the results are ultimately collected from the indexers.

During operation, upon receiving search query 1602, a search head 210 determines that a portion of the operations involved with the search query may be performed locally by the search head. The search head modifies search query 1602 by substituting "stats" (create aggregate statistics over results sets received from the indexers at the search head) with "prestats" (create statistics by the indexer from local results set) to produce search query 1604, and then distributes search query 1604 to distributed indexers, which are also referred to as "search peers" or "peer indexers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as illustrated in FIG. 6A, or may alternatively distribute a modified version (e.g., a more restricted version) of the search query to the search peers. In this example, the indexers are responsible for producing the results and sending them to the search head. After the indexers return the results to the search head, the search head aggregates the received results 1606 to form a single search result set. By executing the query in this manner, the system effectively distributes the computational operations across the indexers while minimizing data transfers.

2.13.2 Keyword Index

As described above with reference to the flow charts in FIG. 5A and FIG. 6A, data intake and query system 108 can construct and maintain one or more keyword indices to quickly identify events containing specific keywords. This technique can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

2.13.3 High Performance Analytics Store

To speed up certain types of queries, some embodiments of system 108 create a high performance analytics store, which is referred to as a "summarization table," that contains entries for specific field-value pairs. Each of these entries keeps track of instances of a specific value in a specific field in the events and includes references to events containing the specific value in the specific field. For example, an example entry in a summarization table can keep track of occurrences of the value "94107" in a "ZIP code" field of a set of events and the entry includes references to all of the events that contain the value "94107" in the ZIP code field. This optimization technique enables the system to quickly process queries that seek to determine how many events have a particular value for a particular field. To this end, the system can examine the entry in the summarization table to count instances of the specific value in the field without having to go through the individual events or perform data extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range. A bucket-specific summarization table includes entries for specific field-value combinations that occur in events in the specific bucket. Alternatively, the system can maintain a separate summarization table for each indexer. The indexer-specific summarization table includes entries for the events in a data store that are managed by the specific indexer. Indexer-specific summarization tables may also be bucket-specific.

The summarization table can be populated by running a periodic query that scans a set of events to find instances of a specific field-value combination, or alternatively instances of all field-value combinations for a specific field. A periodic query can be initiated by a user, or can be scheduled to occur automatically at specific time intervals. A periodic query can also be automatically launched in response to a query that asks for a specific field-value combination.

In some cases, when the summarization tables may not cover all of the events that are relevant to a query, the system can use the summarization tables to obtain partial results for the events that are covered by summarization tables, but may also have to search through other events that are not covered by the summarization tables to produce additional results. These additional results can then be combined with the partial results to produce a final set of results for the query. The summarization table and associated techniques are described in more detail in U.S. Pat. No. 8,682,925, entitled "Distributed High Performance Analytics Store", issued on 25 Mar. 2014, U.S. Pat. No. 9,128,985, entitled "SUPPLEMENTING A HIGH PERFORMANCE ANALYTICS STORE WITH EVALUATION OF INDIVIDUAL EVENTS TO RESPOND TO AN EVENT QUERY", issued on 8 Sep. 2015, and U.S. patent application Ser. No. 14/815, 973, entitled "GENERATING AND STORING SUMMARIZATION TABLES FOR SETS OF SEARCHABLE EVENTS", filed on 1 Aug. 2015, each of which is hereby incorporated by reference in its entirety for all purposes.

To speed up certain types of queries, e.g., frequently encountered queries or computationally intensive queries, some embodiments of system 108 create a high performance analytics store, which is referred to as a "summarization table," (also referred to as a "lexicon" or "inverted index") that contains entries for specific field-value pairs. Each of these entries keeps track of instances of a specific value in a specific field in the event data and includes references to events containing the specific value in the specific field. For example, an example entry in an inverted index can keep track of occurrences of the value "94107" in a "ZIP code" field of a set of events and the entry includes references to all of the events that contain the value "94107" in the ZIP code field. Creating the inverted index data structure avoids needing to incur the computational overhead each time a statistical query needs to be run on a frequently encountered field-value pair. In order to expedite queries, in most embodiments, the search engine will employ the inverted index separate from the raw record data store to generate responses to the received queries.

Note that the term "summarization table" or "inverted index" as used herein is a data structure that may be generated by an indexer that includes at least field names and field values that have been extracted and/or indexed from event records. An inverted index may also include reference values that point to the location(s) in the field searchable data store where the event records that include the field may be found. Also, an inverted index may be stored using well-known compression techniques to reduce its storage size.

Further, note that the term "reference value" (also referred to as a "posting value") as used herein is a value that references the location of a source record in the field searchable data store. In some embodiments, the reference value may include additional information about each record, such as timestamps, record size, meta-data, or the like. Each reference value may be a unique identifier which may be used to access the event data directly in the field searchable data store. In some embodiments, the reference values may be ordered based on each event record's timestamp. For example, if numbers are used as identifiers, they may be sorted so event records having a later timestamp always have a lower valued identifier than event records with an earlier timestamp, or vice-versa. Reference values are often included in inverted indexes for retrieving and/or identifying event records.

In one or more embodiments, an inverted index is generated in response to a user-initiated collection query. The term "collection query" as used herein refers to queries that include commands that generate summarization information and inverted indexes (or summarization tables) from event records stored in the field searchable data store.

Note that a collection query is a special type of query that can be user-generated and is used to create an inverted index. A collection query is not the same as a query that is used to call up or invoke a pre-existing inverted index. In one or more embodiment, a query can comprise an initial step that calls up a pre-generated inverted index on which further filtering and processing can be performed. For example, referring back to FIG. 13, a set of events generated at block 1320 by either using a "collection" query to create a new inverted index or by calling up a pre-generated inverted index. A query with several pipelined steps will start with a pre-generated index to accelerate the query.

FIG. 7C illustrates the manner in which an inverted index is created and used in accordance with the disclosed embodiments. As shown in FIG. 7C, an inverted index 722 can be created in response to a user-initiated collection query using the event data 723 stored in the raw record data store. For example, a non-limiting example of a collection query may include "collect clientip=127.0.0.1" which may result in an inverted index 722 being generated from the event data 723 as shown in FIG. 7C. Each entry in inverted index 722 includes an event reference value that references the location of a source record in the field searchable data store. The reference value may be used to access the original event record directly from the field searchable data store.

In one or more embodiments, if one or more of the queries is a collection query, the responsive indexers may generate summarization information based on the fields of the event records located in the field searchable data store. In at least one of the various embodiments, one or more of the fields used in the summarization information may be listed in the collection query and/or they may be determined based on terms included in the collection query. For example, a collection query may include an explicit list of fields to summarize. Or, in at least one of the various embodiments, a collection query may include terms or expressions that explicitly define the fields, e.g., using regex rules. In FIG. 7C, prior to running the collection query that generates the inverted index 722, the field name "clientip" may need to be defined in a configuration file by specifying the "access_combined" source type and a regular expression rule to parse out the client IP address. Alternatively, the collection query may contain an explicit definition for the field name "clientip" which may obviate the need to reference the configuration file at search time.

In one or more embodiments, collection queries may be saved and scheduled to run periodically. These scheduled collection queries may periodically update the summarization information corresponding to the query. For example, if the collection query that generates inverted index 722 is scheduled to run periodically, one or more indexers would periodically search through the relevant buckets to update inverted index 722 with event data for any new events with the "clientip" value of "127.0.0.1."

In some embodiments, the inverted indexes that include fields, values, and reference value (e.g., inverted index 722) for event records may be included in the summarization information provided to the user. In other embodiments, a user may not be interested in specific fields and values contained in the inverted index, but may need to perform a statistical query on the data in the inverted index. For example, referencing the example of FIG. 7C rather than viewing the fields within summarization table 722, a user may want to generate a count of all client requests from IP address "127.0.0.1." In this case, the search engine would simply return a result of "4" rather than including details about the inverted index 722 in the information provided to the user.

The pipelined search language, e.g., SPL of the SPLUNK® ENTERPRISE system can be used to pipe the contents of an inverted index to a statistical query using the "stats" command for example. A "stats" query refers to queries that generate result sets that may produce aggregate and statistical results from event records, e.g., average, mean, max, min, rms, etc. Where sufficient information is available in an inverted index, a "stats" query may generate their result sets rapidly from the summarization information available in the inverted index rather than directly scanning event records. For example, the contents of inverted index 722 can be pipelined to a stats query, e.g., a "count" function that counts the number of entries in the inverted index and returns a value of "4." In this way, inverted indexes may enable various stats queries to be performed absent scanning or search the event records. Accordingly, this optimization technique enables the system to quickly process queries that seek to determine how many events have a particular value for a particular field. To this end, the system can examine the entry in the inverted index to count instances of the specific value in the field without having to go through the individual events or perform data extractions at search time.

In some embodiments, the system maintains a separate inverted index for each of the above-described time-specific buckets that stores events for a specific time range. A bucket-specific inverted index includes entries for specific field-value combinations that occur in events in the specific bucket. Alternatively, the system can maintain a separate inverted index for each indexer. The indexer-specific inverted index includes entries for the events in a data store that are managed by the specific indexer. Indexer-specific inverted indexes may also be bucket-specific. In at least one or more embodiments, if one or more of the queries is a stats query, each indexer may generate a partial result set from previously generated summarization information. The partial result sets may be returned to the search head that received the query and combined into a single result set for the query As mentioned above, the inverted index can be populated by running a periodic query that scans a set of events to find instances of a specific field-value combination, or alternatively instances of all field-value combinations for a specific field. A periodic query can be initiated by a user, or can be scheduled to occur automatically at specific time intervals. A periodic query can also be automatically launched in response to a query that asks for a specific field-value combination. In some embodiments, if summarization information is absent from an indexer that includes responsive event records, further actions may be taken, such as, the summarization information may generated on the fly, warnings may be provided the user, the collection query operation may be halted, the absence of summarization information may be ignored, or the like, or combination thereof.

In one or more embodiments, an inverted index may be set up to update continually. For example, the query may ask for the inverted index to update its result periodically, e.g., every hour. In such instances, the inverted index may be a dynamic data structure that is regularly updated to include information regarding incoming events.

In some cases, e.g., where a query is executed before an inverted index updates, when the inverted index may not cover all of the events that are relevant to a query, the system can use the inverted index to obtain partial results for the events that are covered by inverted index, but may also have to search through other events that are not covered by the inverted index to produce additional results on the fly. In other words, an indexer would need to search through event data on the data store to supplement the partial results. These additional results can then be combined with the partial results to produce a final set of results for the query. Note that in typical instances where an inverted index is not completely up to date, the number of events that an indexer would need to search through to supplement the results from the inverted index would be relatively small. In other words, the search to get the most recent results can be quick and efficient because only a small number of event records will be searched through to supplement the information from the inverted index. The inverted index and associated techniques are described in more detail in U.S. Pat. No. 8,682,925, entitled "Distributed High Performance Analytics Store", issued on 25 Mar. 2014, U.S. Pat. No. 9,128,985, entitled "SUPPLEMENTING A HIGH PERFORMANCE ANALYTICS STORE WITH EVALUATION OF INDIVIDUAL EVENTS TO RESPOND TO AN EVENT QUERY", filed on 31 Jan. 2014, and U.S. patent application Ser. No. 14/815,973, entitled "STORAGE MEDIUM AND CONTROL DEVICE", filed on 21 Feb. 2014, each of which is hereby incorporated by reference in its entirety.

2.13.3.1 Extracting Event Data Using Posting

In one or more embodiments, if the system needs to process all events that have a specific field-value combination, the system can use the references in the inverted index entry to directly access the events to extract further information without having to search all of the events to find the specific field-value combination at search time. In other words, the system can use the reference values to locate the associated event data in the field searchable data store and extract further information from those events, e.g., extract further field values from the events for purposes of filtering or processing or both.

The information extracted from the event data using the reference values can be directed for further filtering or processing in a query using the pipeline search language. The pipelined search language will, in one embodiment, include syntax that can direct the initial filtering step in a query to an inverted index. In one embodiment, a user would include syntax in the query that explicitly directs the initial searching or filtering step to the inverted index.

Referencing the example in FIG. 15, if the user determines that she needs the user id fields associated with the client requests from IP address "127.0.0.1," instead of incurring the computational overhead of performing a brand new search or re-generating the inverted index with an additional field, the user can generate a query that explicitly directs or pipes the contents of the already generated inverted index 1502 to another filtering step requesting the user ids for the entries in inverted index 1502 where the server response time is greater than "0.0900" microseconds. The search engine would use the reference values stored in inverted index 722 to retrieve the event data from the field searchable data store, filter the results based on the "response time" field values and, further, extract the user id field from the resulting event data to return to the user. In the present instance, the user ids "frank" and "carlos" would be returned to the user from the generated results table 722.

In one embodiment, the same methodology can be used to pipe the contents of the inverted index to a processing step. In other words, the user is able to use the inverted index to efficiently and quickly perform aggregate functions on field values that were not part of the initially generated inverted index. For example, a user may want to determine an average object size (size of the requested gif) requested by clients from IP address "127.0.0.1." In this case, the search engine would again use the reference values stored in inverted index 722 to retrieve the event data from the field searchable data store and, further, extract the object size field values from the associated events 731, 732, 733 and 734. Once, the corresponding object sizes have been extracted (i.e. 2326, 2900, 2920, and 5000), the average can be computed and returned to the user.

In one embodiment, instead of explicitly invoking the inverted index in a user-generated query, e.g., by the use of special commands or syntax, the SPLUNK® ENTERPRISE system can be configured to automatically determine if any prior-generated inverted index can be used to expedite a user query. For example, the user's query may request the average object size (size of the requested gif) requested by clients from IP address "127.0.0.1." without any reference to or use of inverted index 722. The search engine, in this case, would automatically determine that an inverted index 722 already exists in the system that could expedite this query. In one embodiment, prior to running any search comprising a field-value pair, for example, a search engine may search though all the existing inverted indexes to determine if a pre-generated inverted index could be used to expedite the search comprising the field-value pair. Accordingly, the search engine would automatically use the pre-generated inverted index, e.g., index 722 to generate the results without any user-involvement that directs the use of the index.

Using the reference values in an inverted index to be able to directly access the event data in the field searchable data store and extract further information from the associated event data for further filtering and processing is highly advantageous because it avoids incurring the computation overhead of regenerating the inverted index with additional fields or performing a new search.

The data intake and query system includes one or more forwarders that receive raw machine data from a variety of input data sources, and one or more indexers that process and store the data in one or more data stores. By distributing events among the indexers and data stores, the indexers can analyze events for a query in parallel. In one or more embodiments, a multiple indexer implementation of the search system would maintain a separate and respective inverted index for each of the above-described time-specific buckets that stores events for a specific time range. A bucket-specific inverted index includes entries for specific field-value combinations that occur in events in the specific bucket. As explained above, a search head would be able to correlate and synthesize data from across the various buckets and indexers.

This feature advantageously expedites searches because instead of performing a computationally intensive search in a centrally located inverted index that catalogues all the relevant events, an indexer is able to directly search an inverted index stored in a bucket associated with the time-range specified in the query. This allows the search to be performed in parallel across the various indexers. Further, if the query requests further filtering or processing to be conducted on the event data referenced by the locally stored bucket-specific inverted index, the indexer is able to simply access the event records stored in the associated bucket for further filtering and processing instead of needing to access a central repository of event records, which would dramatically add to the computational overhead.

In one embodiment, there may be multiple buckets associated with the time-range specified in a query. If the query is directed to an inverted index, or if the search engine automatically determines that using an inverted index would expedite the processing of the query, the indexers will search through each of the inverted indexes associated with the buckets for the specified time-range. This feature allows the High Performance Analytics Store to be scaled easily.

In certain instances, where a query is executed before a bucket-specific inverted index updates, when the bucket-specific inverted index may not cover all of the events that are relevant to a query, the system can use the bucket-specific inverted index to obtain partial results for the events that are covered by bucket-specific inverted index, but may also have to search through the event data in the bucket associated with the bucket-specific inverted index to produce additional results on the fly. In other words, an indexer would need to search through event data stored in the bucket (that was not yet processed by the indexer for the corresponding inverted index) to supplement the partial results from the bucket-specific inverted index.

Figure 7D:
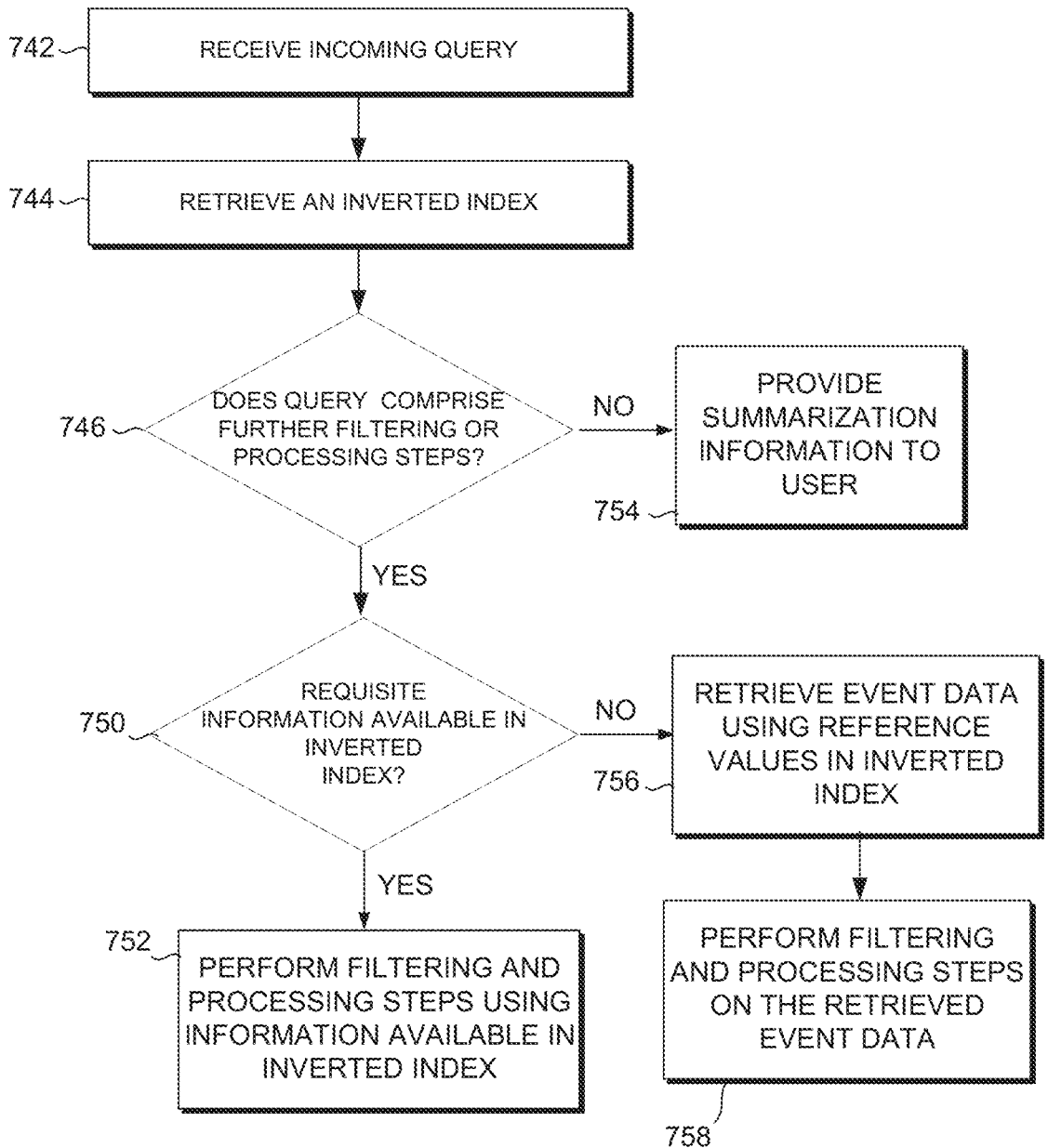
FIG. 7D depicts a flowchart of example use of an inverted index in a pipelined search query, in accordance with example embodiments.

FIG. 7D presents a flowchart illustrating how an inverted index in a pipelined search query can be used to determine a set of event data that can be further limited by filtering or processing in accordance with the disclosed embodiments.

At block 742, a query is received by a data intake and query system. In some embodiments, the query can be received as a user generated query entered into a search bar of a graphical user search interface. The search interface also includes a time range control element that enables specification of a time range for the query.

At block 744, an inverted index is retrieved. Note, that the inverted index can be retrieved in response to an explicit user search command inputted as part of the user generated query. Alternatively, the search engine can be configured to automatically use an inverted index if it determines that using the inverted index would expedite the servicing of the user generated query. Each of the entries in an inverted index keeps track of instances of a specific value in a specific field in the event data and includes references to events containing the specific value in the specific field. In order to expedite queries, in most embodiments, the search engine will employ the inverted index separate from the raw record data store to generate responses to the received queries.

At block 746, the query engine determines if the query contains further filtering and processing steps. If the query contains no further commands, then, in one embodiment, summarization information can be provided to the user at block 754.

If, however, the query does contain further filtering and processing commands, then at block 750, the query engine determines if the commands relate to further filtering or processing of the data extracted as part of the inverted index or whether the commands are directed to using the inverted index as an initial filtering step to further filter and process event data referenced by the entries in the inverted index. If the query can be completed using data already in the generated inverted index, then the further filtering or processing steps, e.g., a "count" number of records function, "average" number of records per hour etc. are performed and the results are provided to the user at block 752.

If, however, the query references fields that are not extracted in the inverted index, then the indexers will access event data pointed to by the reference values in the inverted index to retrieve any further information required at block 756. Subsequently, any further filtering or processing steps are performed on the fields extracted directly from the event data and the results are provided to the user at step 758.

2.13.3.2 Accelerating Report Generation

In some embodiments, a data server system such as the data intake and query system can accelerate the process of periodically generating updated reports based on query results. To accelerate this process, a summarization engine automatically examines the query to determine whether generation of updated reports can be accelerated by creating intermediate summaries. If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In addition to the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on these additional events. Then, the results returned by this query on the additional events, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so advantageously only the newer events needs to be processed while generating an updated report. These report acceleration techniques are described in more detail in U.S. Pat. No. 8,589,403, entitled "Compressed Journaling In Event Tracking Files For Metadata Recovery And Replication", issued on 19 Nov. 2013, U.S. Pat. No. 8,412,696, entitled "Real Time Searching And Reporting", issued on 2 Apr. 2011, and U.S. Pat. Nos. 8,589,375 and 8,589,432, both also entitled "REAL TIME SEARCHING AND REPORTING", both issued on 19 Nov. 2013, each of which is hereby incorporated by reference in its entirety for all purposes.

2.14 Security Features

The data intake and query system provides various schemas, dashboards, and visualizations that simplify developers' tasks to create applications with additional capabilities. One such application is the an enterprise security application, such as SPLUNK® ENTERPRISE SECURITY, which performs monitoring and alerting operations and includes analytics to facilitate identifying both known and unknown security threats based on large volumes of data stored by the data intake and query system. The enterprise security application provides the security practitioner with visibility into security-relevant threats found in the enterprise infrastructure by capturing, monitoring, and reporting on data from enterprise security devices, systems, and applications. Through the use of the data intake and query system searching and reporting capabilities, the enterprise security application provides a top-down and bottom-up view of an organization's security posture.

The enterprise security application leverages the data intake and query system search-time normalization techniques, saved searches, and correlation searches to provide visibility into security-relevant threats and activity and generate notable events for tracking. The enterprise security application enables the security practitioner to investigate and explore the data to find new or unknown threats that do not follow signature-based patterns.

Conventional Security Information and Event Management (SIEM) systems lack the infrastructure to effectively store and analyze large volumes of security-related data. Traditional SIEM systems typically use fixed schemas to extract data from pre-defined security-related fields at data ingestion time and store the extracted data in a relational database. This traditional data extraction process (and associated reduction in data size) that occurs at data ingestion time inevitably hampers future incident investigations that may need original data to determine the root cause of a security issue, or to detect the onset of an impending security threat.

In contrast, the enterprise security application system stores large volumes of minimally-processed security-related data at ingestion time for later retrieval and analysis at search time when a live security threat is being investigated. To facilitate this data retrieval process, the enterprise security application provides pre-specified schemas for extracting relevant values from the different types of security-related events and enables a user to define such schemas.

The enterprise security application can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. The process of detecting security threats for network-related information is further described in U.S. Pat. No. 8,826,434, entitled "SECURITY THREAT DETECTION BASED ON INDICATIONS IN BIG DATA OF ACCESS TO NEWLY REGISTERED DOMAINS", issued on 2 Sep. 2014, U.S. Pat. No. 9,215,240, entitled "INVESTIGATIVE AND DYNAMIC DETECTION OF POTENTIAL SECURITY-THREAT INDICATORS FROM EVENTS IN BIG DATA", issued on 15 Dec. 2015, U.S. Pat. No. 9,173,801, entitled "GRAPHIC DISPLAY OF SECURITY THREATS BASED ON INDICATIONS OF ACCESS TO NEWLY REGISTERED DOMAINS", issued on 3 Nov. 2015, U.S. Pat. No. 9,248,068, entitled "SECURITY THREAT DETECTION OF NEWLY REGISTERED DOMAINS", issued on 2 Feb. 2016, U.S. Pat. No. 9,426,172, entitled "SECURITY THREAT DETECTION USING DOMAIN NAME ACCESSES", issued on 23 Aug. 2016, and U.S. Pat. No. 9,432,396, entitled "SECURITY THREAT DETECTION USING DOMAIN NAME REGISTRATIONS", issued on 30 Aug. 2016, each of which is hereby incorporated by reference in its entirety for all purposes. Security-related information can also include malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the enterprise security application facilitates detecting "notable events" that are likely to indicate a security threat. A notable event represents one or more anomalous incidents, the occurrence of which can be identified based on one or more events (e.g., time stamped portions of raw machine data) fulfilling pre-specified and/or dynamically-determined (e.g., based on machine-learning) criteria defined for that notable event. Examples of notable events include the repeated occurrence of an abnormal spike in network usage over a period of time, a single occurrence of unauthorized access to system, a host communicating with a server on a known threat list, and the like. These notable events can be detected in a number of ways, such as: (1) a user can notice a correlation in events and can manually identify that a corresponding group of one or more events amounts to a notable event; or (2) a user can define a "correlation search" specifying criteria for a notable event, and every time one or more events satisfy the criteria, the application can indicate that the one or more events correspond to a notable event; and the like. A user can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 17A:
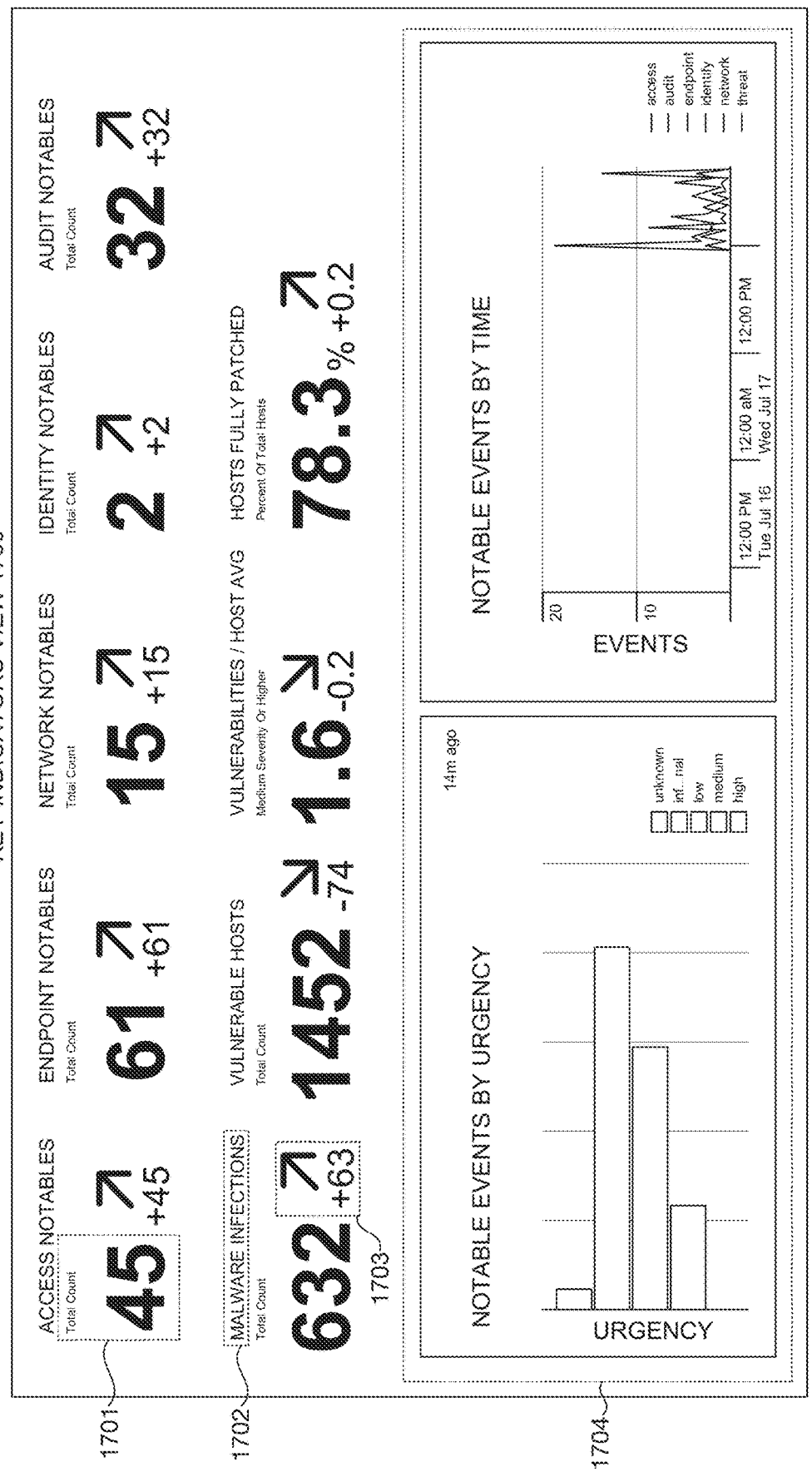
FIG. 17A is an interface diagram of an example user interface of a key indicators view, in accordance with example embodiments.

The enterprise security application provides various visualizations to aid in discovering security threats, such as a "key indicators view" that enables a user to view security metrics, such as counts of different types of notable events. For example, FIG. 17A illustrates an example key indicators view 1700 that comprises a dashboard, which can display a value 1701, for various security-related metrics, such as malware infections 1702. It can also display a change in a metric value 1703, which indicates that the number of malware infections increased by 63 during the preceding interval. Key indicators view 1700 additionally displays a histogram panel 1704 that displays a histogram of notable events organized by urgency values, and a histogram of notable events organized by time intervals. This key indicators view is described in further detail in pending U.S. patent application Ser. No. 13/956,338, entitled "Key Indicators View", filed on 31 Jul. 2013, and which is hereby incorporated by reference in its entirety for all purposes.

Figure 17B:
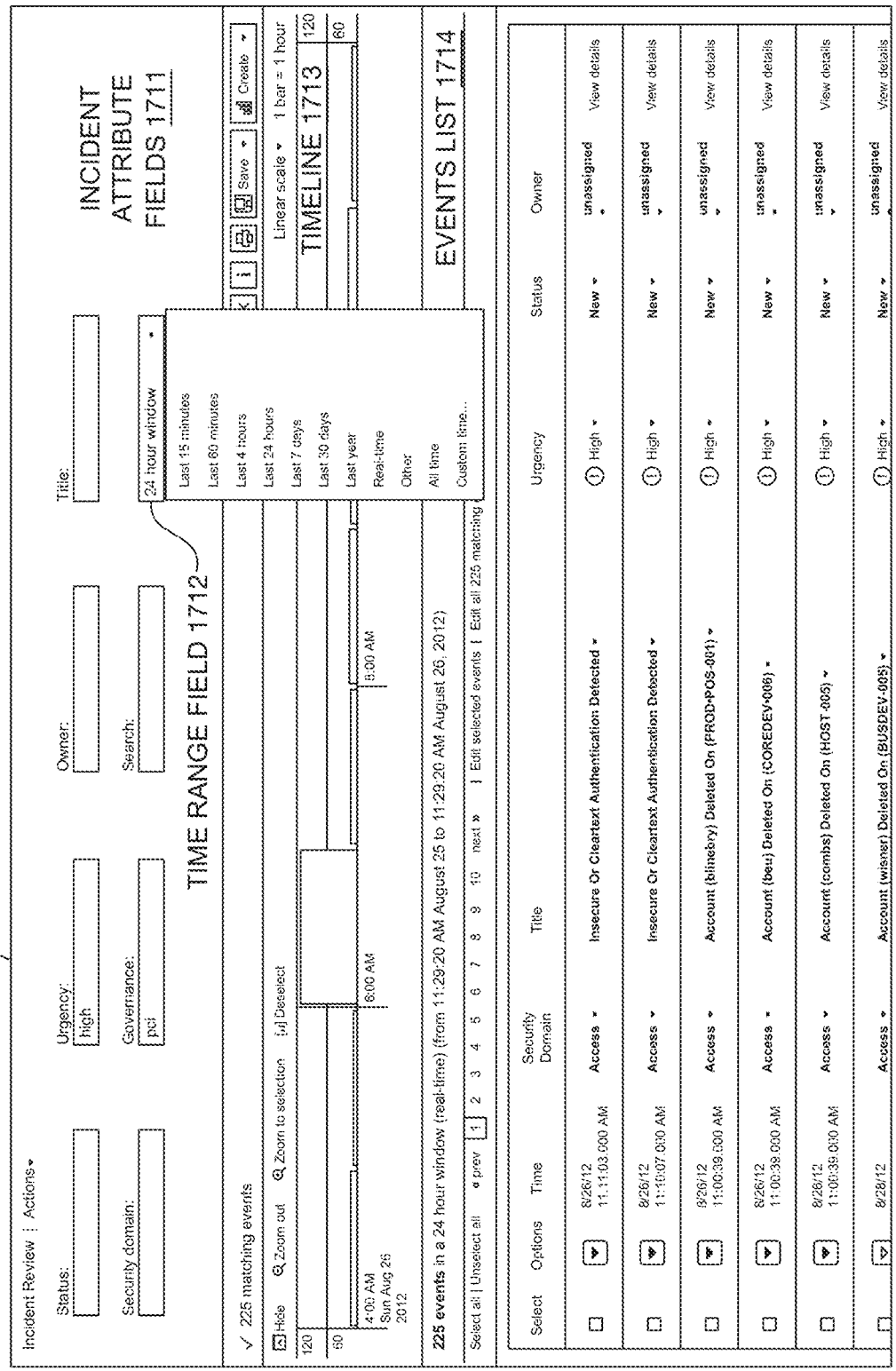
FIG. 17B is an interface diagram of an example user interface of an incident review dashboard, in accordance with example embodiments.

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 17B illustrates an example incident review dashboard 1710 that includes a set of incident attribute fields 1711 that, for example, enables a user to specify a time range field 1712 for the displayed events. It also includes a timeline 1713 that graphically illustrates the number of incidents that occurred in time intervals over the selected time range. It additionally displays an events list 1714 that enables a user to view a list of all of the notable events that match the criteria in the incident attributes fields 1711. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event.

2.15 Data Center Monitoring

As mentioned above, the data intake and query platform provides various features that simplify the developers' task to create various applications. One such application is a virtual machine monitoring application, such as SPLUNK® APP FOR VMWARE® that provides operational visibility into granular performance metrics, logs, tasks and events, and topology from hosts, virtual machines and virtual centers. It empowers administrators with an accurate real-time picture of the health of the environment, proactively identifying performance and capacity bottlenecks.

Conventional data-center-monitoring systems lack the infrastructure to effectively store and analyze large volumes of machine-generated data, such as performance information and log data obtained from the data center. In conventional data-center-monitoring systems, machine-generated data is typically pre-processed prior to being stored, for example, by extracting pre-specified data items and storing them in a database to facilitate subsequent retrieval and analysis at search time. However, the rest of the data is not saved and discarded during pre-processing.

In contrast, the virtual machine monitoring application stores large volumes of minimally processed machine data, such as performance information and log data, at ingestion time for later retrieval and analysis at search time when a live performance issue is being investigated. In addition to data obtained from various log files, this performance-related information can include values for performance metrics obtained through an application programming interface (API) provided as part of the vSphere Hypervisor™ system distributed by VMware, Inc. of Palo Alto, California. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. Such performance metrics are described in U.S. patent application Ser. No. 14/167,316, entitled "Correlation For User-Selected Time Ranges Of Values For Performance Metrics Of Components In An Information-Technology Environment With Log Data From That Information-Technology Environment", filed on 29 Jan. 2014, and which is hereby incorporated by reference in its entirety for all purposes.

To facilitate retrieving information of interest from performance data and log files, the virtual machine monitoring application provides pre-specified schemas for extracting relevant values from different types of performance-related events, and also enables a user to define such schemas.

Figure 17C:
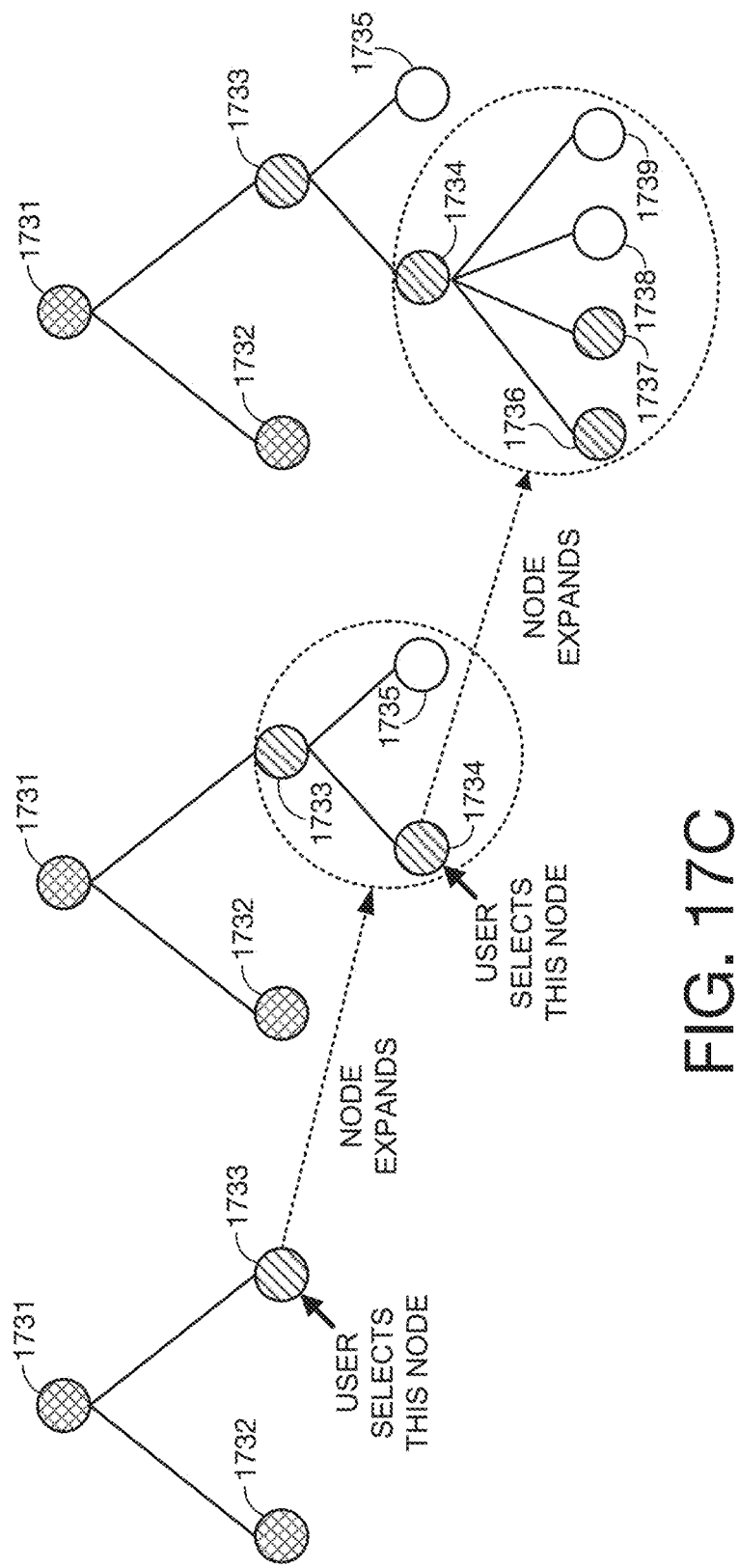
FIG. 17C is a tree diagram of an example a proactive monitoring tree, in accordance with example embodiments.

The virtual machine monitoring application additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Example node-expansion operations are illustrated in FIG. 17C, wherein nodes 1733 and 1734 are selectively expanded. Note that nodes 1731-1739 can be displayed using different patterns or colors to represent different performance states, such as a critical state, a warning state, a normal state or an unknown/offline state. The ease of navigation provided by selective expansion in combination with the associated performance-state information enables a user to quickly diagnose the root cause of a performance problem. The proactive monitoring tree is described in further detail in U.S. Pat. No. 9,185,007, entitled "PROACTIVE MONITORING TREE WITH SEVERITY STATE SORTING", issued on 10 Nov. 2015, and U.S. Pat. No. 9,426,045, also entitled "PROACTIVE MONITORING TREE WITH SEVERITY STATE SORTING", issued on 23 Aug. 2016, each of which is hereby incorporated by reference in its entirety for all purposes.

Figure 17D:
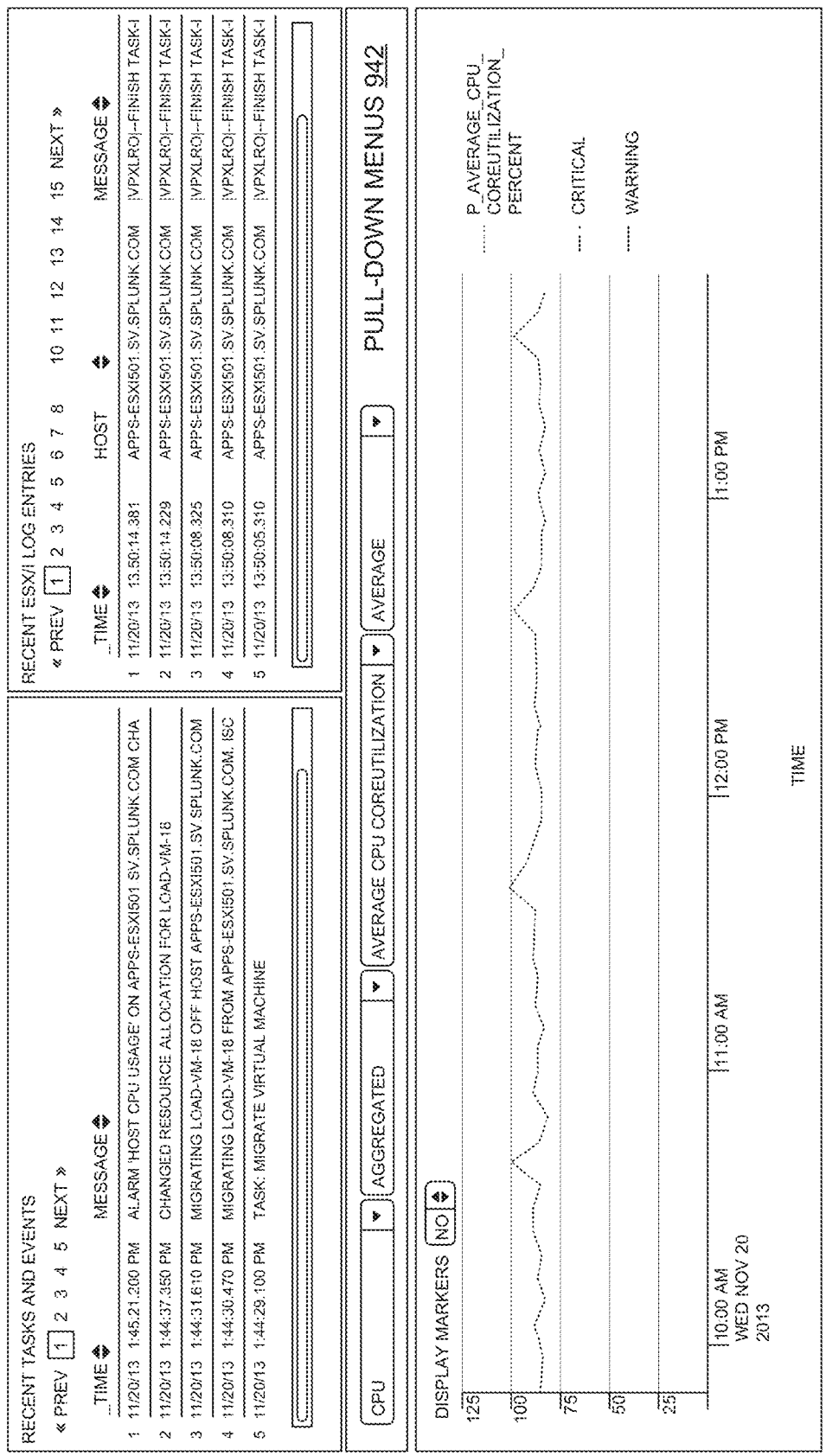
FIG. 17D is an interface diagram of an example a user interface displaying both log data and performance data, in accordance with example embodiments.

The virtual machine monitoring application also provides a user interface that enables a user to select a specific time range and then view heterogeneous data comprising events, log data, and associated performance metrics for the selected time range. For example, the screen illustrated in FIG. 17D displays a listing of recent "tasks and events" and a listing of recent "log entries" for a selected time range above a performance-metric graph for "average CPU core utilization" for the selected time range. Note that a user is able to operate pull-down menus 1742 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316, entitled "Correlation For User-Selected Time Ranges Of Values For Performance Metrics Of Components In An Information-Technology Environment With Log Data From That Information-Technology Environment", filed on 29 Jan. 2014, and which is hereby incorporated by reference in its entirety for all purposes.

3.0 Device Associated Data Retrieval System

Figure 18A:
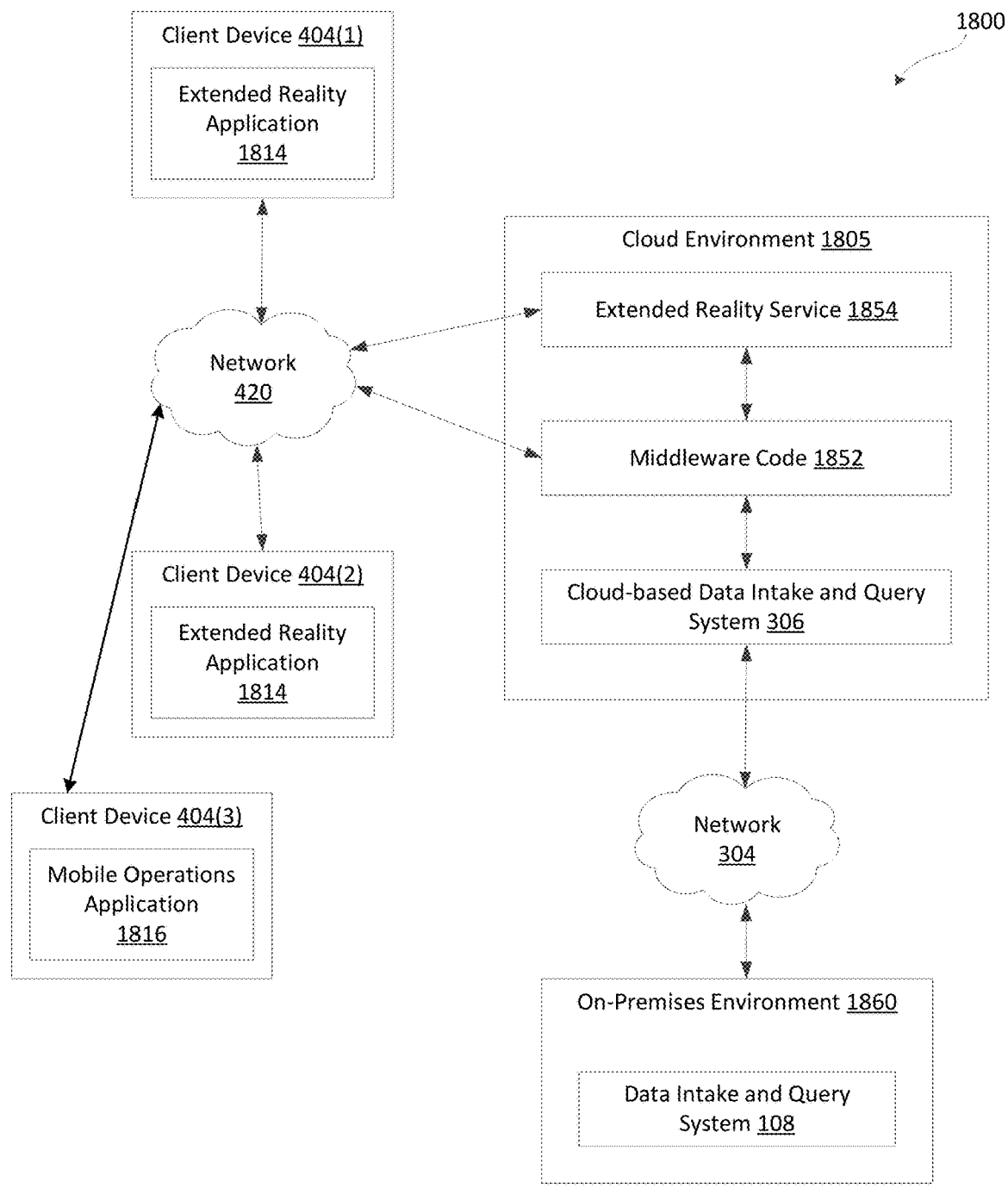
FIG. 18A illustrates a network architecture that enables secure communications between mobile devices and an on-premises environment for the data intake and query system, in accordance with example embodiments.

FIG. 18A illustrates network architecture of that enables secure communications between client devices 404 (e.g., 404(1), 404(2), etc.) and an on-premises environment 1860 for data intake and query system 108, in accordance with example embodiments. As described above, a user may install and configure, on computing devices owned and operated by the user, one or more software applications that implement some or all of the data intake and query system 108. For example, a user may install a software application on server computers owned by the user and configure each server to operate as one or more of a forwarder, an indexer, a search head, etc. This arrangement generally may be referred to as an "on-premises" solution. An on-premises solution may provide a greater level of control over the configuration of certain aspects of the system (e.g., security, privacy, standards, controls, etc.).

In various embodiments, cloud-based data intake and query system 306, executing in cloud environment 1805, may serve as a secure bridge between extended reality application 1814 and an on-premises environment 1860. In other implementations, the on-premises environment 1860 may be omitted and the entire computational process may be carried out in one or more aspects or components of cloud environment 1805. In various embodiments, cloud environment 1805 may include cloud-based data intake and query system 306, which communicates with data intake and query system 108 via network 304. Cloud environment 1805 may further include middleware code 1852 and/or push notification service 1854, which communicate with extended reality application 1814 via network 420. In various embodiments, network 304 and network 420 may be the same network or may include one or more shared network components that communicate with both network 304 and network 420. In various embodiments, data intake and query system 108 may communicate with network interface 1808 of client device 404 through use of a mobile gateway that facilitates communication between devices behind a firewall, or set of firewalls, without requiring additional port openings.

In various embodiments, client device 404 retrieves data and displays the retrieved data via extended reality application 1814 and/or mobile operations application 1816. For example, client device 404 send a query to data intake and query system 108 in order to receive a response that includes a set of field values. These field values, extracted from events, could be associated with data included in the query. In various embodiments, client device 404 and/or data intake and query system 108 may generate content (e.g., schemas, dashboards, cards, and/or visualizations) based on the extracted field values.

In various embodiments, an object may have a tag that encodes or otherwise includes data. The data in the tag includes a textual and/or numerical string that operates as a unique identifier (UID). The tag is provided by an entity that owns or operates the environment in which the object resides. Client device 404 scans tags associated with an object, decodes data included in the tag, determines the unique identifier from the decoded data and uses the unique identifier to receive field values, extracted from events, which are associated with the object. In various embodiments, client device 404 and/or data intake and query system 108 may generate content (e.g., schemas, dashboards, cards, and/or visualizations) based on the extracted field values.

Extended reality application 1814 and/or mobile operations application 1816 executing on client device 404 may establish secure, bidirectional communications with data intake and query system 108. For example, in some embodiments, a persistent, always-open, asynchronous socket for bidirectional communications (e.g., a trusted tunnel bridge) through a firewall of on-premises environment 1860 could be established between data intake and query system 108 and cloud-based data intake and query system 306. Cloud-based data intake and query system 306 may then communicate with extended reality application 1814 and/or mobile operations application 1816 via middleware code 1852 executing in cloud environment 1805.

Additionally, in some embodiments, cloud-based data intake and query system 306 and/or middleware code 1852 may communicate with extended reality application 1814 and/or mobile operations application 1816 via a push notification service 1854, such as Apple Push Notification service (APNs) or Google Cloud Messaging (GCM). For example, data intake and query system 108 could, based on the unique identifier, output to one or more client devices 404 content that includes real-time data associated with a particular object. The content may then be displayed by client device 404. For example, mobile operations application 1816 could display the content in a window provided by client device 404. In some embodiments, extended reality application 1814 displays the content in relation to the real-world object, in conjunction with an augmented reality workspace, as discussed below in further detail. Additionally or alternatively, various playbooks, insights, predictions, annotations, and/or runbooks that include set of commands and/or simple logic trees (e.g., if-then-else) associated with an object and possible actions (e.g., "if the operating temperature is above 100 degrees Celsius, then show options for activating fans") may be implemented and/or displayed to the user.

In some embodiments, in order to authenticate an instance of extended reality application 1814 and/or mobile operations application 1816 associated with a particular user and/or client device 404, extended reality application 1814 and/or mobile operations application 1816 may cause a unique identifier associated with the user and/or client device 404 to be displayed on a display device (e.g., on a display of client device 404). The user may then register the unique identifier with cloud-based data intake and query system 306 and/or data intake and query system 108, such as by entering the unique identifier into a user interface (e.g., a web portal) associated with cloud-based data intake and query system 306 or data intake and query system 108. In response, extended reality application 1814 and/or mobile operations application 1816 may receive credentials that can be used to access real-time data outputted by data intake and query system 108. Additional queries transmitted by client device 404 to data intake and query system 108 may then implement the credentials associated with the unique identifier. In this manner, secure, bidirectional communications may be established between client device 404 and data intake and query system 108.

Once the communications connection is established, a user may cause client device to acquire data based on a tag affixed to or otherwise associated with a given object. For example, client device 404 could scan a tag affixed to a given object and may decode the tag to retrieve a unique object identifier (ID) from the tag that corresponds to the particular object. Once client device 404 obtains the unique object ID, client device transmits queries to data intake and query system 108 requesting one or more values associated with the object. For example, client device 404 could send a request for specific field values for the object. Client device 404 could include the unique object ID in the request sent to data intake and query system 108. In response, data intake and query system 108 may retrieve events associated with the unique object ID and may use extraction rules to extract values for fields in the events being searched, where the extracted values include the requested field values. Data intake and query system 108 then transmits the field values associated with the unique object ID to client device 404. In various embodiments, data intake and query system 108 may transmit the raw data retrieved from the field values included in the event data. Alternatively, data intake and query system 108 may filter, aggregate, or otherwise process the raw data prior to transmitting the field values. For example, in some embodiments, data intake and query system 108 may generate a dashboard associated with the unique object ID. The dashboard may include a filtered subset of data values, where the subset of data values is filtered based on additional criteria, such as user role (e.g., a user role identifier value), location, type of device (e.g., whether client device 404-1 is a smart phone, tablet, AR headset, etc.), and/or time.

Extended reality application 1814 receives the field values from data intake and query system 108, where the field values represent the values of one or more metrics associated with the unique object ID. In an implementation, the field values are extracted from fields that are defined post-ingestion (e.g., at search time), as has been previously described (e.g., with a late-binding schema). The field values transmitted by data intake and query system 108 may be in any technically-feasible format.

In various embodiments, data intake and query system 108 generates a dashboard that includes one or more visualizations of the underlying textual and/or numerical information based on the retrieved field values. In various embodiments, mobile operations application 1816 may display one or more visualizations included in the dashboard received from data intake and query system 108. Additionally or alternatively, extended reality application 1814 generates an AR workspace that includes one or more panels, where the one or more panels include the visualizations included in the dashboard as a portion of an AR workspace. In some embodiments, the dashboard may also include a portion of the field values as a data set. In such instances, extended reality application 1814 and/or mobile operations application 1816 may generate visualizations based on the field values included in the data set.

Figure 18B:
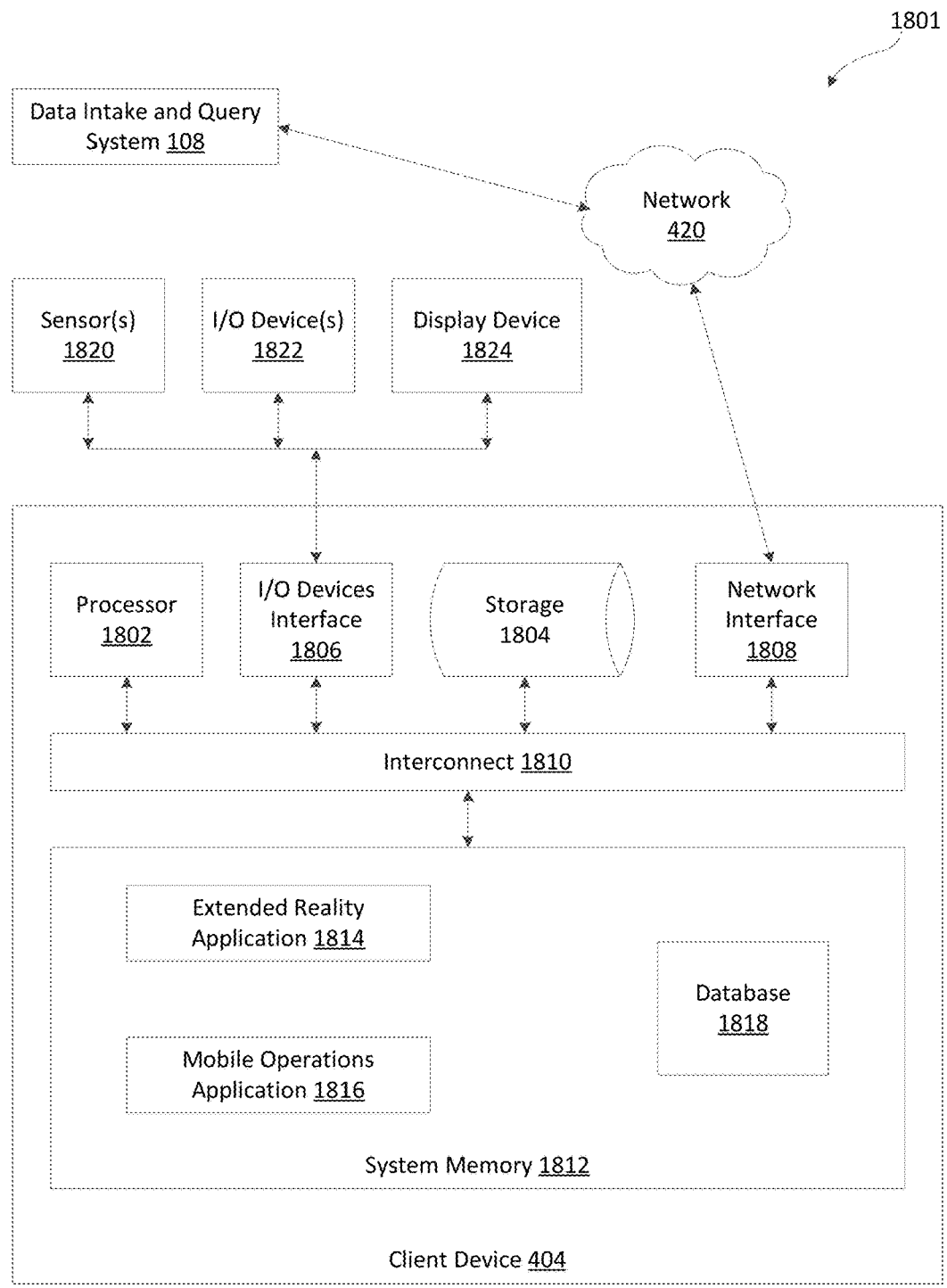
FIG. 18B illustrates a more-detailed view of the example system of FIG. 4, in accordance with example embodiments.

FIG. 18B illustrates a more detailed view of the example networked computer environment 100 of FIG. 1, in accordance with example embodiments. As shown, the networked computer environment 1801 may include, without limitation, data intake and query system 108 and client device 404 communicating with one another over one or more networks 420. Data intake and query system 108 and client device 404 function substantially the same as described in conjunction with FIGS. 1 and 4, except as further described herein. Examples of client device 404 may include, without limitation, a mobile device (e.g., a smartphone, a tablet computer, a handheld computer, a wearable device, a portable media player, a virtual reality (VR) console, an augmented reality (AR) console, a laptop computer, etc.), a desktop computer, a server, a gaming device, a streaming device (e.g., an Apple TV® device, a Roku® device, etc.), and so forth. Client device 404 may include, without limitation, processor 1802, storage 1804, input/output (I/O) device interface 1806, network interface 1808, interconnect 1810, and system memory 1812. System memory 1812 includes extended reality application 1814, mobile operations application 1816, and database 1818.

In general, processor 1802 may retrieve and execute programming instructions stored in system memory 1812. Processor 1802 may be any technically-feasible form of processing device configured to process data and execute program code. Processor 1802 could be, for example, a central processing unit (CPU), a graphics processing unit (GPU), an application-specific integrated circuit (ASIC), a field-programmable gate array (FPGA), and so forth. Processor 1802 stores and retrieves application data residing in the system memory 1812. Processor 1802 is included to be representative of a single CPU, multiple CPUs, a single CPU having multiple processing cores, and the like. In operation, processor 1802 is the master processor of client device 404, controlling and coordinating operations of other system components.

System memory 1812 stores software application programs and data for use by processor 1802. For example, system memory 1812 could include, without limitation, extended reality application 1814, mobile operations application 1816, and/or database 1818. Processor 1802 executes software application programs stored within system memory 1812 and optionally an operating system. In particular, processor 1802 executes software and then performs one or more of the functions and operations set forth in the present application.

The storage 1804 may be a disk drive storage device. Although shown as a single unit, the storage 1804 may be a combination of fixed and/or removable storage devices, such as fixed disc drives, floppy disc drives, tape drives, removable memory cards, or optical storage, network attached storage (NAS), or a storage area-network (SAN). Processor 1802 communicates to other computing devices and systems via network interface 1808, where network interface 1808 is configured to transmit and receive data via one or more communications networks 420.

Interconnect 1810 facilitates transmission, such as of programming instructions and application data, between processor 1802, input/output (I/O) device interface 1806, storage 1804, network interface 1808, and system memory 1812. I/O device interface 1806 is configured to receive input data from user I/O devices. These I/O devices include, without limitation, sensor(s) 1820 (e.g., one or more cameras, location sensor(s), etc.), input device(s) 1822 (e.g., a keyboard, stylus, microphone, etc.), and/or a display device 1824. Display device 1824 generally represents any technically-feasible means for generating an image for display. For example, display device 1824 may be a liquid crystal display (LCD) display, organic light-emitting diode (OLED) display, or a digital light processing (DLP) display. Camera 1820 acquires images via a lens and converts the images into digital form. The images acquired by the camera 1820 may be stored in storage 1804 and/or system memory 1812. An acquired image may be displayed on the display device 1824, either alone or in conjunction with one or more other acquired images, graphical overlays, and/or other data.

Location sensor(s) 1820 enable client device 404 to determine the physical location and/or orientation of client device 404. In some embodiments, location sensor(s) 1820 may include a network-based sensor that communicates with data intake and query system 108 via one or more network(s) 420, which may be part of a production-monitoring network. In some embodiments, location sensor(s) 1820 may include a network-based sensor that communicates with one or more data intake and query systems 108 via a local area network and/or a wide area network. In various embodiments, the production-monitoring environment may include multiple objects and/or multiple client devices 404, each of which may communicate with a data intake and query system 108 and each of which is capable of identifying one or more objects based on identifier tags, geofences, and/or any other object-identification technique disclosed herein. Microphone 1822 acquires audio signals for storage and analysis. Additional examples of user I/O devices 1822 (not explicitly shown) may include one or more buttons, a keyboard, and a mouse or other pointing device. I/O device interface 1806 may also include an audio output unit configured to generate an electrical audio output signal, and the additional user I/O devices may further include a speaker configured to generate an acoustic output in response to the electrical audio output signal.

4.0 Scaled Authentication of Endpoint Devices

As described above, one problem with conventional approaches for managing endpoint devices that access machines in a particular operating environment is that registering a large number of such devices using registration applications is cumbersome for both individual users of endpoint devices, as well as administrators of the networked computing environment. As a result, system administrators do not distribute applications to register large quantities of endpoint devices. Such practices clients from using such applications, or even from using these particular operating environments.

Accordingly, in various embodiments disclosed herein, an endpoint device authentication system is implemented to distribute information necessary to enable large quantities of endpoint devices to directly register with multiple devices within the networked computing environment. An endpoint device manager generates a resource file that identifies multiple devices operating within the networked computer environment, and includes various encryption keys. A given endpoint device uses the resource file to select a particular device with which to directly register. In particular, the endpoint device employs the encryption keys provided in the resource file in order to encrypt and sign a packet containing user credentials. The endpoint device then sends encrypted and signed user credentials to the selected device, via an end-to-end encryption (E2EE) of communications between the endpoint application and the selected device. These techniques are described below in further detail in conjunction with FIGS. 19-24.

4.1 Endpoint Device Authentication System

Figure 19:
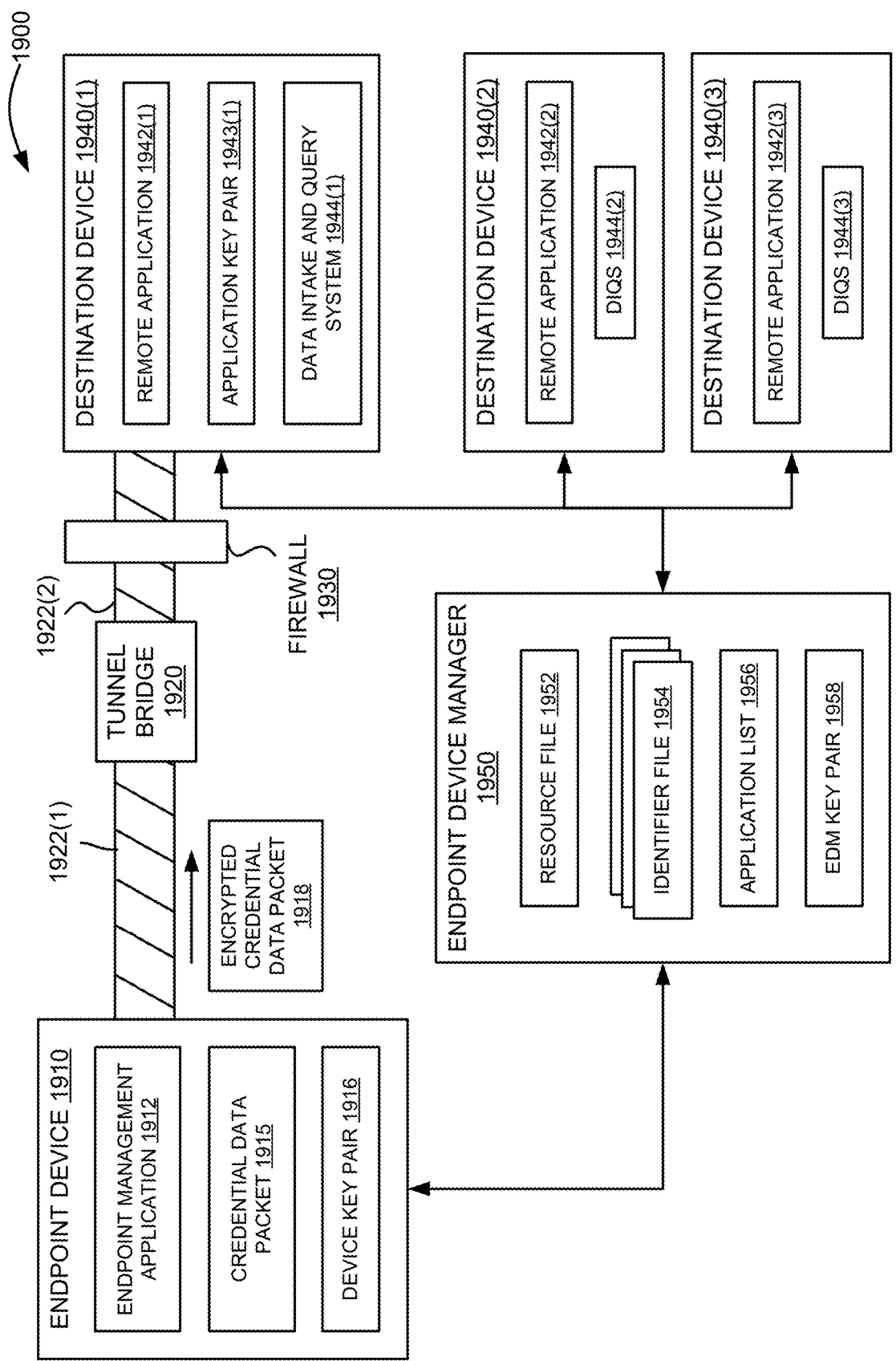
FIG. 19 is a block diagram of another example networked computer environment of FIG. 1, in accordance with example embodiments.

FIG. 19 is a block diagram of another example networked computer environment 100 of FIG. 1, in accordance with example embodiments. As shown, the networked computer environment 1900 may include, without limitation, an endpoint device 1910 that includes endpoint management application 1912, destination devices 1940 that include remote applications 1942 and data intake and query systems (DIQS) 1944, and an endpoint device manager 1950 that includes a resource file 1952, identifier files 1954, an application list 1956, and an endpoint device manager (EDM) key pair 1958.

Endpoint device 1910 functions substantially the same as client device 102, 404 described in conjunction with FIGS. 1 and 4, except as further described herein. Examples of endpoint device 1910 may include, without limitation, a smartphone, a tablet computer, a handheld computer, a wearable device, a virtual reality (VR) console, an augmented reality (AR) console, a laptop computer, a desktop computer, a server, a portable media player, a gaming device, and so forth. In some embodiments, endpoint device 1910 executes one or more applications that display, compute, or generate data based on data received from remote application 1942. For example, endpoint device 1910 could execute an augmented reality or virtual reality (AR/VR) application, which displays performance metrics and/or other data provided by remote application 1942 and/or DIQS 1944. In some embodiments, endpoint device 1910 may include, without limitation, smartphones, tablet computers, handheld computers, wearable devices, laptop computers, desktop computers, servers, portable media players, gaming devices, an Apple TV® devices, and so forth.

In some embodiments, remote application 1942 may send messages to endpoint device 19410 in accordance with push notification service 1854, such as the APPLE® Push Notification service (APN), or GOOGLE® Cloud Messaging (GCM). For example, endpoint device 1910 could receive various schemas, dashboards, playbooks, runbooks, cards, and/or visualizations that include real-time data associated with a particular machine. The schemas, dashboards, cards, and/or visualizations could then be overlaid with the real-world component by an AR/VR application.

Credential data packet 1915 is a formatted unit of data carried through a network via tunnel bridge 1920. Credential data packet 1915 includes user credential data relating to a particular user and/or endpoint device 1910 accessing a specific remote application 1942. For example, endpoint management application 1912 could generate a first credential data packet 1915(1) that includes user credentials applicable to remote application 1942(1), and could generate a second credential data packet 1915(2) that includes user credentials applicable to remote application 1942(2).

Device key pair 1916 is a public/private key pair associated with endpoint device 1910. In various embodiments, endpoint device 1910 may encrypt credential data packet 1915 using device key pair 1916 to generate encrypted credential data packet 1918, where encrypted credential data 1918 is transmitted over tunnel bridge 1920 to various destination devices. In such instances, endpoint device 1910 may send a public device key included in device key pair 1916 in order to enable specific devices to decrypt data packets that were encrypted by endpoint device 1910, including encrypted credential data packet 1918.

Tunnel bridge 1920 is a device that establishes communications with one or more devices included in the networked computer environment 1900. For example, tunnel bridge 1920 could establish a WebSocket connection 1922(1) to endpoint device in a first network and a separate WebSocket connection 1922(2) to the destination device 1940 (e.g., destination device 1940(1)) that implements one or more portions of the data intake and query system 108 (e.g., DIQS 1944(1)) in a second network. In some embodiments, tunnel bridge 1920 may be a trusted service that establishes trust with one or more devices in order to establish secure WebSocket connections 1922 with such devices. In some embodiments, tunnel bridge 1920 may perform authentication operations with other devices in order to establish trust, and may then establish secure communications channels with the other devices, where tunnel bridge 1920 and/or other devices and transmit secure communications using the secure communications channels.

In some embodiments, tunnel bridge 1920 enables E2EE communications between two separate devices by forwarding one or more encrypted data packets without fully decrypting the encrypted data packet. For example, tunnel bridge 1920 could receive an encrypted data packet that was encrypted and signed using multiple encryption keys. Trusted tunnel bridge 1920 may determine whether the encrypted data packet was validly signed with one of the encryption keys without decrypting the encrypted data packet.

WebSocket connections 1922 (e.g., 1922(1) and 1922(2)) are full-duplex communications channels between tunnel bridge 1920 and other devices 1910, 1940. In various embodiments, tunnel bridge 1920 may establish WebSocket connections 1922(1)-1922(2) using WebSocket handshake techniques with a particular device. In some embodiments, the WebSocket connection enables two-way communications between tunnel bridge 1920 and a device without opening a port in a firewall. For example, as shown, WebSocket connection 1922(2) between tunnel bridge 1920 and the remote application 1942(1) provides a persistent, always-open, asynchronous socket for bidirectional communications through firewall 1930. In some embodiments, the WebSocket connection can be a secure connection that facilitates encrypted communication. For example, tunnel bridge 1920 could establish secure WebSocket connection 1922(2) to remote application 1942(1) in order to transmit encrypted credential data packets 1918 and/or other encrypted data packets directly to the destination device 1940(1). In other embodiments, tunnel bridge 1920, acting as trusted tunnel bridge may establish other secure connections, such as RPC connections (e.g., one or more gRPC channels) to endpoint device 1910 and/or destination device 1940.

Firewall 1930 is present between one or more endpoint devices 1910 other devices, including the tunnel bridge 1920, destination device 1940, and/or endpoint device manager 1950, which, in some embodiments, may be within different networks. In some embodiments, the tunnel bridge 1920 may be included in a first network, while firewall 1930 and/or destination devices 1940 may be included in a second network.

Destination device 1940 is a device that receives data packets (e.g., encrypted credential data packet 1918) from endpoint device 1910 via tunnel bridge 1920. In various embodiments, multiple destination devices 1940 (e.g., 1940(1), 1940(2), 1940(3)) may execute distinct remote applications 1942 (e.g., 1942(1), 1942(2), 1940(3)) and/or data intake and query system instances 1944 (e.g., 1944(1), 1944(2), 1944(3)). In some embodiments, endpoint device 1910 may separately complete registration with remote applications 1942(1), 1942(2), 1942(3). In such instances, endpoint device 1910 may, upon registration, maintain multiple active sessions with the respective remote applications 1942(1), 1942(2), 1942(3).

Remote application 1942 may be an application executed by one or more computing resources within destination device 1940 and/or other computing resources within on-premises environment 1860. In some embodiments, remote application 1942 may be an application that generates, computes, and/or collects data included in on-premises environment 1860 and/or cloud environment 1850. In various embodiments, remote application 1942 may be an application that implements DIQS 1944 that retrieves data by querying a field-searchable data store included in the network. For example, remote application 1942 may be an instance of the SPLUNK® ENTERPRISE system, an application within the cloud-based environment, such as SPLUNK CLOUD™, an application for a self-service cloud, or another deployment of an application that implements the Splunk processing language (SPL).

For example, remote application 1942(2) could implement the DIQS 1944(2) in order to extract one or more fields of data from a field-searchable data store. In such instances, remote application 1942(2) could retrieve the extracted fields as portions of a text string, such as: 2018-07-28 00:07:01,781 INFO [async_client] [async_client] [async_post_request] [16574] POST headers={'Authorization': u'Splunk M4q2ROpGJCpng81Wi8JJsyV1yGI xrIhI_1UsIUxvVk3m_I12q6 Q83Drf7P68v8H68kvQ7RHgA2-eJz5o-LSnw4dO0ywEsTodOD0jdWDNGhj9zFGNRuCiB-WovEyXnO25X3_aNjSwyO_rE_ik7', Content-Type: application/json'}, uri=https://127.0.0.1:8089/servicesNS/nobody/space bridge-app/storage/collections/data/alert_recipient_devices, params=None, data={"py/object": "space bridgeapp.data.alert_data. RecipientDevice", "timestamp": "1532736421.201776", "alert_id": "5b5bb3a 580db6133e603d 33f", "device_id": "y+DJALQwOXER-wVDB zUe34Oya1MINAId0IPzRBdtt91U="} host=ip-10-0-240-141 source=/opt/splunk/var/log/splunk/spacebridge-app.log sourcetype=space bridge-app-too_small.

In some embodiments, remote application 1942(2) may, upon registering endpoint device 1910, send the extracted fields to endpoint device 1910 via tunnel bridge 1920.

Application key pair 1943 is a public/private key pair associated with remote 1942. For example, application key pair 1943(1) could be specifically associated with remote application 1942(1); in a similar manner, application key pair 1943(2) (not shown) could be specifically associated with remote application 1942(2). In various embodiments, remote application 1942(1) may encrypt data using a private application key included in application key pair 1943(1). In such instances, remote application 1942(1) may send to recipient devices a public application key that is included in application key pair 1943(1). In such instances, recipient devices could decrypt data packets that were encrypted by remote application 1942(1) using the corresponding private application key. In some embodiments, devices that receive the public application key may encrypt data packets using the public application key. In such instances, public application 1942(1) may successfully validate the packet by using the private application key to decrypt the data packet.

For example, endpoint management application 1912 could generate encrypted credential data packet 1918 by encrypting credential data packet 1915 with a public application key included in application key pair 1943(1). Remote application 1942(1) may then validate encrypted credential data packet 1918 using the private application key included in application key pair 1943(1).

Endpoint device manager 1950 includes one or more devices that manage the deployment of information to manage endpoint devices 1910 that attempt access to networked computer environment 1900. In various embodiments, endpoint device manager 1950 may employ various deployment techniques in order to manage various endpoint devices 1910 and/or manage registration of endpoint devices 1910 with computing resources, such as destination devices 140. In such instances, endpoint device manager 1950 could send to endpoint devices 1910 information associated with one or more remote applications 1942 that enables endpoint devices 1910 to securely communication with the one or more remote applications 1942. For example, endpoint device manager 1950 could distribute a resource file 1952 that has information associated with remote applications 1942(1), 1942(2), 1942(3). In such instances, endpoint device 1910 could extract information included in resource file 1952 in order to directly register endpoint device 1910 with one or more specific remote applications 1942(1), 1942(2), 1942(3) via one or more secure data packets.

Resource file 1952 includes one or more encryption keys, as well as data associated with one or more remote applications 1942. In various embodiments, resource file 1952 may include endpoint device manager key pair 1958 that is provided by an endpoint device manager service. In various embodiments, resource file 1952 may include the contents of application list 1956. In some embodiments, resource file 1952 may include contents of one or more identifier files 1954.

Identifier files 1954 are separate files (e.g., identifier file 1954(1), 1954(2)) that are respectively associated with a specific remote application 1942(1). For example, identifier file 1954(1) may include information associated with remote application 1942(1), such as the name of remote application 1942(1) (e.g., "Sales Data_Main"), as well as the public application key associated with remote application 1942(1). In some embodiments, endpoint device manager may generate a resource file 1952 by combining contents of multiple identifier files 1954. For example, endpoint device manager 1950 could concatenate the contents of the identifier files 1954(1), 1954(2), 1954(3) when generating resource file 1952. In such instances, endpoint management application 1912 could extract information from resource file 1952 to register with any of remote applications 1942(1), 1942(2), 1942(3), in any order.

Application list 1956 is a list that identifies remote applications (e.g., remote applications 1942(1), 1942(2), etc.) are active within computer environment 1900. For example, as shown, application list 1956 identifies remote applications 1942(1), 1942(2), 1942(3) as active applications. In some embodiments, endpoint management application 1912 may refer to a list of active remote applications included in resource file 1952 in order to identify a group of candidate remote applications with which endpoint device 1910 can register. For example, resource file 1952 could include the contents of application list 1956, which lists remote applications 1942(1), 1942(2), and 1942(3) as active applications. In such instances, endpoint management application 1912 could provide an interface to the user of endpoint device 1910, where the interface lists the candidate remote applications.

Endpoint device manager (EDM) key pair 1958 is a public/private key pair associated with an endpoint device management service. In various embodiments, an endpoint device management service may enable endpoint device manager 1950 to identify and manage endpoint devices 1910 within computer environment 1900. For example, the endpoint device management service may configure policies and distribute those policies to endpoint devices 1910 via endpoint manager 1950. In some embodiments, the endpoint device management service may distribute EDM key pair 1958 to devices within 1900, including, but not limited to, endpoint device manager 1950, tunnel bridge 1920, and/or destination devices 1940. In such instances, one or more devices 1920, 1940, 1950 may use EDM key pair 1958 to authenticate messages sent by endpoint device 1910 and/or enforce policies implemented by the endpoint device management service.

In operation, endpoint device manager 1950 generates resource file 1952, which includes contents from one or more of identifier file 1954, application list 1956, and/or EDM key pair 1958. Endpoint device manager 1950 sends the generated resource file 1952 to endpoint device 1910. Endpoint management application 1912 uses content included in resource file 1952 to select a specific remote application (e.g., remote application 1942(1)) to access. Endpoint management application 1912 then generates credential data packet 1915 that includes user credentials that are applicable to the specific remote application 1942(1). Endpoint management application 1912 encrypts credential data packet using one or more encryption keys, including one or more encryption keys included in the resource file 1952. Once endpoint management application 1912 transmits encrypted credential data packet 1918, tunnel bridge 1920 and/or remote application 1942(1) may attempt authentication and/or decryption of encrypted credential data packet 1918 using the applicable encryption keys (e.g., using a private remote application key to decrypt encrypted credential data packet 1918 that was encrypted with a public remote application key).

When generating the encrypted credential data packet 1918 in accordance with an E2EE encryption technique, endpoint management application 1912 may implement one or more public/private key pair systems. For example, endpoint management application 1912 can encrypt the credential data packet 1915 using multiple private keys, including a private device key that is included in device key pair 1916; additionally, endpoint management application 1912 could use a private EDM key that is included in EDM key pair 1958. In another example, endpoint management application 1912 could encrypt credential data packet 1915 using a public key associated with a particular remote application (e.g., a public remote application key included in application key pair 1943(1)). In such instances, tunnel bridge 1920 and/or remote application 1942 could authenticate encrypted credential data packet 1918 upon receipt using the corresponding private and/or public keys.

In various embodiments, endpoint device 1910 may encrypt data using either EDM key included in EDM key pair 1958. In such instances, other devices within computer environment 1900 may use a corresponding key from EDM key pair 1958 to decrypt data packets that were encrypted by endpoint device 1910. For example, endpoint management application 1912 could generate encrypted credential data packet 1918 using one or more a private EDM encryption key included in EDM key pair 1958. Tunnel bridge 1920 could separately receive EDM key pair from 1958 and could use the corresponding public EDM key from EDM key pair 1958 in order to determine that the EDM key pair is valid. In some embodiments, tunnel bridge 1920 may respond to receiving encrypted credential data packet 1918 by sending a separate EDM key request to remote application 1942 to confirm that EDM key pair 1958 is valid. For example, tunnel bridge 1920 may send a secret message to remote application 1942(1). When remote application 1942(1) confirms that the secret message matches EDM key pair 1958, tunnel bridge 1920 could then send encrypted credential data packet 1918 to remote application 1942(1).

4.2 Managed Endpoint Deployment

Figure 20A:
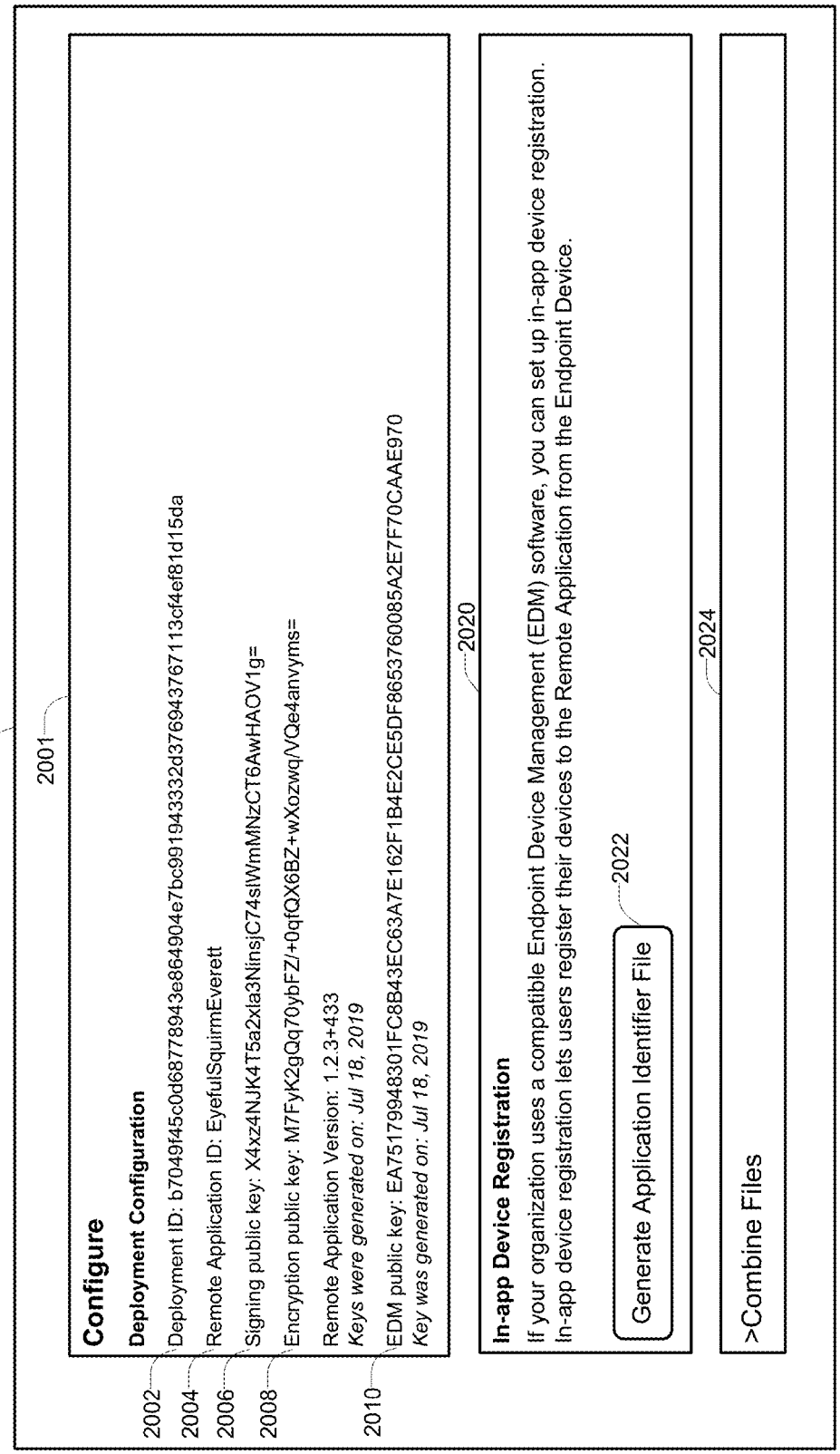
FIG. 20A is an example user interface for configuring identifier files of FIG. 19, in accordance with example embodiments.

FIG. 20A is an example user interface for configuring identifier files 1954 of FIG. 19, in accordance with example embodiments. Interface 2000, as generated by endpoint device manager 1950, includes deployment configuration window 2001, device registration window 2020, and resource file generation window 2024. Deployment configuration window 2001 includes multiple values associated with a specific remote application 1942, including deployment identifier (ID) 2002, remote application ID 2004, and encryption keys, including signing public application key 2006, encryption public application key 2008, and EDM public key 2010.

In operation, a user of endpoint device manager 1950, such as a system administrator, may review the deployment information provided in deployment configuration window 2001, which corresponds to information that is to be included in the contents of identifier file 1954. In some embodiments, a system administrator may submit an input to generate identifier file 1954. In various embodiments, identifier file 1954 may also include one or more encryption keys 2006-2010, as well as remote application ID 2004. For example, endpoint device manager 1950 could receive a user input when the user selects the "create application identifier file" icon 2022 within device registration window 2020. In such instances, endpoint device manager 1950 may respond to the user input by generating an identifier file 1954(3) that includes the one or more encryption keys 2006-2010 and remote application ID 2004 associated with remote application 1942(3).

Figure 20B:
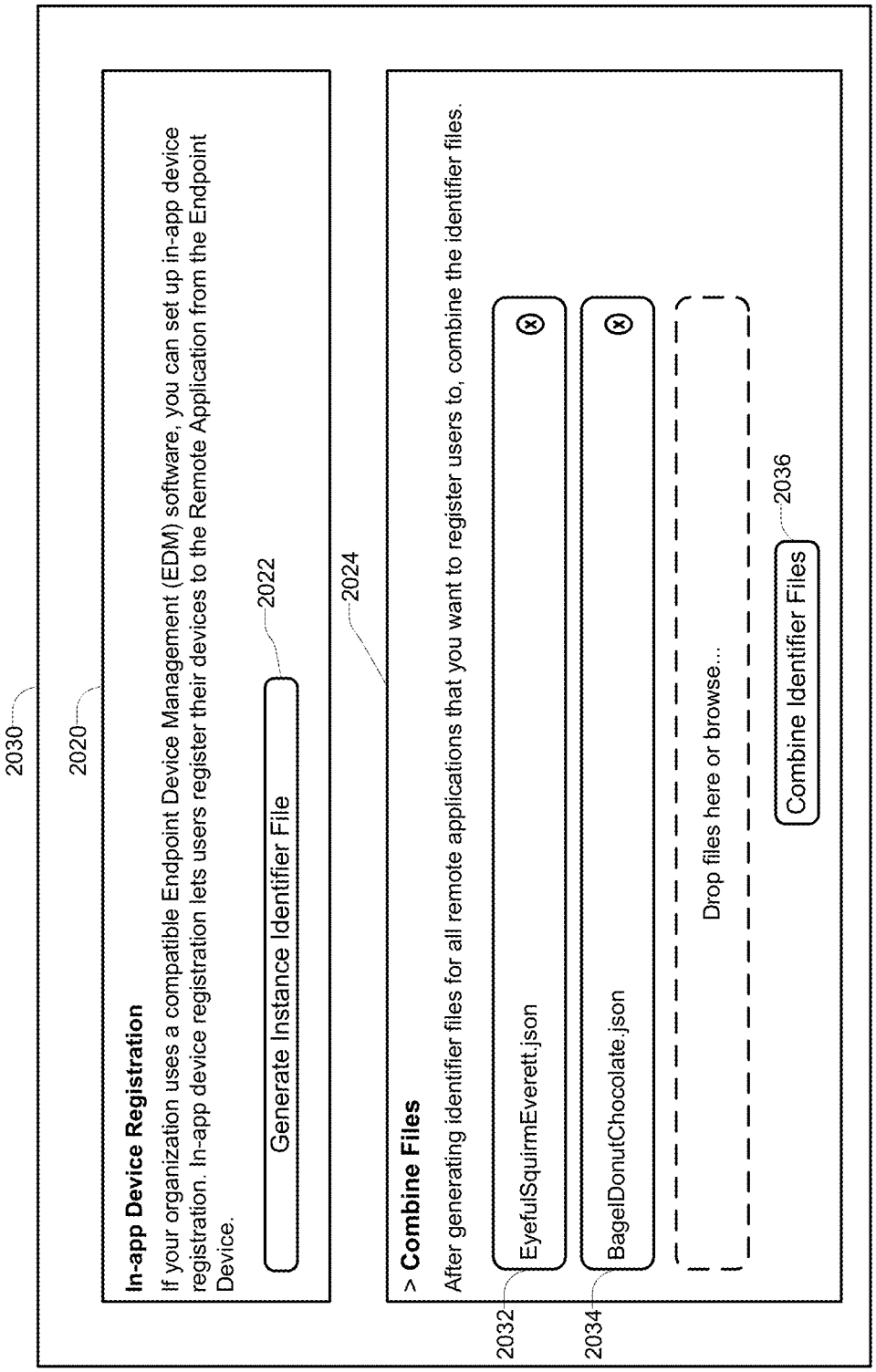
FIG. 20B is an example user interface for facilitating the generation of a resource file of FIG. 19.

FIG. 20B is an example user interface for facilitating the generation of a resource file 1952 of FIG. 19, in accordance with example embodiments. Interface 2030 includes device registration window 2020 and resource file generation window 2024.

In operation, a user of endpoint device manager 1950 selects multiple previously-generated identifier files 1954. Endpoint device manager 1950 responds by combining the selected identifier files 1954 into a single resource file 1952. In some embodiments, endpoint device manager 1950 may, based on the selected identifier files, add contents from application list 1956 into resource file 1952.

As shown, a user could select the "combine identifier files" icon 2036 within resource file generation window 2024. Endpoint device manager 1950 could respond to the user input by combining the listed identifier files 2032, 2034 into resource file 1952. For example, endpoint device manager 1950 may concatenate the contents of "EyefulSquirmEverett" identifier file 2032 after the contents of "BagelDonutChocloate" identifier file 2034. Endpoint device manager 1950 could also include the portions of application list 1956 that identifies the EyefulSquirmEverett remote application and the BagelDonutChocloate remote application as active instances.

Figure 20C:
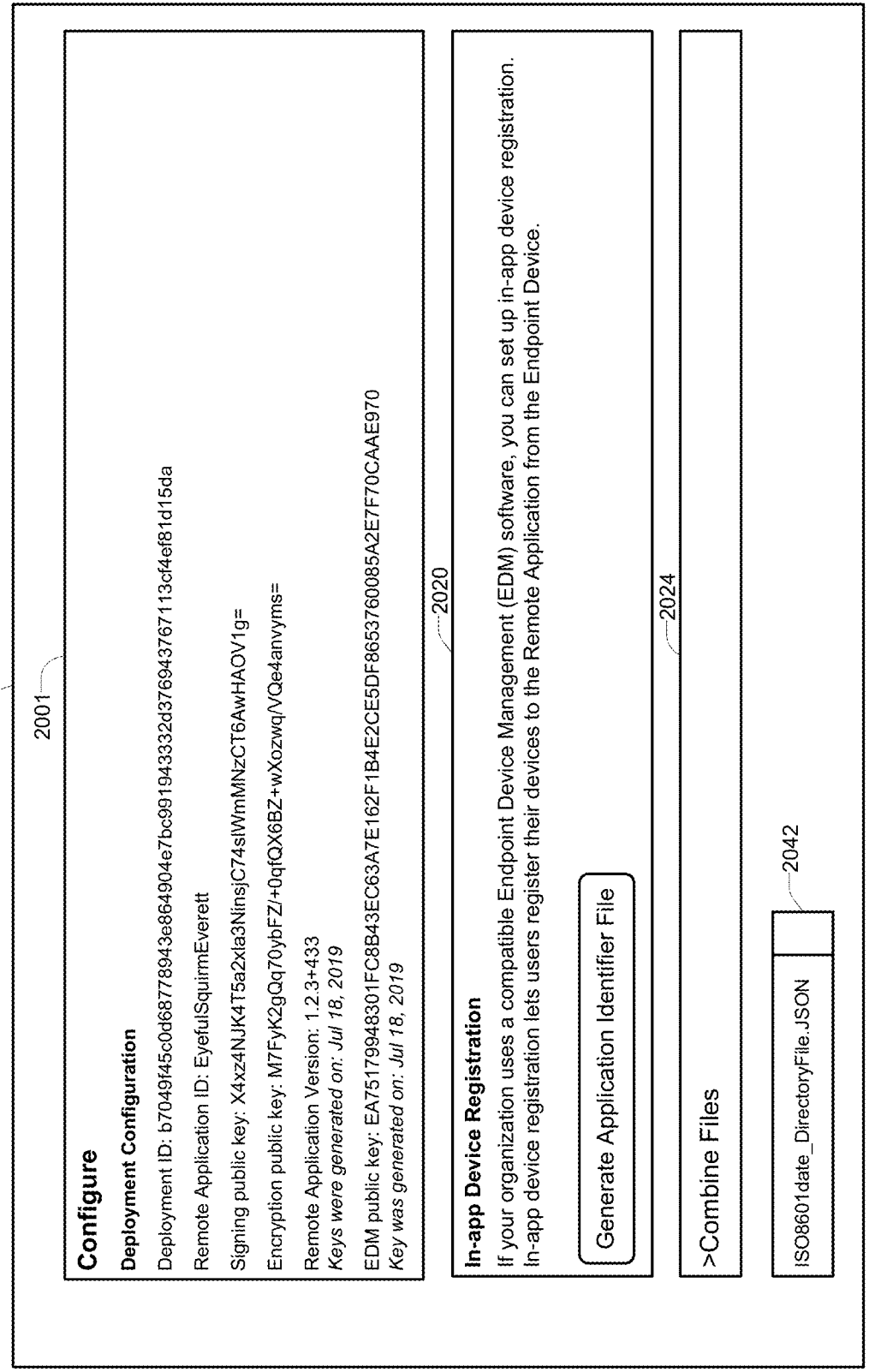
FIG. 20C is an example user interface that displays the contents of a resource file of FIG. 19, in accordance with example embodiments.

FIG. 20C is an example user interface that displays the contents of a resource file 1952 of FIG. 19, in accordance with example embodiments. Interface 2040 includes deployment configuration window 2001, device registration window 2020, resource file generation window 2024, and complete resource file 2042.

In various embodiments, endpoint device manager 1950 may distribute resource file 2042 to one or more endpoint devices 1910 in order to enable endpoint devices 1910 to directly register with one or more remote applications 1942. For example, endpoint device manager 1950 could send resource file 2042 to a group of endpoint devices that includes endpoint device 1910. In such embodiments, endpoint management application 1912 may check for resource file 2042 during startup to determine whether to register with one or more remote applications 1942.

FIG. 21 is an example user interface for deploying a resource file 2042 of FIG. 20C, in accordance with example embodiments. Interface 2100, as generated by endpoint device manager 1950, includes a group distribution menu 2110 that includes a managed endpoint device list 2112, and a distribution summary menu 2120 that includes a distributed endpoint device users 2122.

Group distribution menu 2110 includes managed endpoint device list 2112, which lists one or more endpoint devices 1910 in networked computer environment 1900 that are managed by endpoint device manager 1950. Distribution summary menu 2120 includes distributed endpoint device users 2122, which lists each user that is associated with a managed endpoint device 1910 that received resource filed 2042. In various embodiments, endpoint device manager 1950 may generate a resource file 2042 that includes one or more identifier files 2032, 2034 that are respectively associated with specific remote applications. In such instances, a user may select a group of endpoint devices from managed endpoint device list 2112 in order to facilitate the selected group to register with the specific remote applications.

For example, endpoint device manager 1950 could generate resource file 2042 by combining identifier files 2032 and 2034. Once endpoint device manager 1950 generates resource file 2042, a system administrator could select, from managed endpoint device list 2112, a subset of managed endpoint devices 1910 (e.g., a group of tvOS devices) of intended recipients, where each endpoint device in the intended recipient subset is to receive resource file 2042. Endpoint device manager 150 could respond to the selection of the subgroup by transmitting resource file 2042 to the selected group of endpoint devices. In some embodiments, endpoint device manager 150 causes resource file 2042 to be distributed to the intended recipient subset via the managed endpoint device service. In other embodiments, endpoint device manager 150 may transmit resource file 2042 to individual endpoint devices (e.g., endpoint device 1910) without selecting an intended recipient subset.

4.3 Managed Endpoint Device Registration

FIG. 22 illustrates a call flow diagram 2200 showing interactions between various components of the example networked computing environment 1900, in accordance with example embodiments. One or more components of network computer environment 1900 may perform various operations to register endpoint device 1910 with a specific remote application 1942(1), including generation of encrypted credential data packet 1918 and secure transmission of encrypted credential data packet 1918 via tunnel bridge 1920 to remote application 1942(1).

Endpoint device 1910 performs actions 2205 to create credential data packet 1915. For example, endpoint device 1910 could access information included in resource file 2042 in order to identify remote applications 1942 as active applications with which endpoint device 1910 can register. Endpoint device 1910 displays to the user a list of the remote applications 1942. Once a user selects a remote application with which to register (e.g., remote application 1942(1), the user could provide specific user credentials, such as by inputting a user name and password, that could be used to access the selected remote application 1942(1). Endpoint device 1910 performs one or more actions 2205 to generate credential data packet 1915 that includes the provided user credentials. In various embodiments, the payload of credential data packet 1915 may include remote application ID 2004 that is associated with the selected remote application 1942(1), the user name, and/or the password.

Endpoint device 1910 performs actions 2210 to generate encrypted credential data packet 2215. In various embodiments, endpoint device 1910 may perform one or more actions 2210 to retrieve one or more encryption keys from resource file 1952. Endpoint management application 1912 may then use one or more of the retrieved keys to encrypt and/or sign credential data packet 1915, thereby generating encrypted data packet 1918. In some embodiments, endpoint device 1910 may receive EDM key pair 1958 from a managed endpoint device service; in such instances, endpoint management application 1912 may sign the encrypted credential data packet with the private EDM key. In some embodiments, endpoint management application 1912 may retrieve the public EDM key 2010 from resource file 1952 and may sign the encrypted data packet with public EDM key 2010.

For example, endpoint management application 1912 could use three separate keys to encrypt and/or sign credential data packet 1915. Endpoint management application 1912 could first encrypt credential data packet 1915 with a private device key. Endpoint management application 1912 could then sign the encrypted data packet with a signing public remote application key 2006 included in resource file 2042, as well as with the public EDM key 2010.

Endpoint device 1910 then sends the encrypted-and-signed credential data packet 2215 to tunnel bridge 1920. In some embodiments, endpoint device 1910 may send an additional message, such as a polling message, to tunnel bridge 1920 in order to establish Websocket connections 1922 between endpoint device 1910 and the selected remote application 1942(1). Once a connection 1922(1) is established between endpoint device 1910 and tunnel bridge 1920, endpoint device 1910 may send encrypted credential data packet 2215 to tunnel bridge 1920 via connection 1922(1).

Tunnel bridge 1920 performs one or more actions 2220 to determine whether the EDM key that was used to sign the encrypted credential data packet 2215 is valid. In some embodiments, tunnel bridge 1920 may receive EDM key pair 1958 from a managed endpoint device service; in such instances, tunnel bridge 1920 may use the received EDM keys in order to determine whether the EDM key used by endpoint device 1910 to sign encrypted-and-signed credential data packet 2215 is valid. When tunnel bridge 1920 accepts the signature for the private EDM key, tunnel bridge 1920 transmits the encrypted credential data packet 2225 to remote application 1942(1). Otherwise, tunnel bridge 1920 may drop the encrypted credential data packet and cause an error message to be sent to endpoint device 1910 specifying that the authorization request was not accepted.

In some embodiments, tunnel bridge 1920 may send a separate EDM key request to remote application 1942 to confirm that EDM key pair 1958 is valid. For example, tunnel bridge 1920 may send an EDM key message to remote application 1942(1). When remote application 1942(1) confirms that contents of the EDM key message match EDM key pair 1958, tunnel bridge 1920 could then send encrypted credential data packet 2225 to remote application 1942(1) confirming that the signature provided by the EDM key is valid.

In some embodiments, remote application 1942(1) may respond to receiving encrypted credential packet 2225 by sending a public key request 2230 to tunnel bridge 1920. In such instances, remote application 1942(1) may send public key request 2230 in order to receive the public device key corresponding to the private key that endpoint device 1910 used to encrypt the encrypted credential data packet 2225. In such instances, tunnel bridge 1920 responds by sending public key response 2235 that includes the public device key included in device key pair 1916.

Remote application 1942(1) performs one or more actions 2240 to decrypt the encrypted credential data packet 2225 using one or more encryption keys. For example, remote application may use the private remote application key included in application key pair 1943(1) to determine whether the encrypted credential data packet was validly signed with signing public remote application key 2006. In some embodiments, remote application 1942(1) may use the public device key included in public key response 2235. In such instances, remote application 1942(1) may decrypt the encrypted data packet 2225 using the received public device key.

In various embodiments, remote application 1942(1) may successfully validate the signatures used to sign encrypted credential data packet 2225, and/or decrypt the encrypted credential data packet 2225. In such instances, remote application 1942(1) may retrieve contents from the payload of encrypted credential data packet 2225. Otherwise, in some embodiments, remote application 1942(1) may drop the encrypted credential data packet 2225 and cause an error message to be sent to endpoint device 1910 specifying that the authentication request failed due to the encrypted credential data packet 2225 being dropped.

Remote application 1942(1) and/or data intake and query system 1944(1) included in destination device 1940(1) attempts to, based on the user credentials included in encrypted credential data packet 2225, authenticate and authorize the user of endpoint device 1910. For example, upon decrypting the encrypted credential data packet 2225, remote application 1942(1) could perform actions 2245 to create a credential token that includes the user credential information included in the payload of encrypted credential data packet 2225. Once credential token 2250 is created, remote application 1942(1) could send the credential token 2250 to data intake and query system 1944(1). Upon receiving credential token 2250, DIQS 1944(1) attempts to authorize the user to access remote application 1942(1). In some embodiments, DIQS 1944(1) may send to a data source an authorization query that contains the user credential information. DIQS 1944(1) may subsequently receive a response from the data source.

When DIQS 1944(1) analyzes the response from the data source and determines that the user is authorized to access remote application 1942(1), DIQS 1944(1) transmits an authorization message 2255 to remote application 1942(1).

Remote application 1942(1) then transmits an authorization message 2260 to tunnel bridge 1920, which in turn, transmits authorization message 2265 to endpoint device 1910. In some embodiments, when DIQS 1944(1) determines that the user is not authorized to access remote application 1942(1), DIQS 1944(1) may transmit an error message to remote application 1942(1) that specifies that the user credentials failed. In such instances, remote application 1942(1) may transmit an error message to endpoint device 1910 via tunnel bridge 1920.

Figure 23:
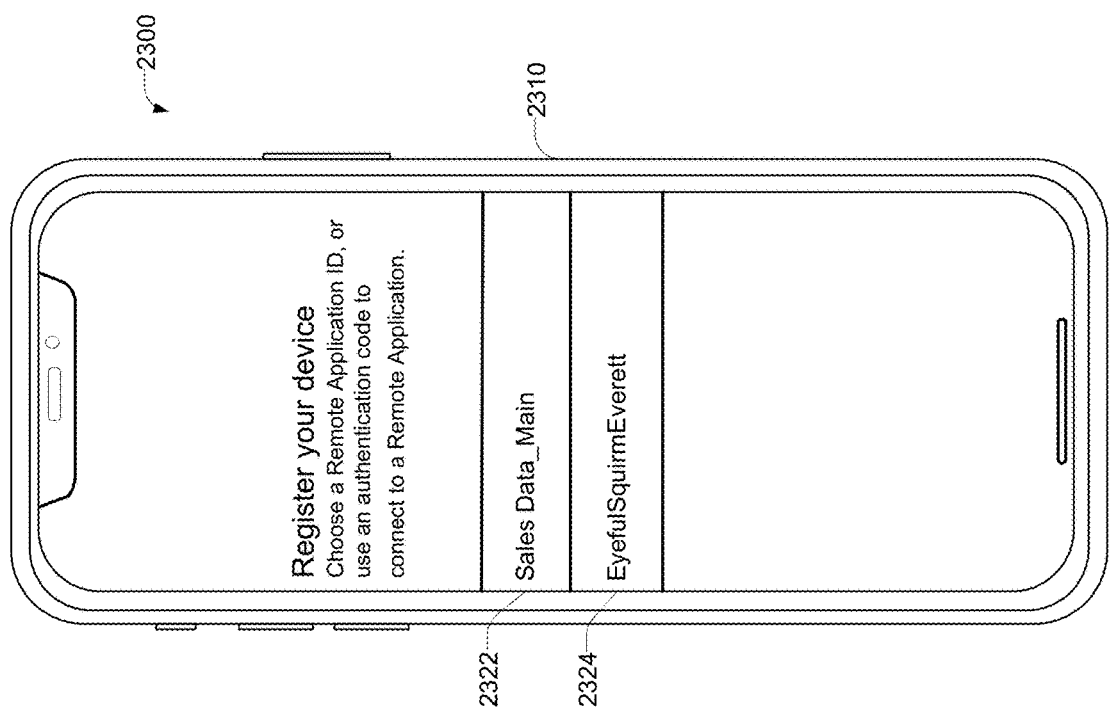
FIG. 23 is an example user interface for selecting a remote application of FIG. 19 for authentication of a managed endpoint device, in accordance with example embodiments.

FIG. 23 is an example user interface for selecting a remote application 1942 of FIG. 19 for authentication of a managed endpoint device 1910, in accordance with example embodiments. Interface 2300 provided by endpoint device 2310 includes managed endpoint device and two candidate remote applications 2322 and 2324.

In operation, endpoint management application 1912 analyzes resource file 1952 in order to retrieve a list of active and/or available remote applications with which endpoint device 1910 can register. For example, endpoint management application 1912 could access the contents of resource file 1952, which identifies remote applications "Sales Data_Main" and "Eyeful SquirmEverett" as active remote applications 1942. Endpoint management application 1912 could then provide interface 2300 that includes icons for each of the candidate remote applications 2322 and 2324. Endpoint management application 1912 could respond to a user selection of a particular candidate remote application (e.g., remote application 2324) by prompting the user to provide applicable user credentials associated with the selected remote application 2324.

Figure 24:
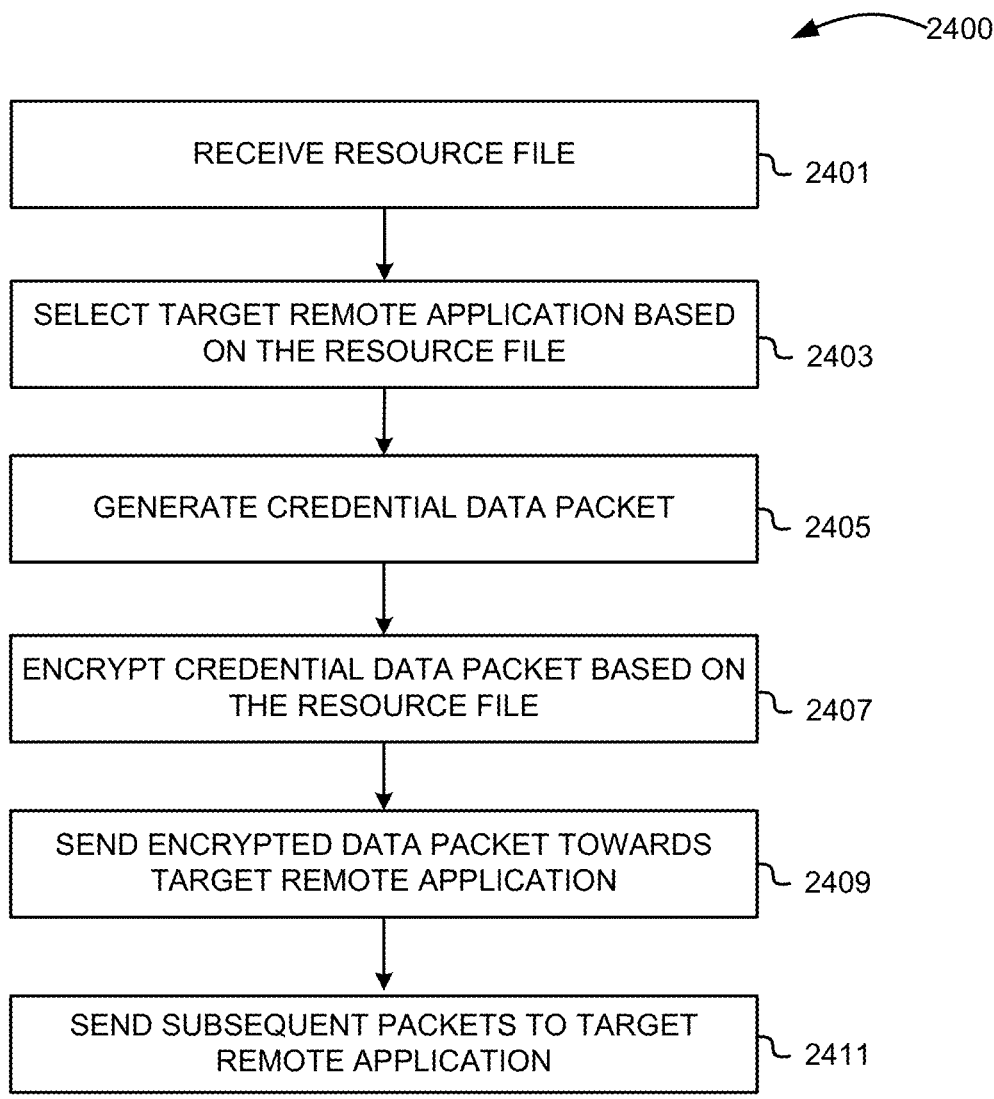
FIG. 24 sets for a flow diagram of method steps for authenticating a managed endpoint device, in accordance with example embodiments.

FIG. 24 sets for a flow diagram of method steps for authenticating a managed endpoint device, in accordance with example embodiments. Although the method steps are described in conjunction with FIGS. 1-23, persons of ordinary skill in the art will understand that any system configured to perform this method and/or methods described herein, in any order, and in any combination not logically contradicted, is within the scope of the present invention.

As shown, method 2400 begins at step 2401, where endpoint device 1910 receives resource file 1952. In various embodiments, endpoint management application 1912 included in endpoint device 1910 may receive resource file 1952 from endpoint device manager 1950. In various embodiments, endpoint management application 1912 may check at startup to see whether resource file 1952 was received from endpoint device manager 1950. For example, endpoint device manager 1950 could execute a managed endpoint device deployment technique to generate and transmit resource file 1952 to a group of one or more endpoint devices, where endpoint device 1910 is included in the group.

Resource file 1952 includes one or more encryption keys, as well as data associated with one or more remote applications 1942 operating in one or more destination devices 1940. In various embodiments, resource file 1952 may include one or more EDM keys in EDM key pair 1958. In some embodiments, resource file 1952 may include information from application list 1956, which identifies active remote applications (e.g., remote applications 1942(1), 1942(2), etc.). In some embodiments, resource file 1952 may include contents of an identifier file (e.g., identifier file 1954(1)) that is associated with a given remote application 1942(1). For example, resource file 1952 could include, for remote application 1942(1), a set of information that includes a public remote application key associated with remote application 1942(1), and the name of remote application 1942(1) (e.g., "EyefulSquirmEverett"). In some embodiments, resource file 1952 may include the contents of multiple identifier files 1954, each identifier file 1954 respectively associated with a specific remote application 1942. In such instances, endpoint device manager 1950 may generate resource file 1952 by concatenating multiple identifier files 1954.

At step 2403, endpoint device 1910 selects, based on the resource file, a target remote application with which to register. In various embodiments, endpoint management application 1912 may access, from resource file 1952, a list of active remote applications. Endpoint management application 1912 may refer to the list of active remote applications in order to identify a group of remote applications with which endpoint device 1910 can register. For example, resource file 1952 could include the contents of application list 1956 that lists remote applications 1942(1), 1942(2), and 1942(3) as active applications. In some embodiments, endpoint management application 1912 may provide interface 2300 to the user of endpoint device 1910, where interface 2300 includes lists the active remote applications. In such instances, endpoint management application 1912 may receive a user input (e.g., selection of remote application 2322 that corresponds to remote application 1942(1)) and, based on the user input, select the target remote application 1942(1) from the group of active remote applications 1942.

At step 2405, endpoint device 1910 generates a credential data packet. In various embodiments, upon selecting target remote application 1942(1), endpoint management application 1912 may generate credential data packet 1915 based on contents of resource file 1952 that was received at step 2401. For example, endpoint management application 1912 could prompt a user to enter credentials associated with target remote application 1942(1), such as user name and password, in order for target remote application 1942(1) to authorize the user. In such instances, endpoint management application 1912 could generate credential data packet 1915 that includes the user credentials in the payload.

At step 2407, endpoint device 1910, based on the resource file, encrypts the credential data packet. In various embodiments, endpoint management application 1912 may encrypt and/or sign credential data packet 1915 using one or more encryption keys. For example, endpoint management application 1912 could encrypt credential data packet 1915 using one or more distinct encryption keys. Such keys could include a public key associated with target remote application 1942(1) and/or a private device key associated with endpoint device 1910. Endpoint management application 1912 may sign the encrypted credential data packet with private EDM key included in EDM key pair 1958 that is included in resource file 1952. In some embodiments, endpoint management application 1912 may encrypt credential data packet 1915 with all three encryption keys.

At step 2409, endpoint device 1910 sends the encrypted credential data packet towards the target remote application. In various embodiments, endpoint device 1910 may send an authorization request to the target remote application 1942(1). In some embodiments, endpoint device 1910 may include the encrypted credential data packet 1918 in the authorization request. Endpoint device 1910 sends the authorization request to the target remote application 1942(1) via tunnel bridge 1920. In some embodiments, endpoint device 1910 may periodically poll tunnel bridge 1920 in order to confirm that tunnel bridge 1920 received encrypted credential data packet 1918 and/or forwarded encrypted credential data packet 1918 to target remote application 1942(1).

At step 2411, endpoint device 1910 sends subsequent packets to the target remote application. In various embodiments, endpoint device 1910 may receive an authorization message originating from destination device 1940(1) upon target remote application 1942(1) and/or DIQS 1944(1) authenticating endpoint device 1910 and determining that the user is authorized to access target remote application 1942(1). Upon receiving an authorization message from the target remote application 1942(1), endpoint device 1910 sends subsequent packages to target remote application 1942(1). For example, endpoint device 1910 could send one or more data queries as encrypted messages to target remote application 1942(1) in order to retrieve sets of data values via DIQS 1944(1).

In sum, an endpoint management application included in an endpoint device securely connects to remote applications using trusted communications channels in order to directly register with one or more remote applications. Before connecting to a destination device that includes a remote application, the endpoint device receives a resource file that contains information associated with one or more remote applications, as well as encryption keys associated with the one or more remote applications. The endpoint management application selects a particular remote application and retrieves, from the resource file, the corresponding remote application key. The endpoint management application also retrieves, from the resource file, an endpoint device management (EDM) key. The endpoint management application generates a credential data packet that includes various user credentials associated with the endpoint device and/or a user of the endpoint device. The credential data packet encrypted with one or more encryption keys and is signed with the EDM key.

The endpoint device sends the encrypted-and-signed credential data packet to the selected remote application via a trusted communications channel. In some embodiments, a tunnel bridge may authenticate the signature provided by the EDM key before transmitting the encrypted credential data packet to the remote application. Upon receiving the encrypted credential data packet, the selected remote application authenticates the encrypted credential data packet by validating and decrypting the encrypted credential data packet. Upon authenticating the credential data packet, the remote application authenticates the user by transmitting an authorization packet that contains the user credentials via the trusted communications channel. The endpoint device may then securely transmit other packets to the remote application via the trusted communications channel.

At least one technological advantage of the disclosed techniques relative to prior techniques is that individual users may, without requiring intervention by an intermediate manager, directly register an endpoint device in order to access a remote application. Consequently, by eliminating intermediary systems in device authentication techniques, the disclosed techniques that provide automated authentication and authorization thus enable devices to securely register and authenticate large numbers of devices when accessing devices within the networked computing environment. Further, by enabling an endpoint device to sign user credentials using a provided endpoint device management key, an endpoint device manager can effectively cause endpoint devices to adhere to policies provided by the endpoint device manager.

1. In various embodiments, a computer-implemented method comprises generating, based on a resource file stored at an endpoint device, a credential data packet for authenticating with a first application executing in a first network, where the resource file includes a set of encryption keys associated with a plurality of applications including the first application, and where the credential data packet is encrypted with a device key signed by the endpoint device, and the credential data packet is signed by an endpoint device management (EDM) key extracted from the set of encryptions keys included in the resource file, sending, by the endpoint device, the credential data packet to the first application via a trusted communication channel, and receiving, by the endpoint device and in response to the credential data packet, an authorization packet from the first application via the trusted communication channel.
2. The computer-implemented method of clause 1, further comprising receiving, by the endpoint device from an endpoint device manager, the resource file, wherein the endpoint device manager generates the EDM key.
3. The computer-implemented method of clause 1 or 2, further comprising establishing the trusted communications channel via a trusted tunnel bridge, where sending the credential data packet to the first application comprises sending the credential data packet to the trusted tunnel bridge, and where the trusted tunnel bridge determines that the EDM key is validly signed.
4. The computer-implemented method of any of clauses 1-3, further comprising identifying, based on a list of the plurality of applications included in the resource file, the plurality of applications as candidate applications to which the endpoint device can form one or more connections, and selecting the first application from the list of the plurality of applications.
5. The computer-implemented method of any of clauses 1-4, where the resource file includes, for each application included in the plurality of applications, a distinct public key signed by the application.
6. The computer-implemented method of any of clauses 1-5, where the authorization packet includes a credential token generated by a destination device, wherein the first application executes on the destination device.
7. The computer-implemented method of any of clauses 1-6, where the resource file includes a list of the plurality of applications.
8. The computer-implemented method of any of clauses 1-7, further comprising sending, by the endpoint device after receiving the authorization packet, at least one packet to a destination device via the trusted communications channel.
9. The computer-implemented method of any of clauses 1-8, where the resource file is generated by combining a plurality of identifier files, and each identifier file included in the plurality of identifier files is associated with an application included in the plurality of applications.
10. The computer-implemented method of any of clauses 1-9, further comprising receiving, by the endpoint device, at least one user credential via user input, wherein generating the credential data packet further comprises including the at least one user credential in the credential data packet.
11. In various embodiments, one or more non-transitory computer-readable media include instructions that, when executed by one or more processors, cause the one or more processors to perform the steps of generating, based on a resource file stored at an endpoint device, a credential data packet for authenticating with a first application executing in a first network, wherein the resource file includes a set of encryption keys associated with a plurality of applications including the first application, and where the credential data packet is encrypted with a device key signed by the endpoint device, and the credential data packet is signed by an endpoint device management (EDM) key extracted from the set of encryptions keys included in the resource file, sending, by the endpoint device, the credential data packet to the first application via a trusted communication channel, and receiving, by the endpoint device and in response to the credential data packet, an authorization packet from the first application via the trusted communication channel.

12. The one or more non-transitory computer-readable media of clause 11, further including instructions that, when executed by the one or more processors, cause the one or more processors to perform the step of receiving, by the endpoint device from an endpoint device manager, the resource file, wherein the endpoint device manager generates the EDM key.

13. The one or more non-transitory computer-readable media of clause 11 or 12, further including instructions that, when executed by the one or more processors, cause the one or more processors to perform the step of establishing the trusted communications channel via a trusted tunnel bridge, wherein sending the credential data packet to the first application comprises sending the credential data packet to the trusted tunnel bridge, and wherein the trusted tunnel bridge determines that the EDM key is validly signed.

14. The one or more non-transitory computer-readable media of any of clauses 11-13, further including instructions that, when executed by the one or more processors, cause the one or more processors to perform the step of identifying, based on a list of the plurality of applications included in the resource file, the plurality of applications as candidate applications to which the endpoint device can form one or more connections, and selecting the first application from the list of the plurality of applications.

15. The one or more non-transitory computer-readable media of any of clauses 11-14, where the resource file includes, for each application included in the plurality of applications, a distinct public key signed by the application.

16. The one or more non-transitory computer-readable media of any of clauses 11-15, where the authorization packet includes a credential token generated by a destination device, where the first application executes on the destination device.

17. The one or more non-transitory computer-readable media of any of clauses 11-16, wherein the resource file includes a list of the plurality of applications.

18. The one or more non-transitory computer-readable media of any of clauses 11-17, further including instructions that, when executed by the one or more processors, cause the one or more processors to perform the step of sending, by the endpoint device after receiving the authorization packet, at least one packet to a destination device via the trusted communications channel.

19. The one or more non-transitory computer-readable media of any of clauses 11-18, where the resource file is generated by combining a plurality of identifier files, and each identifier file included in the plurality of identifier files is associated with an application included in the plurality of applications.

20. The one or more non-transitory computer-readable media of any of clauses 11-19, further including instructions that, when executed by the one or more processors, cause the one or more processors to perform the step of receiving, by the endpoint device, at least one user credential via user input, wherein generating the credential data packet further comprises including the at least one user credential in the credential data packet.

21. In various embodiments, a computing device comprises a memory that includes an endpoint management application, and a processor that is coupled to the memory and, when executing the endpoint management application, performs the steps of generating, based on a resource file stored at an endpoint device, a credential data packet for authenticating with a first application executing in a first network, wherein the resource file includes a set of encryption keys associated with a plurality of applications including the first application, and where the credential data packet is encrypted with a device key signed by the endpoint device, and the credential data packet is signed by an endpoint device management (EDM) key extracted from the set of encryptions keys included in the resource file, sending, by the endpoint device, the credential data packet to the first application via a trusted communication channel, and receiving, by the endpoint device and in response to the credential data packet, an authorization packet from the first application via the trusted communication channel.

22. The computing device of clause 21, where the processor further executes the endpoint management application by receiving, by the endpoint device from an endpoint device manager, the resource file, wherein the endpoint device manager generates the EDM key.

23. The computing device of clause 21 or 22, where the processor further executes the endpoint management application by establishing the trusted communications channel via a trusted tunnel bridge, wherein sending the credential data packet to the first application comprises sending the credential data packet to the trusted tunnel bridge, and wherein the trusted tunnel bridge determines that the EDM key is validly signed.

24. The computing device of any of clauses 21-23, where the processor further executes the endpoint management application by identifying, based on a list of the plurality of applications included in the resource file, the plurality of applications as candidate applications to which the endpoint device can form one or more connections, and selecting the first application from the list of the plurality of applications.

25. The computing device of any of clauses 21-24, where the resource file includes, for each application included in the plurality of applications, a distinct public key signed by the application.

26. The computing device of any of clauses 21-25, where the authorization packet includes a credential token generated by a destination device, wherein the first application executes on the destination device.

27. The computing device of any of clauses 21-26, where the resource file includes a list of the plurality of applications.

28. The computing device of any of clauses 21-27, where the processor further executes the endpoint management application by sending, by the endpoint device after receiving the authorization packet, at least one packet to a destination device via the trusted communications channel.

29. The computing device of any of clauses 21-28, where the resource file is generated by combining a plurality of identifier files, and each identifier file included in the plurality of identifier files is associated with an application included in the plurality of applications.

30. The computing device of any of clauses 21-29, where the processor further executes the endpoint management application by receiving, by the endpoint device, at least one user credential via user input, wherein generating the credential data packet further comprises including the at least one user credential in the credential data packet.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent one or more modules, segments, or portions of code, which each comprise one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method comprising:
    receiving, by an endpoint device manager, an identifier file associated with authentication of a first application executing in a network, wherein the identifier file includes a first encryption key associated with the first application;
    generating, by the endpoint device manager and based on at least the identifier file, a resource file including:
        an endpoint device management (EDM) key, and
        a set of encryption keys associated with a plurality of applications including the first application,
    sending, by the endpoint device manager to an endpoint device, the resource file, wherein the endpoint device generates, based on the resource file, a signed and encrypted data packet operable for authentication with the first application.

2. The computer-implemented method of claim 1, further comprising receiving a second identifier file associated with authentication of a second application executing in the network, and wherein:
    the second identifier file includes a second encryption key associated with the second application, and
    the endpoint device generates a second signed and encrypted data packet operable for authentication with the second application.

3. The computer-implemented method of claim 2, wherein generating the resource file comprises combining at least the identifier file and the second identifier file.

4. The computer-implemented method of claim 1, wherein the set of encryption keys are associated with a deployment configuration having a deployment identifier.

5. The computer-implemented method of claim 1, wherein the set of encryption keys includes:
   a signing public key for the first application; and
   an encryption public key for the first application.

6. The computer-implemented method of claim 1, further comprising:
   receiving a group distribution list configured to receive the resource file; and
   sending the resource file to each device in the group distribution list, wherein the endpoint device is included in the group distribution list.

7. The computer-implemented method of claim 6, wherein the group distribution list includes a first subset of devices of a first device type and a second subset of devices of a second device type.

8. The computer-implemented method of claim 1, wherein the resource file includes:
   an application list that lists the plurality of applications; and
   respective sets of encryption keys for each application of the plurality of applications.

9. The computer-implemented method of claim 1 wherein:
   the endpoint device sends the signed and encrypted credential data packet to the first application via a trusted tunnel bridge, and
   the trusted tunnel bridge determines that signed and encrypted credential data packet is validly signed with the EDM key.

10. The computer-implemented method of claim 1 wherein, in respond to the signed and encrypted data packet, the endpoint device receives an authorization packet including a credential token generated by a destination device, and the first application executes on the destination device.

11. One or more non-transitory computer-readable media storing instructions that, when executed by one or more processors, cause the one or more processors to perform the steps of:
   receiving, by an endpoint device manager, an identifier file associated with authentication of a first application executing in a network, wherein the identifier file includes a first encryption key associated with the first application;
   generating, by the endpoint device manager and based on at least the identifier file, a resource file including:
   an endpoint device management (EDM) key, and
   a set of encryption keys associated with a plurality of applications including the first application,
   sending, by the endpoint device manager to an endpoint device, the resource file, wherein the endpoint device generates, based on the resource file, a signed and encrypted data packet operable for authentication with the first application.

12. The one or more non-transitory computer-readable media of claim 11, further comprising instructions that, when executed by one or more processors, cause the one or more processors to perform the step of receiving a second identifier file associated with authentication of a second application executing in the network, and wherein:
   the second identifier file includes a second encryption key associated with the second application, and
   the endpoint device generates a second signed and encrypted data packet operable for authentication with the second application.

13. The one or more non-transitory computer-readable media of claim 12, wherein generating the resource file comprises combining at least the identifier file and the second identifier file.

14. The one or more non-transitory computer-readable media of claim 11, wherein the set of encryption keys includes:
   a signing public key for the first application; and
   an encryption public key for the first application.

15. The one or more non-transitory computer-readable media of claim 11, further comprising instructions that, when executed by one or more processors, cause the one or more processors to perform the steps of:
   receiving a group distribution list configured to receive the resource file; and
   sending the resource file to each device in the group distribution list, wherein the endpoint device is included in the group distribution list.

16. A system comprising:
   a memory storing instructions; and
   a processor that is coupled to the memory and executes the instructions by performing the steps of:
   receiving an identifier file associated with authentication of a first application executing in a network, wherein the identifier file includes a first encryption key associated with the first application;
   generating, based on at least the identifier file, a resource file including:
   an endpoint device management (EDM) key, and
   a set of encryption keys associated with a plurality of applications including the first application,
   sending, to an endpoint device, the resource file, wherein the endpoint device generates, based on the resource file, a signed and encrypted data packet operable for authentication with the first application.

17. The system of claim 16, wherein the processor further executes the instructions to perform the step of receiving a second identifier file associated with authentication of a second application executing in the network, and wherein:
   the second identifier file includes a second encryption key associated with the second application, and
   the endpoint device generates a second signed and encrypted data packet operable for authentication with the second application.

18. The system of claim 17, wherein generating the resource file comprises combining at least the identifier file and the second identifier file.

19. The system of claim 16, wherein the set of encryption keys includes:
   a signing public key for the first application; and
   an encryption public key for the first application.

20. The system of claim 16, wherein the processor further executes the instructions to perform the steps of:
   receiving a group distribution list configured to receive the resource file; and
   sending the resource file to each device in the group distribution list, wherein the endpoint device is included in the group distribution list.

* * * * *